US007633406B2

(12) United States Patent
Miki

(10) Patent No.: US 7,633,406 B2
(45) Date of Patent: Dec. 15, 2009

(54) LIGHTING CONTROL SYSTEM

(75) Inventor: Mitsunori Miki, Kyoto (JP)

(73) Assignee: The Doshisha, Kyoto (JP)

( * ) Notice: Subject to any disclaimer, the term of this patent is extended or adjusted under 35 U.S.C. 154(b) by 442 days.

(21) Appl. No.: 10/583,858

(22) PCT Filed: Mar. 23, 2004

(86) PCT No.: PCT/JP2004/003982

§ 371 (c)(1),
(2), (4) Date: Jun. 21, 2006

(87) PCT Pub. No.: WO2005/062680

PCT Pub. Date: Jul. 7, 2005

(65) Prior Publication Data

US 2007/0103007 A1 May 10, 2007

(30) Foreign Application Priority Data

Dec. 22, 2003 (JP) ............................ 2003-424881

(51) Int. Cl.
*H02J 13/00* (2006.01)

(52) U.S. Cl. .................. 340/825.52; 315/312; 340/332; 340/815.4; 362/234; 700/225

(58) Field of Classification Search ............ 340/825.52, 340/3.5, 825.69, 332, 815.4, 540, 539.16; 700/90, 225, 295, 296; 361/189; 362/147, 362/234; 307/149; 702/96; 324/527; 315/312
See application file for complete search history.

(56) References Cited

U.S. PATENT DOCUMENTS 4,158,132 A * 6/1979 O'Dell ....................... 250/205

(Continued)

FOREIGN PATENT DOCUMENTS

JP 02-066881 A 3/1990

(Continued)

OTHER PUBLICATIONS

Miki et al., "Design of Intelligent Lighting System," The Science and Engineering Review of Doshisha University, vol. 39, No. 2, The Doshisha (Jul. 1998).

(Continued)

*Primary Examiner*—Brent Swarthout
(74) *Attorney, Agent, or Firm*—Rader, Fishman & Grauer, PLLC

(57) ABSTRACT

The present invention is a lighting control system including at least one local device and a plurality of lighting devices. The communication transmission medium between the local device and the lighting devices is provided with directional characteristics, and the lighting devices are selected and designated, as needed, using ID information. A designated lighting device is lighted up and performs light intensity setting. A judgment is carried out as to whether or not the relation between an illumination at a desired position and a target illumination satisfies a predetermined condition, and causes the illumination at the desired position to approach the target illumination by letting the plurality of lighting devices successively perform a procedure of increasing/decreasing their respective light intensities based on a result of the judgment. With such a lighting control system, it is possible to let a part of the whole lighting devices, for example, the necessary lighting devices perform control, in particular, in an environment in which numerous lighting devices are installed, thereby making it possible to shorten the control time and reducing a waste of illumination.

32 Claims, 18 Drawing Sheets

U.S. PATENT DOCUMENTS

| | | | | |
|---|---|---|---|---|
| 5,554,979 | A * | 9/1996 | Kohar et al. | 340/825.72 |
| 5,812,422 | A * | 9/1998 | Lyons | 703/18 |
| 5,978,364 | A * | 11/1999 | Melnik | 370/320 |
| 6,160,359 | A * | 12/2000 | Fleischmann | 315/294 |
| 7,170,238 | B2 * | 1/2007 | Adamson et al. | 315/293 |
| 7,417,556 | B2 * | 8/2008 | Ling | 340/825.69 |
| 2002/0080027 | A1 * | 6/2002 | Conley, III | 340/540 |
| 2003/0102979 | A1 * | 6/2003 | Jednacz et al. | 340/825.52 |

FOREIGN PATENT DOCUMENTS

| | | |
|---|---|---|
| JP | 2002-110369 A | 4/2002 |

OTHER PUBLICATIONS

International Search Report.

* cited by examiner

FIG.18

| light intensity of lighting device j | evaluation value of differential illumination |
|---|---|
| 200 | −37 |
| 1000 | 48 |
| 300 | −22 |
| 600 | 14 |
| 100 | −35 |
| 400 | −8 |
| 500 | −2 |
| 900 | 43 |
| 700 | 18 |
| 800 | 33 |
| 200 | −18 |
| ~ | ~ |
| ~ | ~ |
| ~ | ~ |
| ~ | ~ |

LIGHTING CONTROL SYSTEM

TECHNICAL FIELD

The present invention relates to a lighting control system that can be used for lighting control for example, the lighting control systems being capable of performing selection of lighting devices, as well as flexible control and management of light intensities and illuminations, for example.

BACKGROUND ART

With conventional lighting systems, when numerous light sources are provided in a hall for example, individual light sources are selected and the light intensities of the light sources are adjusted individually to set the illumination appropriately for numerous locations inside the hall. With such a technique, it is necessary to repetitively adjust each of the light sources using trial and error to set the illumination at a predetermined position to a desired value. Also, it is necessary to adjust the light intensity of each of the light sources regularly or for each performance, if the illumination of the lamps changes over time. Similarly, adjustments are necessary when the illuminant has degraded and is replaced. And in conference rooms or the like, the immediate optimal illumination varies when the outside light from a window varies.

On the other hand, systems capable of sensing the condition of each light source, detecting malfunctions, and remotely controlling the respective illuminations of the light sources are known as intelligent lighting systems (for example see *Shomei Shisutemu no Chitekika Sekkei* (Incorporating Greater Intelligence in the Design of Lighting Systems), Mitsunori Miki and Takafumi Kozai, Doshisha University, Science and Engineering Research Report, July 1998, Volume 39, No. 2, pp 24-34).

DISCLOSURE OF INVENTION

However, with the systems in the above-described conventional technology, in order to set a desired illumination in desired locations in audience seats and on stage for example, trial and error and adjustments have been necessary as with conventional systems.

On the other hand, although commonly known automatic control may be used to adjust a single point of illumination of a single light source to a predetermined target value, in cases such as where a plurality of light sources are used and the overall illumination distribution in a room is to be set to a desired condition, it has not been easy to solve the issues of adjusting a plurality of control targets to set and maintain a condition in which a plurality of target values are met.

An object of the present invention is to provide a lighting control system capable of setting the illumination of a predetermined position to a desired illumination using a plurality of lighting devices in places such as in a hall, in an ordinary room, and outdoors.

In order to solve the above-described issues, a lighting control system of the present invention employs the following means.

(1) A lighting control system, including at least one local device, and a plurality of lighting devices, wherein the local device includes a first transmitter portion that transmits information for controlling light intensities of the lighting devices via a transmission medium, and transmits the information by the first transmitter portion;

wherein the lighting devices include a first receiver portion that can receive the transmission medium and that extracts the information from the transmission medium, a control portion that controls a light intensity based on the content of the information extracted by the first receiver portion, and a light source whose light intensity is controlled by the control portion;

wherein a lighting device to be selected is specified based on any of selection of ID information for identifying the lighting devices in the local device, directional characteristics of emission of the transmission medium in the first transmitter portion, and directional characteristics of reception of the transmission medium in the first receiver portion of the lighting devices; and wherein the control portion controls the light intensity in the selected lighting device, based on the content of the information extracted by the first receiver portion (2) A lighting control system, including at least one local device that can send selection information capable of representing selection of a lighting device as an optical signal, and a plurality of lighting devices that can receive the selection information, wherein the local device includes an operating portion that instructs an operation of the lighting devices, and a first transmitter portion that transmits the content of instruction by the operating portion, and the local device transmits the selection information from the first transmitter portion in accordance with the content of instruction by the operating portion;

wherein the lighting devices include a first receiver portion that can receive the selection information, a control portion that controls a light intensity in accordance with the content received by the first receiver portion, and a light source whose light intensity is controlled by the control portion;

wherein at least one of the first transmitter portion and the first receiver portion is provided with directional characteristics; and wherein the plurality of lighting devices judge the presence or absence of reception of the selection information, and the control portion controls the light intensity of the light source in accordance with said presence or absence.

(3) A lighting control system, including at least one local device that can send light intensity setting information that is information relating to a set light intensity as an optical signal, and a plurality of lighting devices that can receive the light intensity setting information, wherein the local device includes a setting portion that sets a light intensity, and a first transmitter portion that transmits the light intensity setting information set by the setting portion as an optical signal;

wherein the lighting devices include a first receiver portion that can receive the light intensity setting information on the optical signal, a control portion that controls a light intensity based on the received light intensity setting information, and a light source whose light intensity is controlled by the control portion;

wherein at least one of the first transmitter portion and the first receiver portion is provided with directional characteristics; and wherein, in a lighting device that is included in the plurality of lighting devices and that received the light intensity setting information, the control portion controls the light intensity of the light source based on the received light intensity setting information.

(4) A lighting control system, including at least one local device that can transmit a comparison result between a target illumination and a sampled illumination, and a plurality of lighting devices that can receive the comparison result, wherein the local device includes a storage portion in which target illumination information is stored, a sampling portion that acquires, as sampled illumination information, an illumination resulting from light intensities of the plurality of lighting devices, a comparison portion that compares the target illumination information and the sampled illumination information, and a first transmitter portion that transmits a comparison result in the comparison portion;

wherein the lighting devices include a first receiver portion that can receive the comparison result transmitted by the first transmitter portion, a judgment portion that carries out a predetermined judgment based on the received comparison result, a control portion that controls a light intensity based on a judgment result of the judgment portion, and a light source whose light intensity is controlled by the control portion;

wherein at least one of the first transmitter portion and the first receiver portion is provided with directional characteristics, and wherein, in a lighting device that is included in the plurality of lighting devices and that received the comparison result, the control portion controls the light intensity of the light source based on the judgment result such that the sampled illumination approaches the target illumination.

(5) A lighting control system, including at least one local device that can transmit a comparison result between a target illumination and a sampled illumination, and a plurality of lighting devices that can receive the comparison result and to which ID information is assigned, wherein the local device includes a storage portion in which target illumination information is stored, a sampling portion that acquires, as sampled illumination information, an illumination resulting from light intensities of the plurality of lighting devices, a comparison portion that compares the target illumination information and the sampled illumination information, a first transmitter portion that transmits the comparison result in the comparison portion, and a second receiver portion that can receive the ID information of the lighting devices, and the first transmitter portion transmits at least one of the received ID information included in the ID information transmitted from the plurality of lighting devices, in addition to the comparison result;

wherein the lighting devices include an ID storage portion in which the assigned ID information of their own is stored, a second transmitter portion that transmits the ID information of their own, a first receiver portion that can receive the comparison result and the ID information that are transmitted by the first transmitter portion, a judgment portion that carries out a predetermined judgment based on the received comparison result and the received ID information, a control portion that controls a light intensity in accordance with a judgment result of the judgment portion, and a light source whose light intensity is controlled by the control portion;

wherein at least one of the first transmitter portion, the first receiver portion, the second transmitter portion and the second receiver portion is provided with directional characteristics; and wherein, in a lighting device that is included in the plurality of lighting devices and that received the comparison result and the ID information that are transmitted from the local device, when the judgment portion judges that the ID information of its own is included in the received ID information, the control portion controls the light intensity of the light source based on the judgment result such that the sampled illumination approaches the target illumination.

(6) A lighting control system, including at least one local device that can transmit a comparison result between a target illumination and a sampled illumination, and a plurality of lighting devices that can receive the comparison result and to which ID information is assigned, wherein the local device includes a storage portion in which target illumination information is stored, a sampling portion that acquires, as sampled illumination information, an illumination resulting from light intensities of the plurality of lighting devices, a comparison portion that compares the target illumination information and the sampled illumination information, a first transmitter portion that transmits the comparison result in the comparison portion, and a second receiver portion that can receive the ID information of the lighting devices, and the first transmitter portion transmits at least one of the ID information that could be received from the plurality of lighting devices, in addition to the comparison result;

wherein the lighting devices include a first receiver portion that can receive the comparison result and the ID information that are transmitted by the first transmitter portion, a judgment portion that carries out a predetermined judgment based on the received comparison result and the received ID information, a control portion that controls a light intensity based on a judgment result of the judgment portion, a light source whose light intensity is controlled by the control portion, and an ID storage portion in which the assigned ID information of their own is stored, and the lighting devices superpose the ID information of their own on the light intensities with the control portion and transmits them to the local device;

wherein at least one of the first transmitter portion, the first receiver portion, the light source and the second receiver portion is provided with directional characteristics; and wherein, in a lighting device included in the plurality of lighting devices and that received the comparison result and the ID information that are transmitted from the local device, when the judgment portion judges that the ID information of its own is included in the received ID information, the control portion controls the light intensity of the light source in accordance with a judgment result based on the comparison result such that the sampled illumination approaches the target illumination.

(7) A lighting control system, including at least one local device that can transmit a comparison result between a target illumination and a sampled illumination, and a plurality of lighting devices that can receive the comparison result an to which ID information is assigned, wherein the local device includes a storage portion in which target illumination information is stored, a sampling portion that acquires, as sampled illumination information, an illumination resulting from light intensities of the plurality of lighting devices and that stores the ID information, a comparison portion that compares the target illumination information and the sampled illumination information, a first transmitter portion that transmits the comparison result in the comparison portion as an optical signal, and an ID extraction portion that extracts the ID information from the information acquired by the sampling portion, and the first transmitter portion transmits at least one of the ID information extracted by the ID extraction portion, in addition to the comparison result;

wherein the lighting devices include a first receiver portion that can receive the comparison result and the ID information that are transmitted by the first transmitter portion, a judgment portion that carries out a predetermined judgment based on the comparison result and the ID information that are received, a control portion that controls a light intensity in accordance with a judgment result of the judgment portion, a light source whose light intensity is controlled by the control portion, and an ID storage portion in which the assigned ID information of their own is stored, and the lighting devices superpose the ID information of their own on the light intensities with the control portion and transmits them to the local device;

wherein at least one of the first transmitter portion, the first receiver portion, the light source and the sampling portion is provided with directional characteristics; and wherein, in a lighting device that is included in the plurality of lighting devices and that could receive the comparison result and the ID information transmitted from the local device, when the judgment portion judges that the ID information of its own is included in the received ID information, the control portion controls the light intensity of the light source in accordance with a judgment result based on the comparison result such that the sampled illumination approaches the target illumination.

(8) A lighting control system, including at least one local device that can transmit a comparison result between a target illumination and a sampled illumination, and a plurality of lighting devices that can receive the comparison result and to which ID information is assigned, wherein the local device includes a storage portion in which target illumination information is stored, a sampling portion that acquires, as sampled illumination information, an illumination resulting from light intensities of the plurality of lighting devices, a comparison portion that compares the target illumination information and the sampled illumination information, and a first transmitter portion that transmits the comparison result in the comparison portion, and the first transmitter portion transmits at least one of the ID information of the lighting devices, in addition to the comparison result, to designate the lighting device(s);

wherein the lighting devices include a first receiver portion that can receive the comparison result and the ID information that are transmitted by the first transmitter portion, a judgment portion that carries out a predetermined judgment based on the comparison result and the ID information that are received, a control portion that controls a light intensity based on a judgment result of the judgment portion, and a light source whose light intensity is controlled by the control portion:

wherein at least one of the first transmitter portion and the first receiver portion is provided with directional characteristics; and wherein, in a lighting device that is included the plurality of lighting devices and that received the comparison result and the ID information that are transmitted from the local device, when the judgment portion judges that the ID information of its own is in included in the received ID information, the control portion controls the light intensity of the light source in accordance with the judgment result such that the sampled illumination approaches the target illumination.

(9) The lighting control system according to any of (5) to (8), wherein the first receiver portion has a transmission-reception function to enable transmission and reception among the plurality of lighting devices.

(10) The lighting control system according to any of (4) to (8), wherein communication between the first receiver portion and the first transmitter portion is carried out via an optical signal.

(11) The lighting control system according to (5), wherein communication between the second receiver portion and the second transmitter portion is carried out via an optical signal.

(12) The lighting control system according to any of (5) to (8), wherein the local device selects the lighting device(s) by selecting at least one of, or all of the received ID information and transmitting the ID information to the lighting devices.

(13) The lighting control system according to any of (1) to (8), wherein, when selection by the directional characteristics, or selection by receiving the selection information, the light intensity setting information, the comparison result, and the ID information of its own is not made, each of the lighting devices is controlled such that the light source is not lighted up or that the light intensity is changed to a predetermined value or lower after a predetermined time.

(14) The lighting control system according to any of (4) to (8), wherein the comparison portion outputs information on which of the sampled illumination and the target illumination is larger as a comparison result, and, in the lighting devices, the control portion reduces the light intensity of the light source when a comparison result that the sampled illumination is larger than the target illumination is received and the judgment portion judges that the light intensity should be reduced, and the control portion increases the light intensity of the light source when a comparison result that the sampled illumination is smaller than the target illumination is received and the judgment portion judges that the light intensity should be increased, thereby causing the sampled illumination to approach the target illumination.

(15) The lighting control system according to any of (4) to (8), wherein the comparison portion outputs information on which of the sampled illumination and the target illumination is larger as a comparison result, and, in the lighting devices, the control portion carries out control to reduce the light intensity of the light source by a first predetermined value when a comparison result that the sampled illumination is larger than the target illumination is received and the judgment portion judges that the light intensity should be reduced, the control portion carries out control to increase the light intensity of the light source by a second predetermined value when a comparison result that the sampled illumination is smaller than the target illumination is received and the judgment portion judges that the light intensity should be increased, and each of the lighting devices selects at least one of the first predetermined value and the second predetermined value as a random value, thereby causing the sampled illumination to approach the target illumination.

(16) The lighting control system according to any of (4) to (8), wherein the comparison portion outputs information on which of the sampled illumination and the target illumination is larger as a comparison result, and, in the lighting devices, the control portion carries out control to reduce the light intensity of the light source by a first predetermined value when a comparison result that the sampled illumination is larger than the target illumination is received and the judgment portion judges that light intensity reduction control should be carried out, the control portion carries out control to increase the light intensity of the light source by a second predetermined value when a comparison result that the sampled illumination is smaller than the target illumination is received and the judgment portion judges that light intensity increase control should be carried out, a portion of the lighting devices carries out one of the reduction control and the increase control, a number of the lighting devices that is larger than the number of the lighting devices of said portion carries out the other, and the lighting devices that carry out the reduction control and the light increase control are switched in sequence, thereby causing the sampled illumination to approach the target illumination.

(17) The lighting control system according to any of (5) to (8), wherein the local device further includes a lighting device designating portion that selects, from the received ID information, the ID information for designating the lighting devices that carry out the reduction control or the light increase control by transmitting the ID information;

wherein the comparison portion outputs information on which of the sampled illumination and the target illumination is larger as a comparison result;

wherein the lighting device designating portion selects the ID information of the lighting devices that will reduce the light intensities, when the comparison result is that the sampled illumination is larger than the target illumination, and transmits the comparison result and the ID information to said lighting devices, and selects the ID information of the lighting devices that will increase the light intensities, when the comparison result is that the sampled illumination is smaller than the target illumination, and transmits the comparison result and the ID information to said lighting devices;

wherein, in the lighting devices that received the comparison result and the ID information of their own, the control portion carries out control to reduce the light intensity of the light source by a first predetermined value when a comparison result that the sampled illumination is larger than the target illumination is received and the judgment portion judges that the light intensity should be reduced, and the control portion carries out control to increase the light intensity of the light source by a second predetermined value when a comparison result that the sampled illumination is smaller than the target illumination is received and the judgment portion judges that the light intensity should be increased; and wherein the ID information is selected such that a portion of the lighting devices carries out one of the reduction control and the light increase control, and a number of the lighting devices that is larger than the number of the lighting devices of said portion carries out the other, thereby causing the sampled illumination to approach the target illumination.

(18) The lighting control system according to any of (4) to (8), wherein the judgment portion carries out a judgment as to whether a predetermined condition is met, based on the received comparison result, and supplies a judgment result to the control portion;

wherein the control portion can carry out, based on the judgment result, light variation control in which a light intensity value is changed from a current light intensity value in accordance with a predetermined amount of light variation, and return control in which the light intensity value is returned to a direction reverse to the light variation control;

wherein the sampled illumination is generated based on the light intensity values controlled by the control portions of the plurality of lighting devices;

wherein, among a first control in which, when the judgment by the judgment portion is that the predetermined condition is met, the lighting devices including at least one lighting device other than the lighting device that carried out the previous light variation control are selected to perform light variation control, a second control in which, when the judgment result is that the predetermined condition is not met, in order to meet the predetermined condition, any of the plurality of lighting devices or the lighting devices including at least one of the lighting devices that carried out the previous light variation control perform the return control so that the predetermined condition is met, and then the lighting devices including at least one lighting device other than the lighting device that carried out the previous light variation control is selected to perform light variation control, a third control in which, when the judgment result is that the predetermined condition is met, at least one of the plurality of lighting devices is selected, and the selected lighting device performs the light variation control until the judgment of the judgment portion indicates that the predetermined condition is not met, and a fourth control in which, when the judgment result is that the predetermined condition is not met, in order to meet the predetermined condition, any of the plurality of lighting devices or the lighting device including at least one of the lighting devices that carried out the previous light variation control perform the return control such that the predetermined condition is met, and then the lighting devices including at least one lighting device other that the lighting devices that carried out the previous light variation control is selected to perform the light variation control until the judgment of the judgment portion indicates that the predetermined condition is not met, the first control and the second control are carried out to cause the sampled illumination to approach the target illumination, or, among the third control and the fourth control, at least the fourth control is repeated to cause the sampled illumination to approach the target illumination.

(19) The lighting control system according to (18), wherein a single lighting device other than the lighting devices that carried out the previous light variation control is selected in the first control, and the lighting devices including said single lighting device carry out the return control in the second control; or, wherein a single lighting device is selected from the plurality of lighting devices in the third control, and, in the fourth control, a single lighting device is selected from the lighting devices other than the lighting devices that carried out the previous light variation control to perform light variation control, and the lighting devices including said single lighting device carry out the return control.

(20) The lighting control system according to any of (4) to (8), wherein the judgment portion carries out a judgment as to whether a predetermined condition is met, based on the received comparison result, and supplies a judgment result to the control portion;

wherein the control portion can carry out, based on the judgment result, light variation control in which a light intensity value is changed from a current light intensity value in accordance with a predetermined amount of light variation, and return control in which the light intensity value is returned to a direction reverse to the light variation control;

wherein the sampled illumination is generated based on light intensity values controlled by the plurality of lighting devices;

wherein the lighting devices respectively carry out the light variation control, and, when the judgment is that the predetermined condition is not met after the light variation control, at least a portion of the lighting devices carries out the return control in order to meet the predetermined condition; and wherein the sampled illumination is caused to approach the target illumination by applying, for each of the lighting devices, at least one of: setting of the predetermined amount of light variation as an amount that is varied randomly; setting of a return variation amount in the return control as an amount that is varied randomly; random changing of a timing for carrying out the light variation control; and random changing of the frequency of the light variation control.

(21) The lighting control system according to any of (4) to (20), wherein, when the comparison result in the local device is expressed as two values, only one state of the two values is supplied to the judgment portion as the comparison result, thereby causing the sampled illumination to approach the target illumination.

(22) The lighting control system according to any of (18) to (20), wherein when there is a single local device in the lighting control system, the judgment portion judges that the predetermined condition is met when the comparison result is that the sampled illumination and the target illumination are in a constant relation and judges that the predetermined condition is not met when the comparison result is that the sampled illumination and the target illumination are not in a constant relation;

wherein when there are a plurality of local devices and at least two comparison portions, the judgment portions of the lighting devices judge that the predetermined condition is met when the comparison results are that the sampled illuminations and the corresponding target illuminations are all in a constant relation and judges that the predetermined condition is not met when the comparison results are that at least one is not in a constant relation; and wherein the constant relation is a relation in which, when the predetermined amount of light variation is a decrement, the sampled illumination is larger than the corresponding target illumination, and a relation in which, when the predetermined amount of light variation is an increment, the sampled illumination is smaller than the corresponding target illumination.

(23) The lighting control system according to any of (18) to (20), wherein, when the light intensity values of the lighting devices that received the comparison result are initially set to their respective maximum or minimum values or when the predetermined condition is not met, the respective light intensity values are changed in a direction of variation in the return control so that the predetermined condition is met.

(24) The lighting control system according to any of (18) to (20), wherein all the lighting devices that received the comparison result carry out the return control.

(25) The lighting control system according to any of (18) to (20), wherein the return amount of light variation in the return control is a return amount of light variation by which a state before the previous light variation control is restored, or an arbitrary return amount of light variation that is returned to a direction reverse to a direction of control in the previous light variation control.

(26) The lighting control system according to any of (18) to (20), wherein at least one of the predetermined amount of light variation and the amount of light variation in return control is an amount of light variation based on a difference between the sampled illumination and the target illumination.

(27) The lighting control system according to any of (18) to (20), wherein at least one of the predetermined amount of light variation and the amount of light variation in return control is set for each of the lighting devices.

(28) The lighting control system according to any of (18) to (20), wherein at least one of the predetermined amount of light variation and the amount of light variation in return control is reduced in response to a convergence in which the sampled illumination approaches the target illumination, or reduced along with a passing of time until convergence.

(29) The lighting control system according to any of (18) to (20), wherein the number of lighting devices selected from the lighting devices that receive the comparison result to carry out light variation control is caused to approach one in response to a convergence in which the sampled illumination approaches the target illumination.

(30) The lighting control system according to any of (4) to (8), wherein the judgment portion generates an evaluation value base on the received comparison result, and supplies a judgment result based on the evaluation value to the control portion;

wherein the control portion can change a light intensity value, based on the judgment result obtained from the judgment portion; and wherein at least one of the plurality of lighting devices that received the comparison result randomly changes a current light intensity value, and narrows the range of light intensity value that is randomly changed, based on the judgment result obtained from the judgment portion, thereby causing the sampled illumination to approach the target illumination.

(31) The lighting control system according to (30), wherein the plurality of lighting devices that received the comparison result respectively change current light intensity values randomly, and narrow the range of light intensity values that are randomly changed, based on the judgment result obtained from the judgment portion, thereby causing the sampled illumination to approach the target illumination.

(32) The lighting control system according to (30), wherein a plurality of local devices are provided, the judgment portion totals the comparison results obtained from the comparison portions of the plurality of local devices to calculate an evaluation value, carries out a judgment, supplies a judgment result to the control portion and the control portion narrows the range of light intensity values that are randomly changed, based on the obtained judgment result, thereby causing the sampled illumination to approach the target illumination.

(33) The lighting control system according to (30), wherein the comparison portion transmits, as the comparison result, difference information in which the sampled illumination and the corresponding target illumination are compared, the judgment portion totals the received comparison results to calculate an evaluation value, carries out a judgment, and supplies a judgment result to the control portion, and the control portion narrows the range of light intensity values that are randomly changed so as to increase an occurrence rate of light intensity values corresponding to evaluations of small difference information, based on the obtained judgment result, thereby causing the sampled illumination to approach the target illumination.

(34) The lighting control system according to (30), wherein the comparison portion transmits large-small information indicating which of the sampled illumination and the corresponding target illumination is larger, the judgment portion totals the received large-small information to calculate an evaluation value, carries out a judgment, and supplies a judgment result to the control portion, and the control portion narrows the range of light intensity values that are randomly changed so as to counterbalance large information and small information of the large-small information, based on the obtained judgment result, thereby causing the sampled illumination to approach the target illumination.

(35) The lighting control system according to any of (18) to (34), wherein at least one of the light intensity value in the light variation control and the light intensity value in the return control is varied continuously.

(36) The lighting control system according to any of (4) to (35), wherein at least one of the light intensity values of the plurality of lighting devices, the sampled illumination and the target illumination is output to a display.

(37) The lighting control system according to any of (4) to (36), wherein light intensity values of the lighting devices at a final stage of the convergence can be stored and the light intensity values of the lighting devices can be reproduced by receiving an instruction

(38) A light source constituting the lighting control system according to any of (1) to (37).

(39) A lighting device constituting the lighting control system according to any of (1) to (37).

(40) A local device constituting the lighting control system according to any of (1) to (37).

With the above-described lighting control system, it is possible to easily select a desired lighting device and to set the light intensity, thereby controlling the illumination at a desired location at a desired value. In an environment in which numerous lighting devices are installed, it is possible to let a part of all the lighting devices, for example, the necessary lighting devices perform control, making it possible to shorten the control time and reducing a waste of illumination.

BRIEF DESCRIPTION OF THE DRAWINGS

FIG. 18 shows an example of an evaluation value table used in a lighting control system according to the present invention.

BEST MODE FOR CARRYING OUT THE INVENTION

Figure 1:
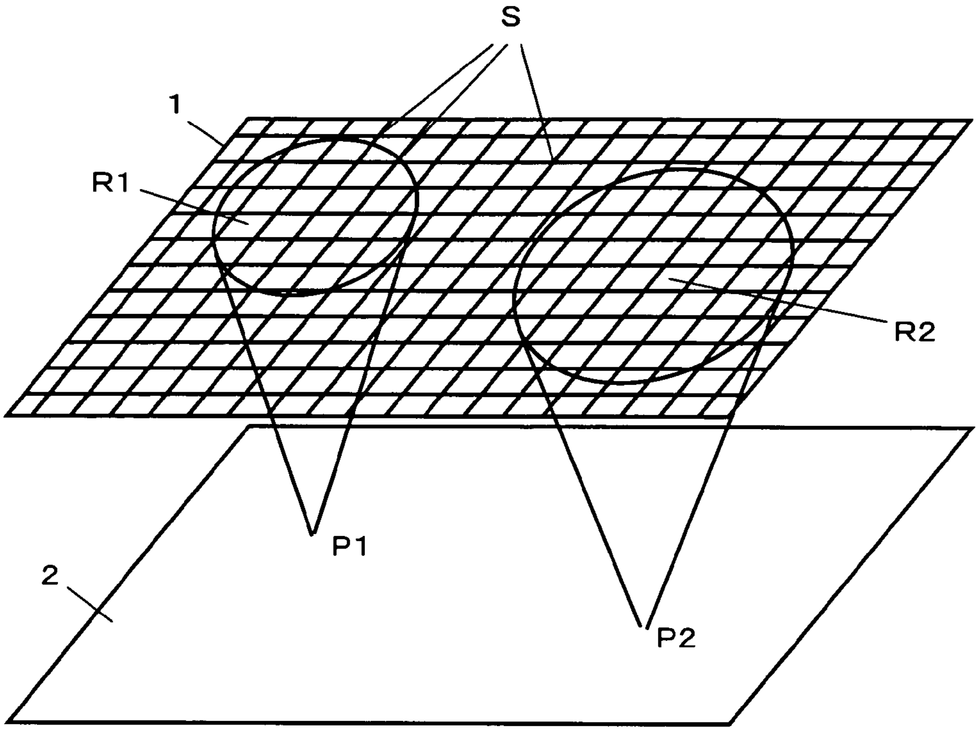
FIG. 1 is a diagram schematically showing a hall, a conference room or the like to which the present invention is applied.

Hereinafter, embodiments of a lighting control system according to the present invention will be described with reference to the accompanying drawings. It should be noted that in the case where structural elements to which identical reference numerals are attached in the embodiments carry out identical operations, duplicate description may be omitted.

FIG. 1 is a diagram schematically showing a hall, a conference room or the like to which the present invention is applied. A plurality of lighting devices are provided on a ceiling 1. It is assumed that the lighting devices are disposed at intersection points S of the mesh of the ceiling in FIG. 1. In the case of FIG. 1, 198 lighting devices arranged in 11 columns and 18 rows are provided. A local device, which will be described later, is provided at positions P1, P2 and so on, on a floor surface 2. The local device can be moved. The local device may also be placed on a conference table or the like, away from the floor surface. The local device emits a transmission medium, for example, light that is hardly visible to eyes, such as infrared light, towards the ceiling. Such light contains selection information that is information relating to selection of the lighting devices. Light emitted from the position P1 reaches an area R1 on the ceiling surface. The lighting devices in the area R1 that received the selection information are lighted up. Light emitted from the position P2 reaches an area R2 on the ceiling surface. The lighting devices in the area R2 that received the selection information are also lighted up. The lighting devices that do no receive the selection information are turned off. It is possible to control the light intensities of the lighting devices by superposing information relating to light intensity on the selection information and sending it, or by sending light intensity setting information as the selection information. It is also possible to control the light intensities of the lighting device to control the illuminations at the position P1, P2 and so on, by superposing information relating to illumination on the selection information and sending it, or by sending information relating to illumination as the selection information.

The lighting devices may send the selection information to the local devices, which are located in a predetermined range near positions directly below them, and only those lighting devices from which the local devices could receive the selection information may be lighted up.

Here, sending the selection information refers to transmitting information representing selection in the form of a code on the transmission medium, but also refers to delivering the transmission medium itself to the intended lighting devices or local devices. That is, the selection information may be in the form of a code, or may be a transmission medium. An example of the above-described information in the former case is ID information, which will be described later. In the latter case, selection is made by providing directional characteristics. In order to provide directional characteristics to the transmission medium, there are a method in which the transmission direction of the transmission medium is restricted at the time of transmission, and a method in which the reception direction of the transmission medium is restricted at the time of reception.

In the following, more specific embodiments of the present invention are described.

Embodiment 1

Figure 2:
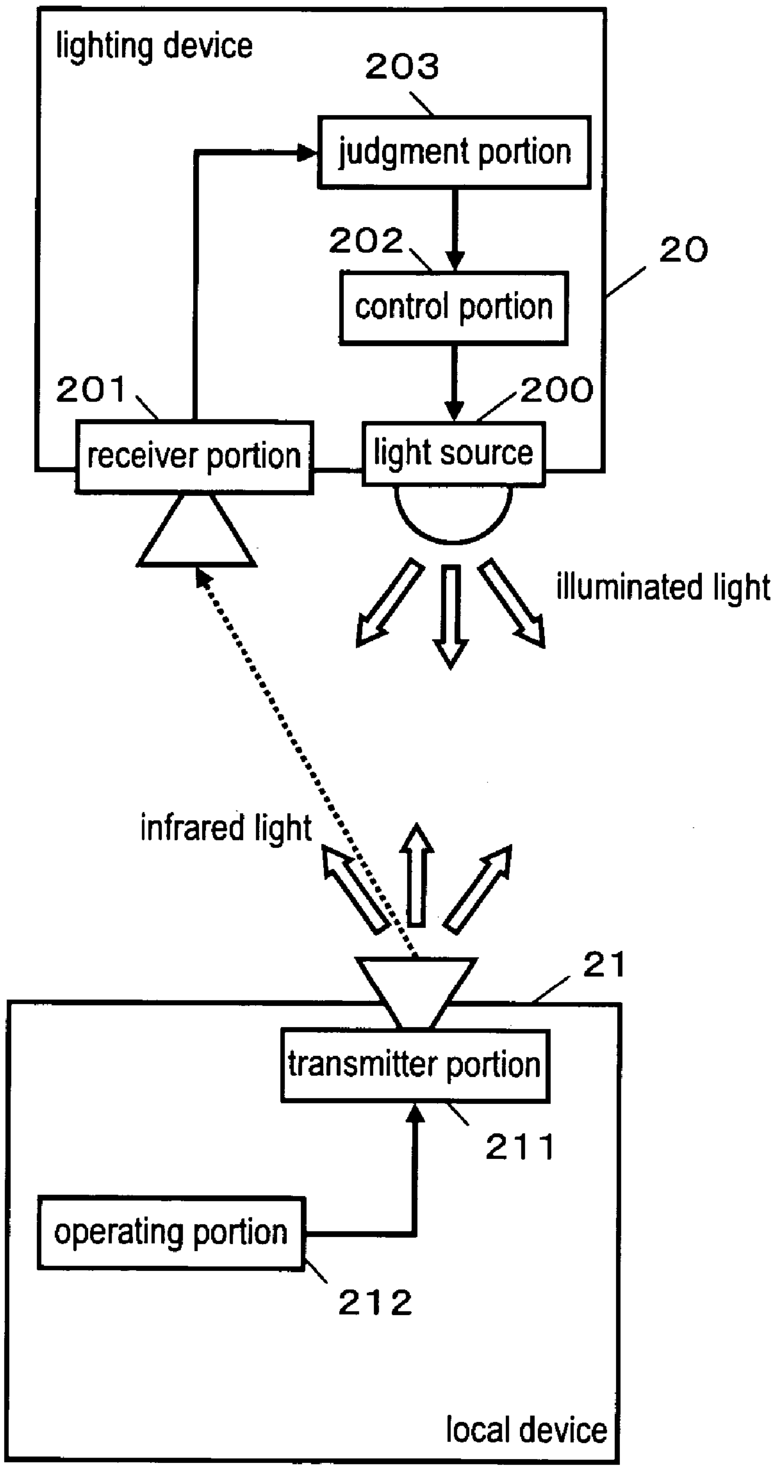
FIG. 2 is a block diagram of one embodiment of a lighting control system according to the present invention.

FIG. 2 is a block diagram of a lighting control system according to the present invention, in which the lighting devices are selectively lighted up using the local device.

A plurality of lighting devices 20 are provided on the ceiling. A local device 21 is placed near the floor. The local device 21 includes an operating portion 212 and a transmitter portion 211. When the operating portion 212 performs an operation for lighting instruction, the operating portion 212 outputs lighting information corresponding to the content of the instruction, and supplies it to the transmitter portion 211. In the case of the lighting instruction, the transmitter portion 211 emits the selection information in the form of infrared light towards the ceiling, in accordance with the supplied lighting information. The selection information is information indicating that those lighting devices that received this information are selected. That is, it is information that can represent selection of the lighting devices. It is assumed that the infrared light has predetermined directional characteristics. For example, infrared light having an intensity equal to or greater than a certain level is emitted in directions forming a cone with a direction directly above the local device 21 as the central axis, and no emission is performed, or weak infrared light is emitted in the other directions. Emitting the selection information means emitting infrared light with the above-described directional characteristics. It is also possible to superpose a code indicating selection, for example, a code indicating lighting-up, on the infrared light, and emit it.

Each of the plurality of lighting devices 20 includes a light source 200, a receiver portion 201, a control portion 202, and a judgment portion 203. The receiver portion 201 includes an element for detecting infrared radiation, and is capable of extracting the selection information. The extracted selection information is supplied to the judgment portion 203. When the judgment portion 203 receives the selection information, it provides a light-up instruction to the control portion 202, and the control portion 202 causes the light source 200 to emit light by supplying electric power. Here, extracting the selection information means that, when the receiver portion 201 is within the range of the directional characteristics, infrared radiation having a power equal to or greater than a certain level reaches the receiver portion 201 and then detected. Alternatively, it is also possible to determine that the selection information is extracted, if a code indicating selection of infrared radiation is superposed and sent, and the code is detected at the receiver portion 201. The judgment carried out by the judgment portion 203 is a judgment as to whether the receiver portion 201 detected infrared light or the above-described code. Accordingly, when the above-described judgment carried out by the judgment portion 203 is carried out by the receiver portion 201, the judgment portion 203 may be omitted.

Those lighting devices that do not receive the selection information remain turned off. Even in the case of those lighting devices that have once been lighted up, if they do not receive the selection information any longer, then the judgment portion 203 detects that the selection information has not been received for a certain time td or longer, and provides a turn-off instruction to the control portion 202. The control portion 202 stops supplying electric power to the light source 200.

Since the infrared light has directional characteristics at the transmitter portion 211, the selection information is not transmitted to all the lighting devices. When the local device 21 is placed at the position P1 in FIG. 1, the selection information reaches only the lighting devices located in the area R1, and the lighting devices in the area R1 are lighted up. Accordingly, a part of the floor surface that is below the surface area R1 will be illuminated. When the local device 21 is moved, the area R1 moves on the ceiling surface. The lighting devices that are out of the area R1 are turned off after td, and the lighting devices that newly entered the region of the area R1 are lighted up. Accordingly, the illuminated position of the floor surface also moves. Even if all the ceiling lights are turned off, one can walk from the entrance of the hall to a desired location, with the local device 21 pointed upwards, thereby reaching the desired location while throwing light on the area surrounding his or her feet on the way, and illuminating that location.

By providing a second local device 21 at the position P2 in FIG. 1, it is possible to light up the lighting devices in the area R2. When the areas R1 and R2 overlap, the lighting devices located in both of the areas are lighted up.

It is also possible to weakly light the lighting devices that are out of the area R1, instead of completely turning them off. By doing this, the path from the entrance to the position P1 is illuminated to such an extent that the area surrounding the feet is visible.

The operation of outputting the selection information that is performed by the operating portion 212 may be carried out by operating a switch for light-up instruction that is provided in the local device, or may be carried out in accordance with the operation of turning the power switch of the local device 21 on. The operation of sending the selection information can be simply carried out by performing an operation of continuously emitting infrared light by the transmitter portion 211. As has been already described, the selection information may be represented by a predetermined code, and the transmitter portion 211 may modulate the infrared light using the code. In this case, the receiver portion 201 demodulates the received signal of infrared light, and extracts the selection information code. When the extracted code matches the predetermined code, the judgment portion 203 judges that the selection information is received, and provides light-up instruction to the control portion 202. This makes it possible to prevent the lighting devices from being accidentally lighted up due to disturbance light from the light sources other than the local device 21. Preferably, the infrared radiation sensor of the receiver portion 201 is sensitive to only a predetermined wavelength range.

In the above description, the infrared light of the transmitter portion 211 is provided with directivity. However, it is also possible to provide directivity to the reception characteristics, that is, the light reception characteristics of the receiver portion 201.

The receiver portion 201 may extract the selection information if it receives infrared light having a power that is equal to or greater than a certain level. Hysteresis characteristics may be provided for power detection. This can prevent the lighting devices from blinking unstably. It is also possible to judge that the selection information is received if infrared light having a power equal to or greater than a certain level is received.

The transmitter portion 211 may modulate the amplitude of the infrared light with a predetermined frequency and send this, and it is possible to judge that the selection information is received if the receiver portion 201 or the judgment portion 203 demodulates the modulated amplitude and detects the predetermined frequency.

Light-emitting diodes or receiving elements generally have directional characteristics. Directional characteristics are often represented by angle θ, at which the value of light emission power or reception sensitivity, that is, light reception sensitivity is a half of that in the frontal direction. There exist elements having various angles θ, such as 15 degree, 30 degree, 60 degree and 80 degree. These directional characteristics may be utilized as they are. It is possible to combine several elements in which θ=15 degree to realize a wider directivity angle. In the case of an element having wide angle directivity such as 80 degree, it is possible to use a light guide having a megaphone-like shape to obtain desired narrow directional characteristics. The shape of the light guide may be changeable to change the directional characteristics. By doing this, it is possible to select between a case where a relatively large number of lighting devices are lighted up, and a case where a small number of lighting devices are lighted up. Furthermore, with the light guide, it is also possible to provide a strong power only in directions forming a cone in a predetermined angle relative to the frontal direction, and minimize the power and the sensitivity in directions outside the cone.

Embodiment 2

Figure 3:
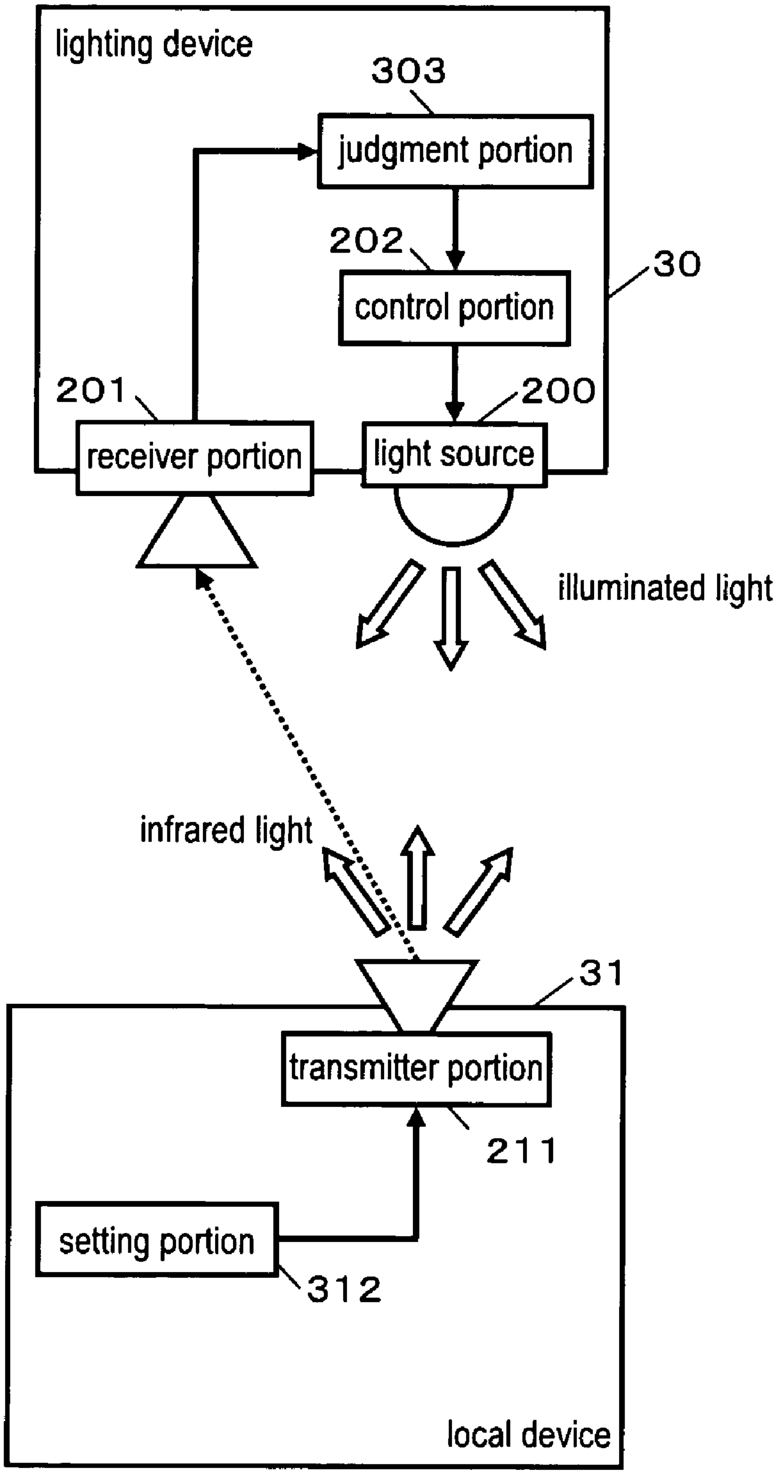
FIG. 3 is a block diagram of one embodiment of a lighting control system according to the present invention.

FIG. 3 is a block diagram of a lighting control system according to the present invention, in which the lighting devices are selectively light up using the local device, and a desired light intensity is set.

A plurality of lighting devices 30 are provided on the ceiling. A local device 31 is usually placed near the floor. The local device 31 includes a setting portion 312 and a transmitter portion 211. After the setting portion 312 performs an operation for instructing lighting and setting light intensity, the setting portion 312 outputs light intensity setting information, and supplies it to the transmitter portion 211. The transmitter portion 211 emits the supplied light intensity setting information towards the ceiling by carrying it on an infrared radiation transmission medium. It should be noted that the infrared light has predetermined directional characteristics. For example, it emits infrared light having an intensity equal to or greater than a certain level in directions forming a cone with a direction directly above the local device 31 as the central axis, and it does not perform emission, or emits infrared light with equal to or greater than a predetermined value in other directions.

Each of the plurality of lighting devices 30 includes a light source 200, a receiver portion 201, a control portion 202, and a judgment portion 303. The receiver portion 201 includes an element for detecting infrared radiation, and is capable of extracting the light intensity setting information from the received infrared radiation. The extracted light intensity setting information is supplied to the judgment portion 303. When the judgment portion 303 receives the light intensity setting information, it provides an instruction to light up at a light intensity according to the light intensity setting information to the control portion 202, and the control portion 202 causes the light source 200 to emit light by supplying electric power according to the light intensity setting information. It should be noted that the judgment performed by the judgment portion 303 refers to judging whether the light intensity setting information is correct and receiving the light intensity setting information, or simply receiving the light intensity setting information as correct information. Furthermore, delivering the light intensity setting information to the lighting device corresponds to selection of the lighting device. Accordingly, when the above-described judgment performed by the judgment portion 303 is performed by the receiver portion 201, the judgment portion 303 may be omitted. Alternatively, the above-described judgment performed by the judgment portion 303 may also be performed by the control portion 202.

Those lighting devices that do not receive the light intensity setting information remain turned off. Even in the case of those lighting devices that have once been lighted up, if they do not receive the light intensity setting information any longer, then the judgment portion 203 detects that the light intensity setting information has not been received for a certain time td or longer, and provides a turn-off instruction to the control portion 202. The control portion 202 stops supplying electric power to the light source 200.

Since the infrared light has directional characteristics at the transmitter portion 211, the light intensity setting information is not transmitted to all the lighting devices. When the local device 21 is placed at the position P1 in FIG. 1, the light intensity setting information reaches only the lighting devices located in the area R1, and these lighting devices are lighted up. Accordingly, a part of the floor surface that is below the surface area R1 will be illuminated. When the local device 21 is moved, the area R1 moves. The lighting devices that are out of the area R1 are turned off after td, and the lighting devices that newly entered the region of the area R1 are lighted up. Accordingly, the illuminated position of the floor surface also moves. Even if all the ceiling lights are turned off, one can walk from the entrance of the hall to a desired location, with the local device 21 pointed upwards, thereby reaching the desired location while throwing light on the area surrounding his or her feet, and illuminating that location.

By providing a second local device 21 at the position P2 in FIG. 1, it is possible to light up the lighting devices in the area R2. When the areas R1 and R2 overlap, the lighting devices located in both of the areas are lighted up. The lighting devices that received two pieces of light intensity setting information may select one of the light intensity setting information for lighting up, or calculate the average light intensity setting information and light up with the average light intensity.

It is also possible to weakly light the lighting devices that are out of the area R1, instead of completely turning them off. By doing this, the path from the entrance to the position P1 is illuminated to such an extent that the area surrounding the feet is visible.

The operation of outputting the light intensity setting information that is performed by the setting portion 312 may be carried out by operating a dial for setting light intensity that is provided in the local device. The light intensity setting information is represented by a predetermined code, and the transmitter portion 211 demodulates the infrared light using the code and transmits this. The receiver portion 201 modulates the received signal of infrared light, and extracts the code of the light intensity setting information.

In the above description, the infrared light of the transmitter portion 211 is provided with directional characteristics. However, it is also possible to provide directivity to the reception characteristics of the receiver portion 201.

The receiver portion 201 may extract the selection information if it receives infrared light having a power that is equal to or greater than a certain level. Hysteresis characteristics may be provided for power detection.

As described in Embodiment 1 above, light-emitting diodes or receiving elements generally have directional characteristics. These directional characteristics may be utilized, but it is also possible to use a light guide having a megaphone-like shape to obtain desired narrow directional characteristics. The shape of the light guide may be changeable to change the directional characteristics. By doing this, it is possible to select between a case where a relatively large number of lighting devices are lighted up, and a case where a small number of lighting devices are lighted up.

Embodiment 3

Figure 4:
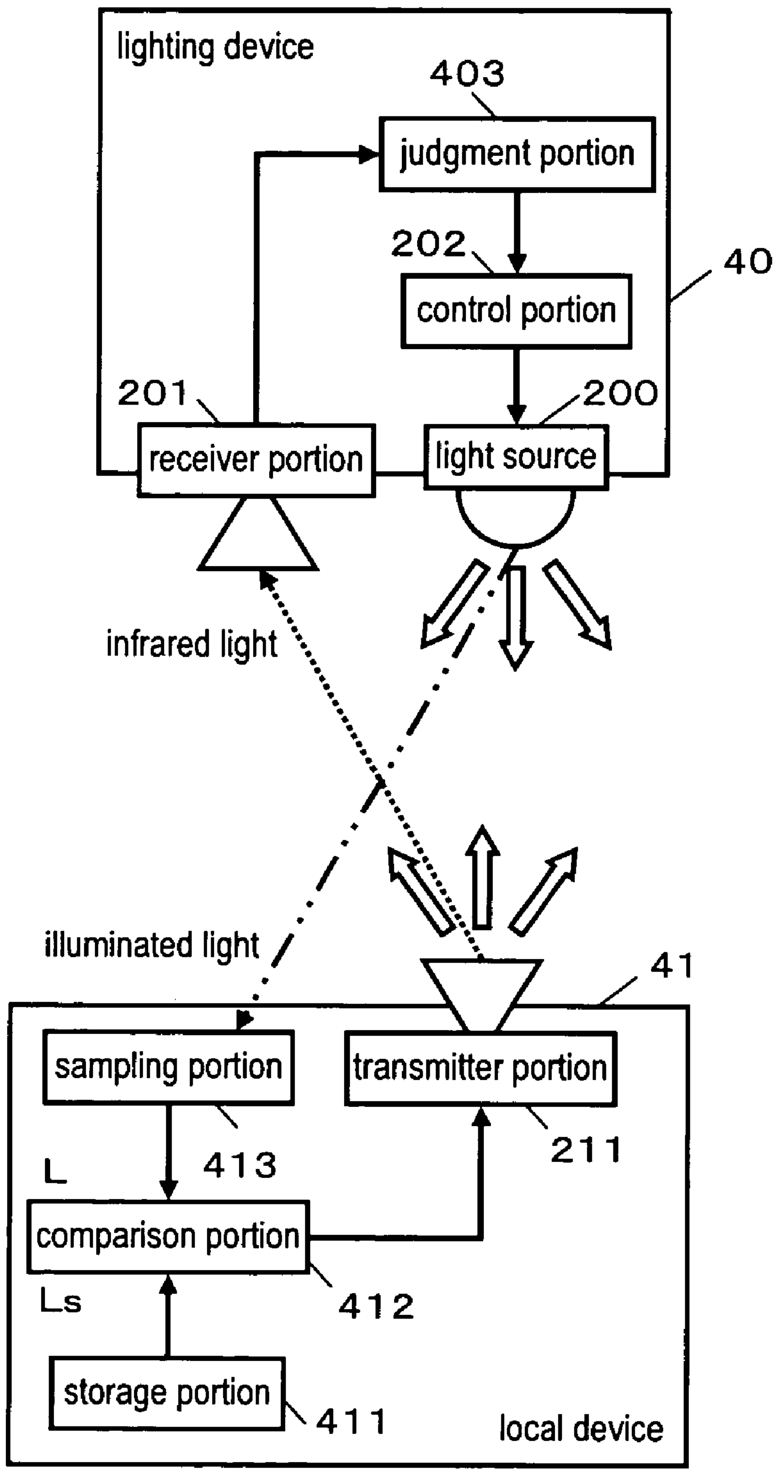
FIG. 4 is a block diagram of one embodiment of a lighting control system according to the present invention.

FIG. 4 is a block diagram of a lighting control system according to the present invention, in which the lighting devices are selectively lighted up using the local device, and the illumination at the position of the local device is set to a predetermined illumination.

A plurality of lighting devices 40 are provided on the ceiling. A local device 41 is placed near the floor. The local device 41 includes a storage portion 411, a comparison portion 412, a sampling portion 413, and a transmitter portion 211. The storage portion 411 is a memory in which target illumination information Ls, which represents a desired illumination value at the position of the local device 41, is stored. The illumination value can be set using a dial (not shown) or the like. The sampling portion 413 includes an illumination sensor for calculating the illumination resulting from the illuminated light from at least one lighting device 40 at the position of the sampling portion 413, and outputs sampled illumination information L. The comparison portion 412 compares the target illumination information Ls and the sampled illumination information L, and supplies a comparison result to the transmitter portion 211. The transmitter portion 211 emits the supplied comparison result in the form of infrared light towards the ceiling. It is assumed that the infrared light has predetermined directional characteristics, as in the cases of Embodiments 1 and 2.

Each of the plurality of lighting devices 40 includes a light source 200, a receiver portion 201, a control portion 202, and a judgment portion 403. The receiver portion 201 includes an element for detecting infrared radiation, and is capable of extracting the comparison result from the received infrared radiation. The extracted comparison result is supplied to the judgment portion 403. When the judgment portion 403 receives the comparison result, it carries out a predetermined judgment, provides an instruction to light up at a predetermined light intensity according to the comparison result to the control portion 202, and the control portion 202 causes the light source 200 to emit light by supplying electric power corresponding to the predetermined light intensity. The algorithm of setting the predetermined light intensity according to the comparison result will be described later.

Those lighting devices that do not receive the comparison result remain turned off. Even in the case of those lighting devices that have once been lighted up, if they do not receive the comparison result any longer, then the judgment portion 403 detects that the comparison result has not been received for a certain time td or longer, and provides a turn-off instruction to the control portion 202. The control portion 202 stops supplying electric power to the light source 200.

Since the infrared light has directional characteristics at the transmitter portion 211, the comparison result is not transmitted to all the lighting devices. When the local device 41 is placed at the position P1 in FIG. 1, the comparison result reaches only the lighting devices located in the area R1, and these lighting devices are lighted up. Accordingly, a part of the floor surface that is below the surface area R1 will be illuminated. When the local device 41 is moved, the area R1 moves. The lighting devices that are out of the area R1 are turned off after td, and the lighting devices that newly entered the region of the area R1 are lighted up. Accordingly, the illuminated position of the floor surface also moves. Even if all the ceiling lights are turned off, one can walk from the entrance of the hall to a desired location, with the local device 21 pointed upwards, thereby reaching the desired location while throwing light on the area surrounding his or her feet, and illuminating that location with a desired illumination.

By providing a second local device 41 at the position P2 in FIG. 1, it is possible to light up the lighting devices in the area R2. When the areas R1 and R2 overlap, the lighting devices located in both areas are lighted up. Those lighting devices in the overlapped area that received two comparison results may select one of the comparison results and carry out a judgment for lighting up, or carry out a judgment according to both of the two comparison results and light up with a light intensity determined by a predetermined algorithm.

At the transmitter portion 211, the comparison result is represented by a predetermined code, and the infrared light is modulated and transmitted. At the receiver portion 201, the received signal of infrared light is demodulated, and one or a plurality of comparison result codes are extracted.

In the above description, the infrared light of the transmitter portion 211 is provided with directional characteristics. However, it is also possible to provide directivity to the reception characteristics of the receiver portion 201. It is also possible to provide directional characteristics to both the transmitter portion 211 and the receiver portion 201.

The receiver portion 201 may extract the comparison result if it receives infrared light having a power that is equal to or greater than a certain level. Hysteresis characteristics may be provided for power detection.

Light-emitting diodes or receiving elements generally have directional characteristics. To provide directional characteristics, the method same as that described in Embodiments 1 and 2 may be used.

When the above-described judgment performed by the judgment portion 403 is carried out by the receiver portion 201, the judgment portion 403 may be omitted. Alternatively, the above-described judgment performed by the judgment portion 403 may be carried out by the control portion 202.

Embodiment 4

Figure 5:
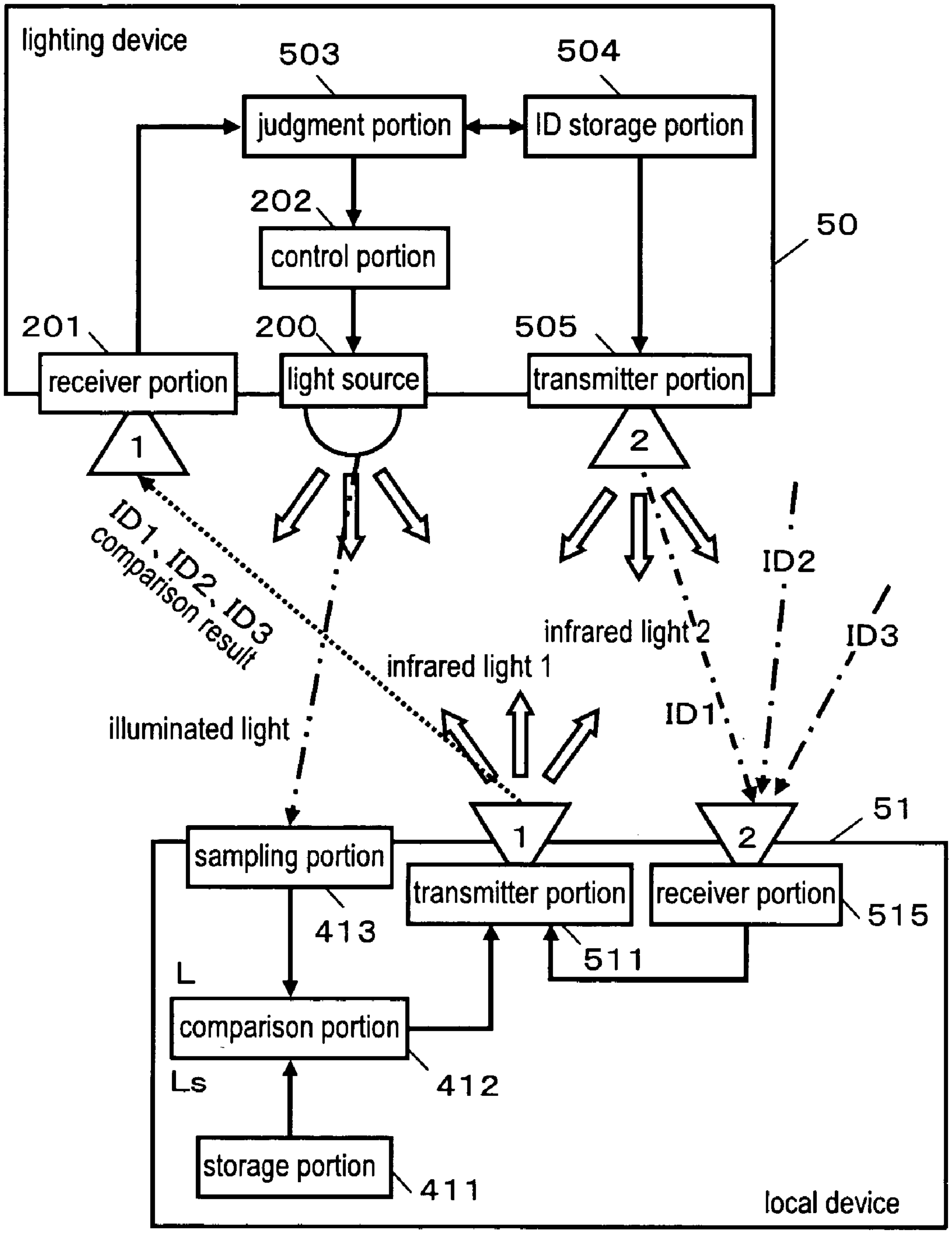
FIG. 5 is a block diagram of one embodiment of a lighting control system according to the present invention.

FIG. 5 is a block diagram of one embodiment of a lighting control system according to the present invention, in which ID information is assigned to the lighting devices, the lighting devices are selectively designated by the local device, using the ID information, and the illumination at the position of the local device is set to a desired illumination by the light sources of the designated lighting devices. It should be noted that the ID information is information for identifying the lighting devices, and there is no limitation with respect to its structure and the like.

A plurality of lighting devices 50 are provided on the ceiling. A local device 51 is placed near the floor. The local device 51 includes a storage portion 411, a comparison portion 412, a sampling portion 413, a transmitter portion 511, and a receiver portion 515. The storage portion 411 is a memory in which target illumination information Ls, which represents a desired illumination value at the position of the local device 51, is stored. The illumination value can be set using a dial (not shown) or the like. The sampling portion 413 includes an illumination sensor for calculating the illumination resulting from the illuminated light from the lighting devices on the ceiling, and outputs this illumination as sampled illumination information L. The comparison portion 412 compares the target illumination information Ls and the sampled illumination information L, and supplies a comparison result to the transmitter portion 511. The transmitter portion 511 emits the supplied comparison result in the form of infrared light 1 towards the ceiling. For example, infrared light having an intensity equal to or greater than a certain level is emitted in directions forming a cone with a direction directly above the local device 51 as the central axis, and no emission is performed, or weak infrared light is emitted in other directions.

The receiver portion 515 receives ID information, which will be described later, and supplies it to the transmitter portion 511. The transmitter portion 511 emits the received ID information in the form of infrared light 1 towards the ceiling. It should be noted that, as will be described below, there is a case in which all the received ID information is transmitted, and a case in which a portion thereof is selectively transmitted.

Each of the plurality of lighting devices 50 includes an ID storage portion 504 and a transmitter portion 505, in addition to a light source 200, a receiver portion 201, a control portion 202, and a judgment portion 503. The ID information stored in the ID storage portion 504 represents identification codes differing from each other for the plurality of lighting devices. The ID information makes it possible to identify each of the plurality of lighting devices. The ID information is supplied to the transmitter portion 505 from the ID storage portion 504, coded and then transmitted in the form of infrared light 2, which is a transmission medium.

The receiver portion 201 includes an element for detecting infrared radiation, and is capable of extracting the ID information and the comparison result from the infrared radiation 2 received from the transmitter portion 511. The extracted ID information and comparison result are supplied to the judgment portion 503. When the judgment portion 503 receives the ID information and the comparison result, it carries out a judgment process, which will be described later, provides an instruction to light up at a predetermined light intensity according to the judgment result to the control portion 202, and the control portion 202 has the function of causing the light source 200 to emit light by supplying electric power corresponding to the predetermined light intensity.

At least one of the transmitter portion 505 and the receiver portion 515 has directional characteristics as described in Embodiments 1 and 2 above. Accordingly, the infrared light 2 transmitted from the transmitter portion 505 reaches the receiver portion 515 only when it is in the field of view of the transmitter portion 505 or the receiver portion 515 that is determined by their directional characteristics. In the local device 51, the receiver portion 515 generally receives a plurality of infrared lights 2 that are transmitted from one or a plurality of lighting devices 50, extracts the ID information included in each of the infrared lights, and supplies this to the transmitter portion 511. In general, a plurality of pieces of ID information are supplied to the transmitter portion 511. For example, in FIG. 5, the receiver portion 515 receives ID information ID1, ID2 and ID3 from three lighting devices, and supplies the three pieces of ID information to the transmitter portion 511. The transmitter portion 511 transmits the three pieces of ID information ID1, ID2 and ID3 and a comparison result. Accordingly, the receiver portion 201 receives one or more pieces of ID information. The judgment portion 503 compares the received ID information with its own ID information stored in the ID storage portion 504. When ID1, which is its own ID information, is included in the received ID information, the judgment portion 503 judges that it is designated, and instructs the control portion 202 to light up the light source 200 with a predetermined light intensity, which will be described later, based on the received comparison result. The control portion 202 lights up the light source 200 in accordance with the light intensity instructed by the judgment portion 503.

Those lighting devices that do not receive their own ID information or the comparison result remain turned off. Even in the case of those lighting devices that have once been lighted up, if they do not receive their own ID information or the comparison result any longer, then the judgment portion 503 detects that its own ID information or the comparison result has not been received for a certain time td or longer, and provides a turn-off instruction to the control portion 202. The control portion 202 stops supplying electric power to the light source 200.

The transmitter portion 511 and the receiver portion 201 may or be provided with directional characteristics as with the transmitter portion 505 and the receiver portion 515, or may not be provided with directional characteristics. Since only the ID information of the lighting devices located near the position directly above the local device 51 is transmitted to a plurality of the lighting devices, only the above-described lighting devices located near the position directly above is lighted up, and the rest of the lighting devices are turned off.

Since there are directional characteristics in the transmission or reception of the infrared light 2 through emission, the ID information of a portion of the whole lighting devices is transmitted to the local device 51. When the local device 51 is placed at the position P1 in FIG. 1, the respective ID information reaches only the lighting devices located in the area R1, and these lighting devices are lighted up. Accordingly, a part of the floor surface that is below the surface area R1 will be illuminated. When the local device 51 is moved, the area R1 moves. The lighting devices that are out of the area R1 are turned off after td, and the lighting devices that newly entered the region of the area R1 are lighted up. Accordingly, the illuminated position of the floor surface also moves. Even if all the ceiling lights are turned off, one can walk from the entrance of the hall to a desired location, with the local device 51 pointed upwards, thereby reaching the desired location while throwing light on the area surrounding his or her feet, and illuminating that location.

By providing a second local device 51 at the position P2 in FIG. 1, it is possible to light up the lighting devices in the area R2. When the areas R1 and R2 overlap, the lighting devices located in one of the areas are lighted up. Those lighting devices in the overlapped area that receive two comparison results may select one of the comparison results and carry out a judgment for lighting up, or light up with a light intensity determined by a predetermined algorithm according to both of the two comparison results.

The ID information and the comparison result are represented by a predetermined code, and the transmitter portion 511 modulates the infrared light using the code and transmits this. The receiver portion 201 demodulates the received signal of the infrared light 1, and extracts the codes of the ID information and the comparison result.

The receiver portion 201 and the receiver portion 515 may extract the received information if they receive infrared light having a power that is equal to or greater than a certain level. Hysteresis characteristics may be provided for power detection.

Since the method of providing directional characteristics has already been described, its description is omitted here. Additionally, it is necessary to prevent the infrared light 2 from being leaked to the receiver portion 201, and to prevent the infrared light 1 from being leaked to the receiver portion 515. The above-described directional characteristics may also be utilized for this purpose. It is possible to use different wavelengths for the infrared light 1 and the infrared light 2, and to provide a filter for eliminating unnecessary wavelengths to the receiver portion 201 and the receiver portion 515.

It is also possible to use a radio wave in place of the infrared light 2, and to provide directional characteristics to the antenna characteristics of one of the transmitter portion 505 and the receiver portion 515. Further, directional characteristics may be provided to one of the transmitter portion 511 serving as the first transmitter portion, the receiver portion 201 serving as the first receiver portion, the transmitter portion 505 serving as the second transmitter portion, and the receiver portion 515 serving as the second receiver portion. However, providing directional characteristics to one of the transmitter portion 505 serving as the second transmitter portion and the receiver portion 515 serving as the second receiver portion is simple and more preferable. The reason is that the second receiver portion in the local device does not need to receive a larger number of ID information pieces than necessary, thus handling a required minimum number of ID information pieces.

Embodiment 5

Figure 6:
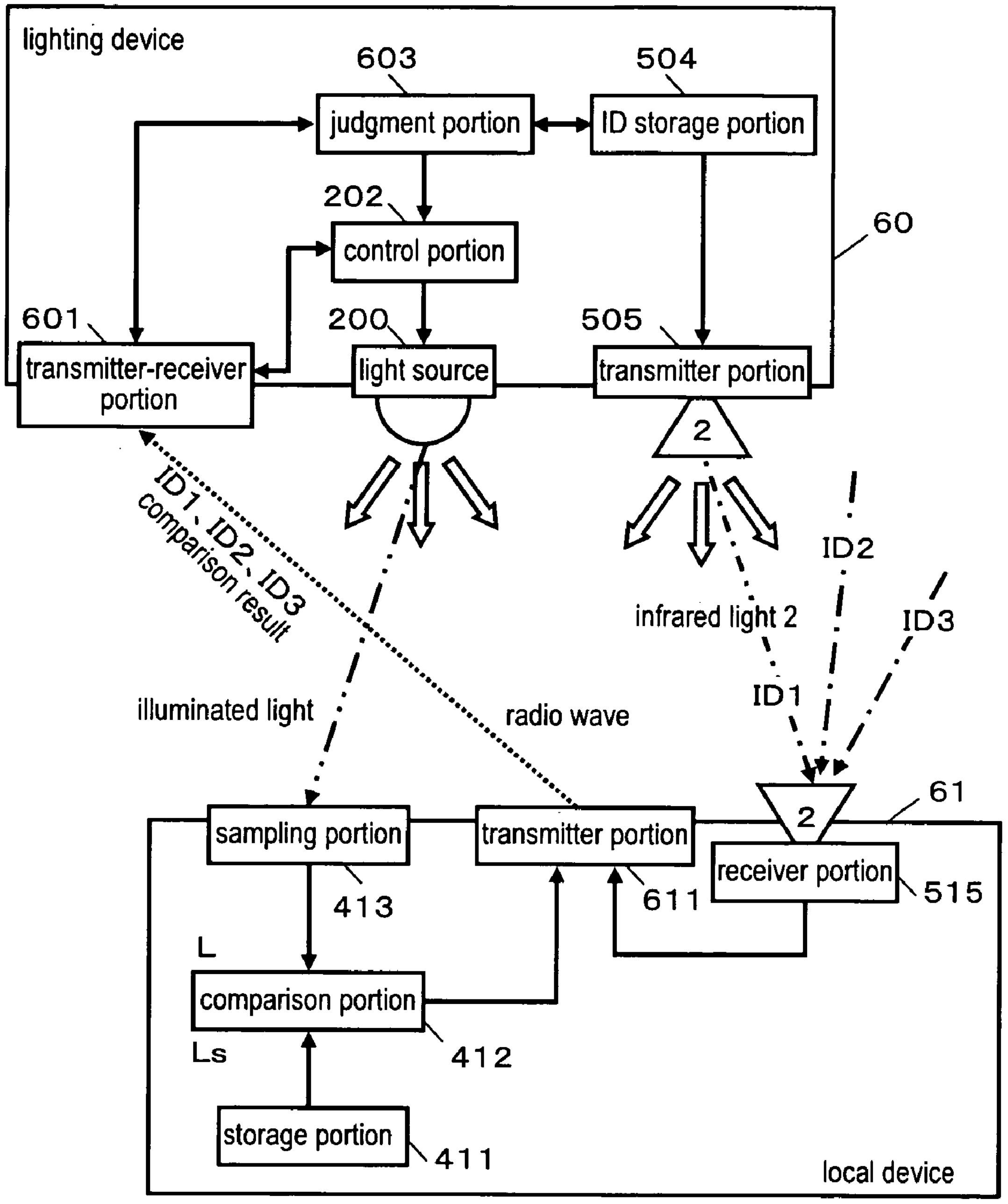
FIG. 6 is a block diagram of one embodiment of a lighting control system according to the present invention.

FIG. 6 is a block diagram of a lighting control system, in which the transmission medium is changed from the infrared light 1 to a radio wave in Embodiment 5 to realize wireless communications using a radio wave.

In FIG. 6, the transmitter portion 515 and the receiver portion 201 shown in FIG. 5 are replaced by a transmitter portion 611 and a transmitter-receiver portion 601, respectively. The transmitter portion 611 superposes all the ID information received at the receiver portion 515 and the comparison result from the comparison portion 412 in the form of codes on a radio wave and transmits this. The transmitter-receiver portion 601 extracts all the ID information and the comparison result that are transmitted from the received radio wave, and supplies them to the judgment portion 603. The judgment portion 603 carries out the same operation as that performed by the judgment portion 503. Although it is not impossible to provide directivity to a radio wave, it tends to be affected by reflection and absorption. However, desired directional characteristics can be realized by selecting the carrier frequency and the antenna shape. Since the infrared light 2 is provided with directional characteristics, the radio wave may be nondirectional.

With the above-described configuration, the same operation as that described in Embodiment 4 can be carried out.

It is also possible to use a radio wave in place of the infrared light 2, and to provide directional characteristics to the antenna characteristics of one of the transmitter portion 505 and the receiver portion 515. Additionally, directional characteristics may be provided to one of the transmitter portion 611 serving as the first transmitter portion, the transmitter-receiver portion 601 serving as the first receiver portion, the transmitter portion 505 serving as the second transmitter portion, and the receiver portion 515 serving as the second receiver portion. However, providing directional characteristics to one of the transmitter portion 505 serving as the second transmitter portion and the receiver portion 515 serving as the second receiver portion is simple and more preferable.

In the present embodiment, only the reception function of the transmitter-receiver portion 601 is used. A case where the transmission function of the transmitter-receiver portion 601 is used will be described later in the description of the negotiation procedure.

Embodiment 6

In Embodiment 4, the infrared light 2 is used to transmit the ID information from the lighting devices 50 to the local device 51, as shown in FIG. 5. In Embodiment 6, the ID information is transmitted after being superposed on the illuminated light from the light source 200 of each of the lighting devices.

Figure 7:
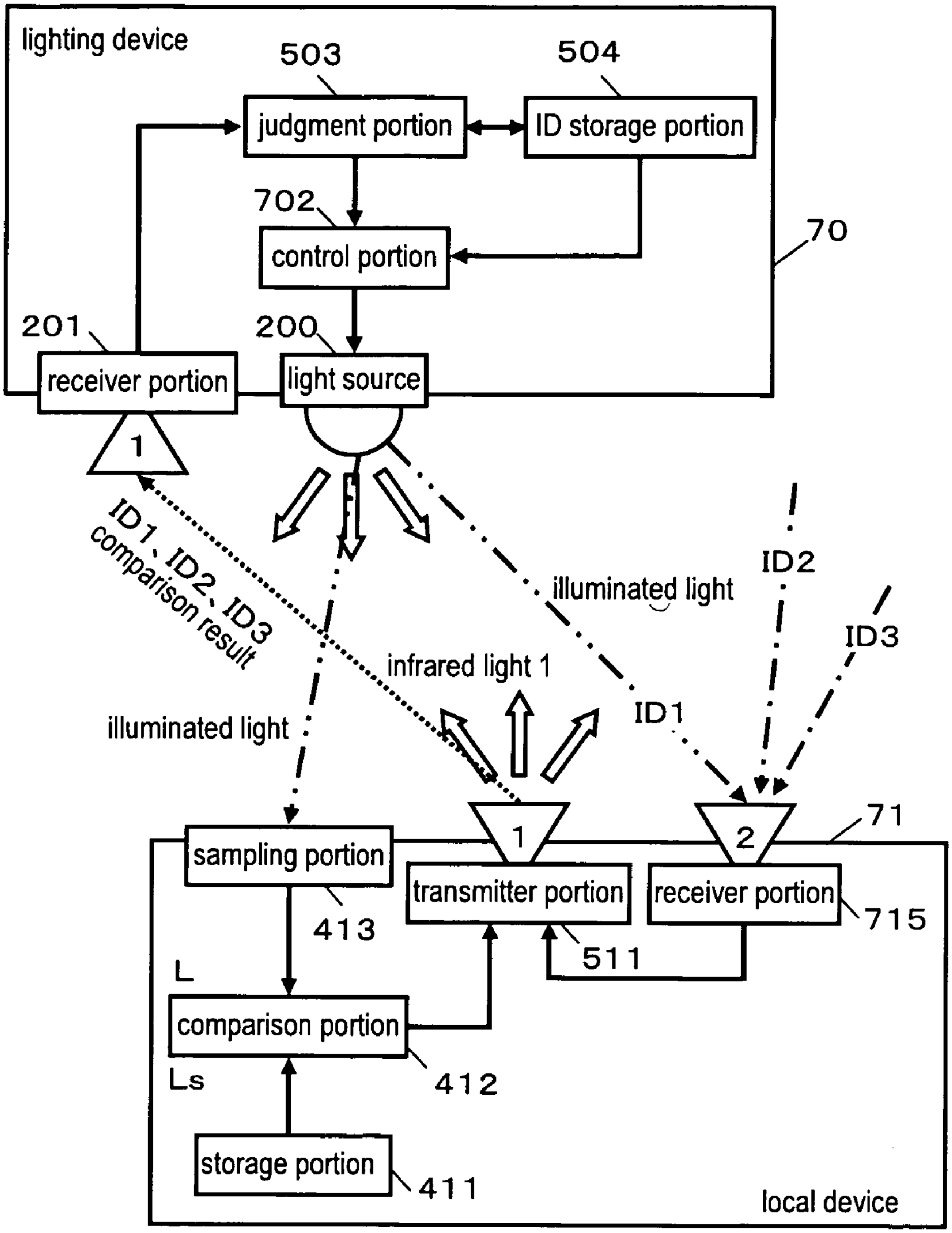
FIG. 7 is a block diagram of one embodiment of a lighting control system according to the present invention.

In FIG. 7, the ID information stored in the ID storage portion 504 is supplied to a control portion 702. The control portion 702 superposes the code of the ID information on the light intensity of the light source 200, in addition to controlling the light intensity based on a judgment result of the judgment portion 503 in the same manner as that used by the control portion 202. A receiver portion 715 receives illuminated light from the light source 200, extracts the superposed ID information and supplies this to the transmitter portion 511. The operations of other structural components in FIG. 7 are the same as those in Embodiment 4 described with reference to FIG. 5, and therefore their detailed description is omitted.

Next, the method of superposition is described. The light intensity of the light source 200 may be set to be controlled at high speed, and the light intensity value may be subjected to amplitude modulation using the ID information ID1. The receiver portion 715 can detect the ID information ID1 by detecting an amplitude change in the light intensity. During the amplitude modulation using the code data of the ID information ID1, the light intensity is not changed based on the comparison result.

In the case of a method in which the light source 200 varies the proportion of its lighting time by thyristor control or inverter control to control the average light intensity, the ID information ID1 can be transmitted using the illuminated light by superposing the code while rapidly switching between lighting up and turning off according to the code corresponding to the ID information ID1 either at the beginning, the middle or the end of the lighting period. In addition, the illumination signal at the sampling portion 413 significantly fluctuates, so that it is preferable to smooth the detection signal of the sampling portion 413 before supplying it to the comparison portion 412.

Preferably, the frequency of the code of the ID information is high to such an extent that the change in light intensity will not be detected by human eyes.

Plural pieces of ID information, such as ID information ID1, ID2 and ID3 are transmitted to the receiver portion 715 of the local device from the lighting devices respectively corresponding to the pieces of ID information. When plural pieces of ID information are transmitted simultaneously, there is the possibility that two or more pieces of ID information interfere, and thus the correct ID information may not be detected. It is possible to prevent the interference by allocating a transmission time for each of the lighting device and carrying out transmission in a time-sharing system such that plural pieces of ID information will not be transmitted. Further, by adding an error-detecting code to the code of the ID information at the control portion 702 before transmission, and carrying out an error-detecting process at the receiver portion 715, it is possible to detect a code error state caused by interference, thus extracting only those codes that could be correctly extracted. Even if plural pieces of ID information happen to be transmitted simultaneously as a result of randomly changing the time interval for transmitting the ID information at the lighting devices, and an error is thus caused by interference, only a single lighting device will be provided with an opportunity for transmission after several times of transmission, so that it is possible to carry out transmission correctly. The received ID information may be temporarily stored in the receiver portion 715 or the transmitter portion 511 for a predetermined time Tm, during which the ID information is transmitted from the transmitter portion 511 using infrared light, assuming that the ID information is received for the time Tm, and the transmission of the ID information may be stopped only after the ID information has not been received for the time Tm. By doing this, it is possible to prevent a temporary impairment of reception due to interference.

Alternatively, a lighting device itself may be assumed to be selected even if its receiver portion 201 or its transmitter-receiver portion 601 has not received its own ID information for the predetermined time Tm. Preferably, Tm is a time that is not too long, from a second to several seconds.

When the error of the ID information cannot be detected, incorrect ID information is transmitted from the transmitter portion 511. However, the lighting devices other than those in the area R1 or R2 will not be lighted up due to the incorrect ID information, if one of the transmitter portion 511 and the receiver portion 201 is provided with directional characteristics to prevent the incorrect ID information from reaching the lighting devices that are outside their fields of view. Further, unless the infrared light 1 reaches a lighting device that happens to have incorrect ID information as its own ID information, a lighting device other than the target devices will not be lighted up erroneously. Even if it is lighted up, it is extremely rare that ID information continuously causes the same error, and this is practically impossible, so that no serious problem will occur.

Transmission can be carried out in the following manner, although this is somewhat complicated. By adding an error-correcting code at the control portion 702 before transmission, and carrying out an error-correcting process at the receiver portion 715, it is possible to correct an error caused by interference. By coding the ID information by a spectrum spread system before transmission, it is possible to transmit many pieces of ID information simultaneously without an error due to interference. It is also possible to transmit many pieces of ID information without interference by applying a transmission method that is used for wireless LANs, infrared LANs or mobile phones.

Additionally, directional characteristics may be provided to one of the transmitter portion 511 serving as the first transmitter portion, the receiver portion 201 serving as the first receiver portion, the light source 200 serving as the second transmitter portion, and the receiver portion 715 serving as the second receiver portion. However, providing directional characteristics to one of the light source 200 serving as the second transmitter portion and the receiver portion 715 serving as the second receiver portion is simple and more preferable.

Embodiment 7

In Embodiment 5, the infrared light 2 is used to transmit the ID information from the lighting devices 60 to the local device 61, as shown in FIG. 6. In Embodiment 7 shown in FIG. 8, as with Embodiment 6, the ID information is transmitted after being superposed on the illuminated light from the light source 200 of each of the lighting devices.

Figure 8:
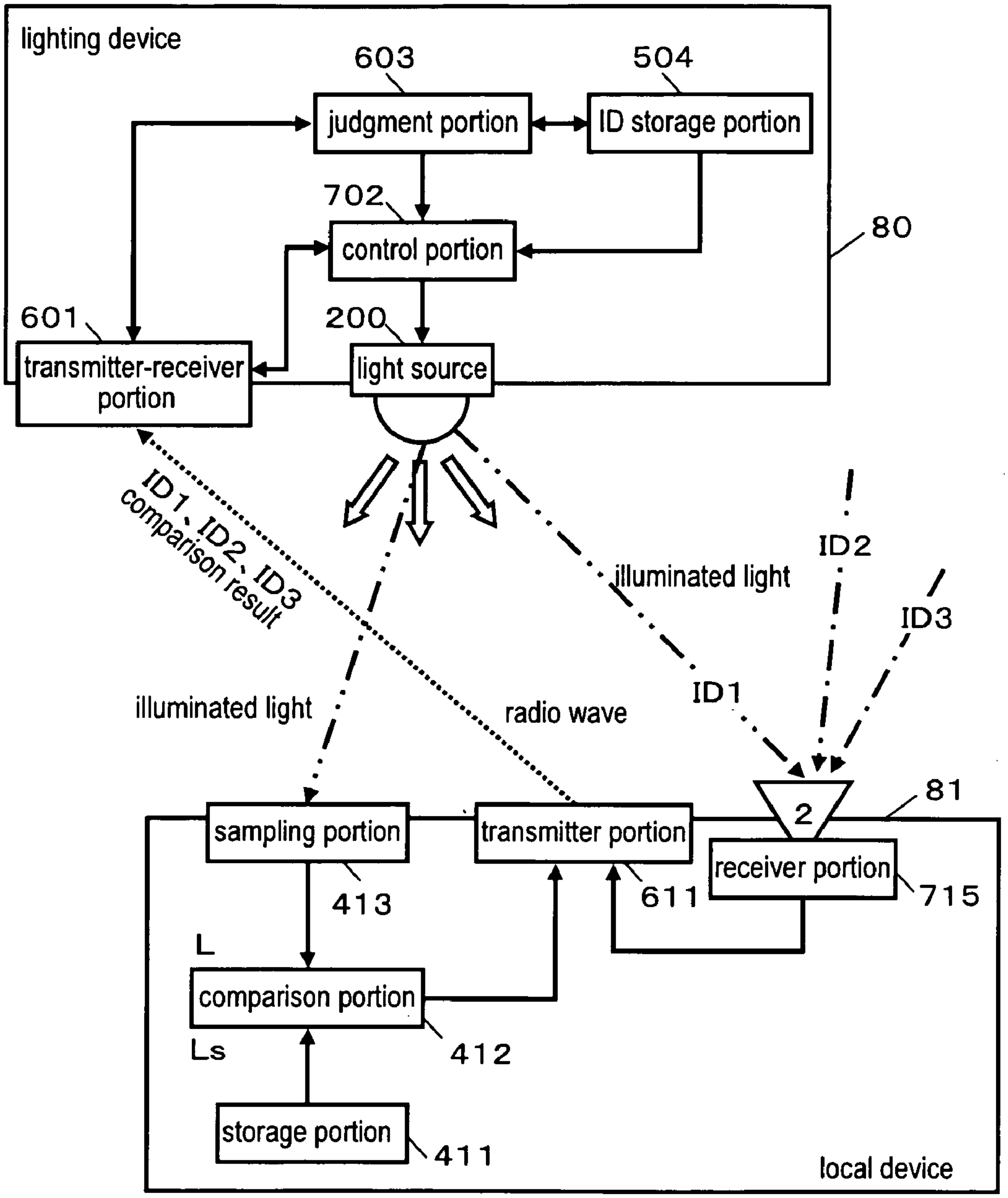
FIG. 8 is a block diagram of one embodiment of a lighting control system according to the present invention.

In FIG. 8, the ID information stored in the ID storage portion 504 is supplied to a control portion 702. The control portion 702 superposes the code of the ID information on the light intensity of the light source 200, in addition to controlling the light intensity based on a judgment result of the judgment portion 603 in the same manner that used by the control portion 202. A receiver portion 715 receives illuminated light from the light source 200, extracts the superposed ID information and supplies this to the transmitter portion 611. The operations of other structural components in FIG. 8 are the same as those in Embodiment 5 described with reference to FIG. 6, and therefore their detailed description is omitted. Regarding the superposition of the ID information on the illuminated light, the same method as described in Embodiment 6 can be applied.

Additionally, directional characteristics may be provided to one of the transmitter portion 611 serving as the first transmitter portion, the transmitter-receiver portion 601 serving as the first receiver portion, the light source 200 serving as the second transmitter portion, and the receiver portion 715 serving as the second receiver portion. However, providing directional characteristics to one of the light source 200 serving as the second transmitter portion and the receiver portion 715 serving as the second receiver portion is simple and more preferable.

Embodiment 8

In Embodiment 7 above, the illuminated light is received by the sampling portion 413 and the receiver portion 715, as shown in FIG. 6. In the present embodiment, the sampling portion 413 is also provided with the reception function of the receiver portion 715.

Figure 9:
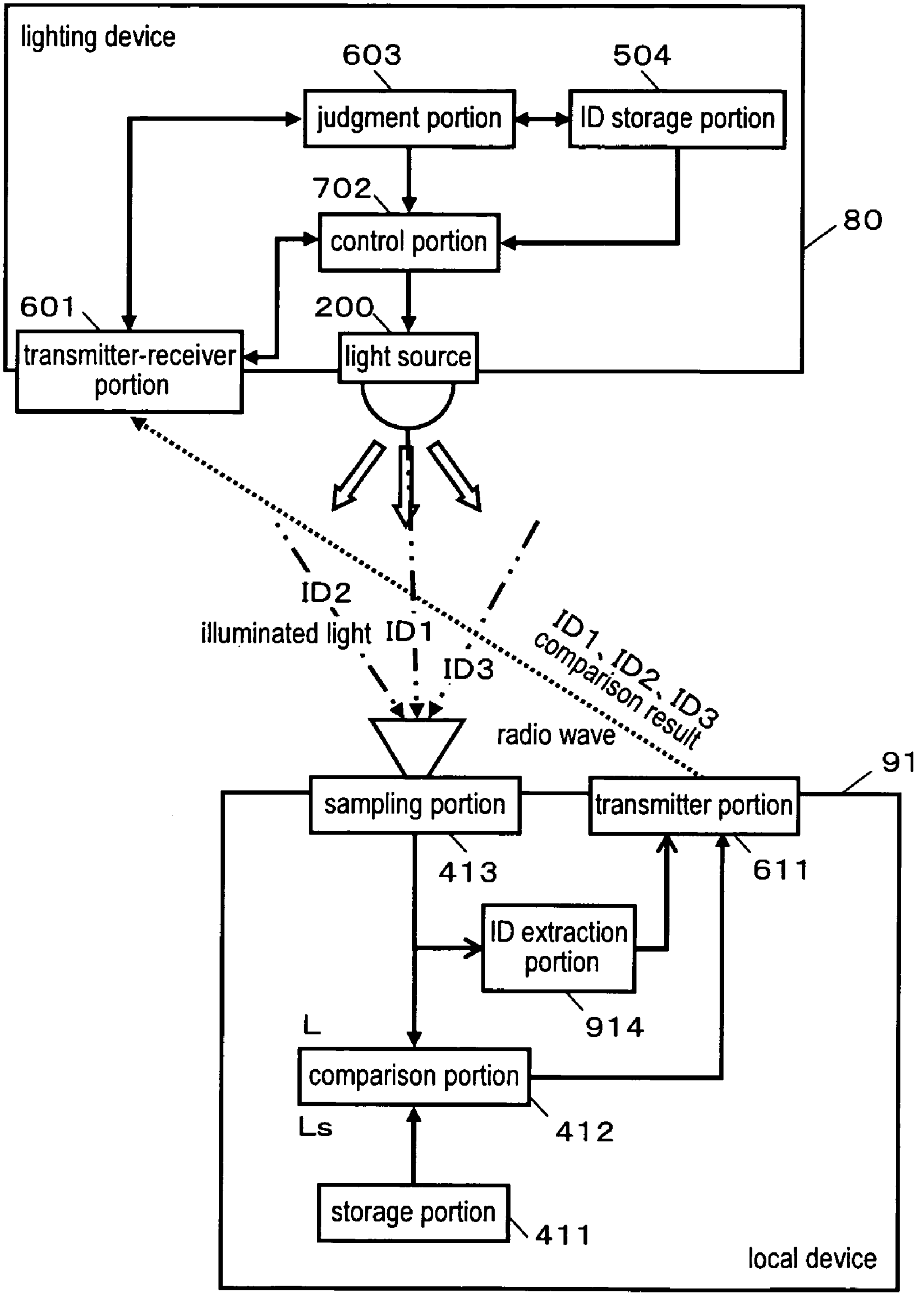
FIG. 9 is a block diagram of one embodiment of a lighting control system according to the present invention.

In FIG. 9, the sampling portion 413 supplies an output signal to an ID extraction portion 914, and the ID extraction portion 914 extracts the ID information. The extracted ID information is supplied to the transmitter portion 611. The transmitter portion 611 transmits the comparison result of the comparison portion 412 and the ID information. The output signal from the sampling portion 413 has fluctuated due to the ID information, and it is therefore preferable to smooth the signal to remove the component of the ID information before supplying it to the comparison portion 412.

The operations of other structural components in FIG. 9 are the same as those already described, and therefore their detailed description is omitted. Additionally, the sampling portion 413 and the ID extraction portion 914 of this embodiment can also be applied to Embodiment 7 shown in FIG. 7.

Additionally, directional characteristics may be provided to one of the transmitter portion 611 serving as the first transmitter portion, the transmitter-receiver portion 601 serving as the first receiver portion, the light source 200 serving as the second transmitter portion, and the sampling portion 413 serving as the second receiver portion. However, providing directional characteristics to one of the light source 200 serving as the second transmitter portion and the sampling portion 413 serving as the second receiver portion is simple and more preferable.

In the above-described embodiments, communications between the local device and the lighting devices are all described as communications using a wireless transmission medium such as infrared radiation and a radio wave. Except for the transmission medium that is provided with directional characteristics or the transmission path, wired communications may be used.

As can be understood from the foregoing description, basically, the lighting control system of the present invention is a lighting control system, including at least one local device, and a plurality of lighting devices, wherein the local device includes a first transmitter portion that transmits information for controlling light intensities of the lighting devices via a transmission medium, and transmits the information by the first transmitter portion; wherein the lighting devices include a first receiver portion that can receive the transmission medium and that extracts the information from the transmission medium, a judgment portion that carried out a judgment for the content of the received information, a control portion that controls a light intensity based on a result of the judgment, and a light source whose light intensity is controlled by the control portion; wherein a lighting device to be selected is specified by the local device based on any of selection of ID information for identifying the lighting devices in the local device, directional characteristics of emission of the transmission medium in the first transmitter portion, and directional characteristics of reception of the transmission medium in the first receiver portion of the lighting devices; and wherein the control portion controls the light intensity in the selected lighting device, based on the judgment result. As the transmission medium, it is possible to use various media that can be provided with directional characteristics, such as a radio wave and light. Light has characteristics of traveling in straight lines, and thus can be easily provided with directional characteristics. Although light is easy to employ, this is not limited to light. The function of the judgment portion may be contained in the first receiver portion or the control portion.

Next, a description is given for the mechanism in which each of the lighting devices controls the light intensity based on the comparison result to cause the sampled illumination to approach the target illumination in Embodiments 3 to 8 above. The following embodiments can be applied to Embodiments 3 to 8 above. It should be noted that the following light intensity control by the lighting devices is carried out by those lighting devices that receive the comparison result, the ID information and so on from the local device located in the field of view of the lighting devices via the infrared light 1 or radio wave, such as the lighting devices in the areas R1 and R2, or those lighting devices that are captured within the field of view of the local device. As has been already described, those lighting devices that do not receive the comparison result or their own ID information, such as lighting device that are outside the field of view are turned off or enter standby by decreasing the intensity to a predetermined weak value, within the predetermined time Td after reception stopped.

As a whole, the lighting control system according to the present invention includes a plurality of judgment portions, a plurality of control portions and at least one comparison portion, wherein the comparison portion supplies to the judgment portions a comparison result between a sampled illumination at an arbitrary position and a target illumination, the judgment portions carry out a judgment as to whether a predetermined condition is met, based on the comparison result of the comparison portion, and supply a judgment result to the control portions, and the control portions repetitively increase/decrease the light intensities of the plurality of light sources either individually or in cooperation with one another, based on the judgment results obtained from the judgment portions, thereby causing the sampled illumination to approach the target illumination. The comparison portion may or may not specify a judgment portion when supplying the comparison result to the judgment portions.

Most basically, the comparison portion outputs information on which of the sampled illumination and the target illumination is larger as a comparison result, and, in the lighting devices, the control portion reduces the light intensity of the light source when a comparison result that the sampled illumination is larger than the target illumination is received and the judgment portion judges that the light intensity should be reduced, and the control portion increases the light intensity of the light source when a comparison result that the sampled illumination is smaller than the target illumination is received and the judgment portion judges that the light intensity should be increased, thereby causing the sampled illumination to approach the target illumination. Although a negative-feedback method can be applied as a simple method, the following method can also be applied in order to approach the target illumination. That is, one of the selection of the lighting devices that increase/decrease the control amount, the selection of the judgment portions and the control positions, the magnitude of the increase/decrease, and the frequency of the increase/decrease is changed in each increase/decrease control, or at an appropriate opportunity in each increase/decrease processing. In these respects, there are several more methods, which will be described in order in the following embodiments. Additionally, the judgment portions and the control portions are contained in each of the lighting devices, so that the selection of the lighting devices and the selection of the judgment portions or the control portions mean the same in the following description.

Embodiment 9

While the present embodiment can be applied to Embodiments 3 to 8 above, a case is described where it is applied to the lighting devices 40 in Embodiment 3. In FIG. 4, each of the plurality of lighting devices 40 can carry out, based on the judgment result of the judgment portion 403, light variation control in which the light intensity value is changed from a current light intensity value by a predetermined amount of light variation, and return control in which the light intensity value is returned to a direction reverse to the light variation control. The surrounding illumination conditions change based on the light intensity values controlled by the plurality of lighting devices, and sampled illumination L in the sampling portion 413 is generated.

The lighting devices carry out, as needed, a first control and a second control as follows. That is, they can carry out: a first control in which, when the judgment result of the judgment portion 403 is that a predetermined condition is met, the lighting devices including at least one lighting device other than the previously selected lighting device is selected to perform light variation control; and a second control in which, when the above-described judgment by the judgment portion 403 is that the predetermined condition is not met, in order to meet the predetermined condition, any of the plurality of lighting devices 40, or the lighting devices including at least one lighting device that carried out the previous light variation control perform the return control such that the predetermined condition is met, and then the lighting devices including at least one lighting device other than the lighting devices that carried out the previous light variation control are selected to perform light variation control. The sampled illumination is caused to approach the target illumination by carrying out the first and second controls. The details are described below.

The local device 41 compares a sampled illumination L acquired by the sampling portion 413, which is a sensor that detects an illumination at a desired position, with a target illumination Ls set by local device 41, and sends a result of the comparison from the transmitter portion 211 to the receiver portion 201.

The judgment portion 403 carries out a predetermined judgment, which will be described later, based on the comparison result received at the receiver portion 201 from a single or a plurality of local devices 41, and the control portion 202 carries out, as light intensity control, one of light variation control in which the light intensity is changed in accordance with the predetermined amount of light variation, return control in which the light intensity is returned, and holding of the light intensity. The lighting devices that receive a plurality of comparison results occur in such a case where the lighting devices located in the area R1 also belong to the area R2.

Here, the predetermined judgment carried out by the judgment portion 403 is a judgment as to whether or not there is a constant relation for all the comparison results, when a plurality of comparison results are received from a plurality of local devices 41. The predetermined condition is considered met when these are in a constant relation with respect to all the comparison results, and the predetermined condition is considered not to be met when even one is not in a constant relation. The aforementioned "in a constant relation" refers to when the sampled illuminations are larger than the corresponding target illuminations, and the aforementioned "not in a constant relation" refers to when the sampled illumination is smaller than the corresponding target illumination in any one of the comparison results.

When a single local device 41 is provided or when only a single comparison result is received, the aforementioned "in a constant relation" refers to when the sampled illumination L is larger than the corresponding target illumination Ls, and the aforementioned "not in a constant relation" refers to when the sampled illumination is smaller than the corresponding target illumination.

The predetermined amount of light variation is set to an amount of light variation of the light source that is not too large.

Basically, control in which the light intensities are gradually decreased from the larger intensities is described in the following description. In the case of gradually controlling the light intensities from the smaller light intensities to the larger light intensities, that is, in the case of the light increase control direction, the large-small relationship of the comparison results for the predetermined condition may be defined as the opposite relationship.

Figure 10:
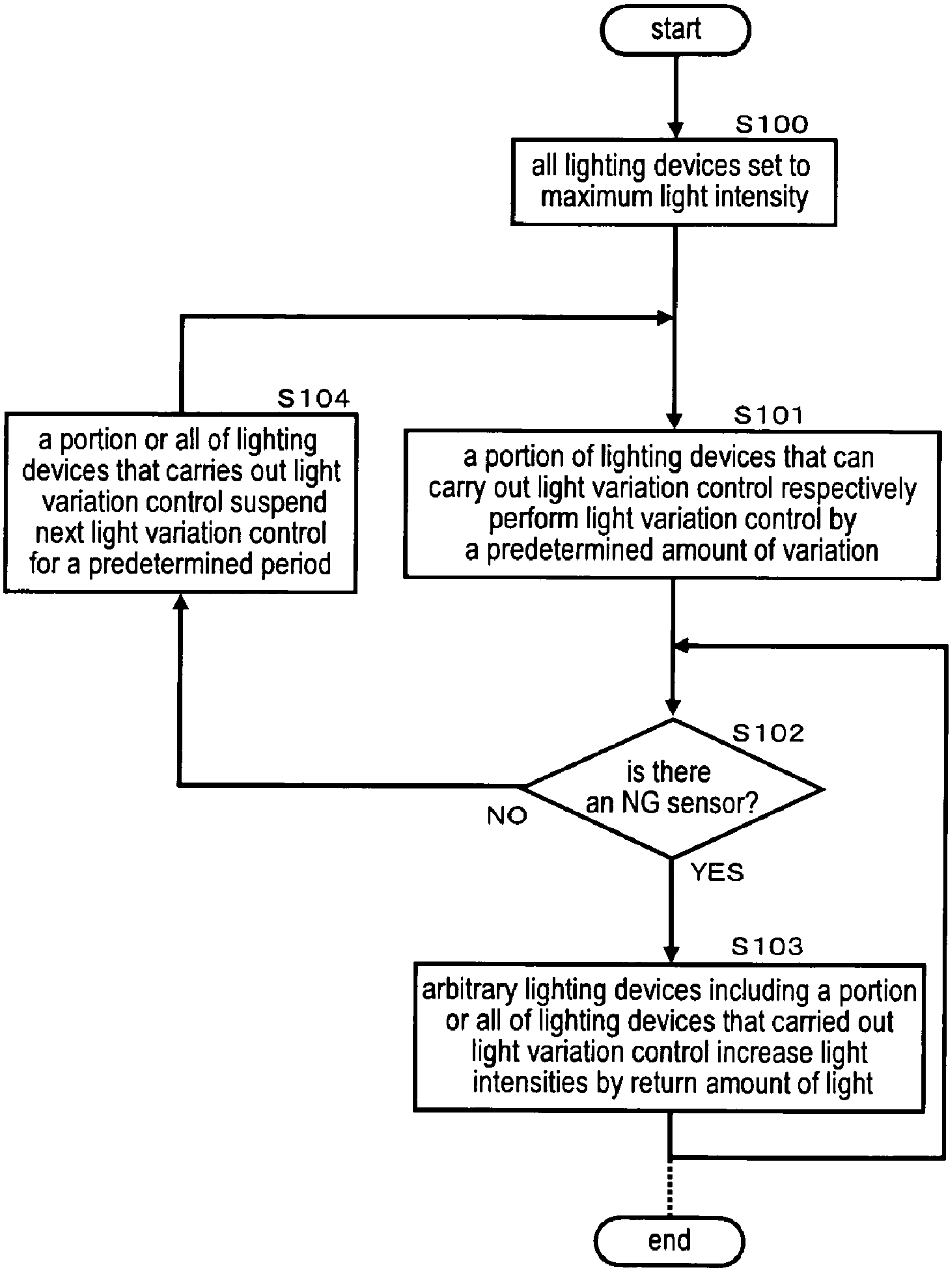
FIG. 10 is a flowchart of one embodiment of a lighting control procedure of a lighting control system according to the present invention.

FIG. 10 shows an example of a flowchart of lighting control according to the present embodiment. The following description is given based on the assumption that the area R1 and the area R2 partly overlap. Accordingly, the lighting devices may receive a single comparison result, or may receive two comparison results.

Additionally, when there is only a single local device 41, or when the areas R1 and R2 are separated and can be handled independently, the operations in the following description are performed assuming that a single comparison result is received. Further, the following processing does not apply to the lighting devices that are located outside the areas R1 and R2 and that do not receive the comparison result.

At (S100) in FIG. 10, first, all the lighting devices 40 that received the comparison result are set to a maximum light intensity. At (S101), a plurality of the lighting devices 40 carry out negotiation, which will be described later, and a portion of the lighting devices that can perform variation control respectively carry out light variation control in accordance with a predetermined amount of light variation. The rest of the lighting devices in the area R1 or the area R2 are on standby, without carrying out light variation control. Next, at S102, a judgment is carried out as to whether or not there is an NG sensor. When a single comparison result is received, "there is an NG sensor" means that the comparison result is that the sampled illumination L is smaller than the target illumination Ls. When a plurality of comparison results are received, it means that at least one comparison result is that the sampled illumination L is smaller than the target illumination Ls. If the result is "YES" at (S102), then this is a case where there is at least one NG sensor, that is, where even one of the comparison results is not in a constant relation, so that it is judged that the predetermined condition is not met. If the result is "NO" at (S102), then this is a case where there is no NG sensor, that is, where the judgment result is that there is a constant relation for all the comparison results, so that it is judged that the predetermined condition is met.

If the result is "YES" at (S102), then the procedure advances to (S103), at which arbitrary lighting devices including a portion or all of the lighting devices that carried out variation processing at (S101) increase the light intensity by return control by the amount of light returned, in order to meet the predetermined condition, and the procedure returns to (S102). It should be noted that arbitrary lighting devices may carry out return control. If the result is "NO" at (S102), the procedure advances to (S104), at which a portion or all of the lighting devices that carried out the light variation control previously, that is at, (S101) suspend light variation control for a predetermined period, and the procedure advances to (S101). At (S101), a portion of the lighting device in the areas R1 and R2 that can perform light variation control, that is, the lighting devices that have not temporarily suspend light variation control at (S104) respectively carry out light variation control in accordance with the predetermined amount of light variation. At this point of time, the lighting devices that have temporarily suspended light variation control cancel the temporary suspension.

The amount of light variation in return control is set as, for example, an arbitrary amount of light variation, or an amount of light variation that is the same in a reverse direction of the previous light variation control. All the lighting devices in the areas R1 and R2 may carry out return control at (S103).

The above-described flowchart is basically constituted by the following first control and second control. The processing continuing at (S102), (S104) and (S101) is the first control. In the first control, when the judgment by the judgment portion 403 is that the predetermined condition is met, lighting devices including at least one lighting device other than the previously selected lighting device are selected to perform light variation control. The processing continuing at (S102), (S103), (S102), (S104) and (S101) is the second control. In the second control, when the judgment by the judgment portion 403 is that the predetermined condition is not met, in order to meet the predetermined condition, any of the plurality of lighting devices 40, or the lighting devices including at least one lighting device that carried out the previous light variation control perform the return control such that the predetermined condition is met, and then the lighting devices including at least one lighting device other than the lighting devices that carried out the previous light variation control are selected to perform light variation control. The sampled illumination can be caused to approach the target illumination by carrying out the first control and the second control.

The local device 41 may be formed in the shape of a remote control, a small ornament or the like, and placed at an arbitrary position in the room. It may be provided with a target illumination setting dial, a control start button and the like. With the target illumination setting dial, the user can set an arbitrary target illumination. Furthermore, the above-described lighting control is commenced by the user pressing the control start button.

Next, methods for selecting a lighting device that carries out light variation control and return control are described. When a central device manages the plurality of lighting devices, the central device can select the lighting device and therefore there is no need for negotiation among the lighting devices. However, it is necessary to manage the addresses for distinguishing the lighting device. In a method in which individual lighting devices decide whether to carry out light variation control and return control through negotiation among the lighting devices, there is no need to manage the communications.

Selection Method A: Method in Which Negotiation for Selecting Lighting Devices is Not Performed First, a method in which there is no need for negotiation among the lighting devices and there is no need for a central device is described. In this method, each of the lighting devices selects its own light variation control or return control autonomously.

When control is commenced, the judgment portion 403 of each of the lighting devices generates a random number internally, and carries out light variation control when the random number is at most a threshold value β1. When the random number is a random number of uniform distribution that is an integer from 0 to 255, and β1 is 15, the lighting devices carry out light variation control with a probability of 1/16. That is, about one one-sixteenth of all the lighting devices in the areas R1 and R2 carries out light variation control, on average. The rest of the lighting devices are on standby, with their light intensities being maintained. In the next light variation control, the lighting devices that carried out the previous light variation control generate a random number, and carry out light variation control when the random number is at most a threshold value β2=8. The lighting devices that did not carry out the previous light variation control similarly generate a random number, and carry out light variation control when the random number is at most a threshold value β3=15. In return control, the lighting devices that has carried out light variation control generate a random number, and carry out return control when the random number is at most a threshold value β4=127. The lighting devices that have not carried out light variation control similarly generate a random number, and carry out return control when the random number is at most a threshold value β5=63. The random number is generated each time the judgment portion 403 receives a judgment result. From the judgment result, it is possible to know whether the next control will be either light variation control or return control. By doing this, from a broad view, the sampled illumination approaches the target illumination, while one or a plurality of lighting devices, which are determined stochastically, carry out light variation control and return control autonomously. The threshold values β3 and β5 may be set larger for those lighting devices that have not carried out light variation control or return control for a while. The threshold values β2 and β4 may be set smaller for those lighting devices that carry out light variation control or return control frequently. The values of the threshold values β1, β2, β3, β4 and β5, and the size of the random number may be different from the examples given above.

The timing for starting to generate the random number may be when the lighting devices have received a comparison result that is regularly transmitted by the local device 41. The timing for synchronization of the lighting devices is when the judgment result is transmitted. There is no need for negotiation among the lighting devices.

The local device 41 may transmit the comparison result only when the predetermined condition is not met, and may not transmit the comparison result when it is met. The lighting devices start to generate a random number for return control at a time when this comparison result has been received. When no comparison result has been received for a certain period of time thereafter, they start to generate a random number for light variation control. The timing for light variation control may or may not be synchronized.

When there are a plurality of local devices 41, there may be cases where the receiver portion 201 of the lighting device has to receive a plurality of comparison results. When the transmission medium is infrared radiation, the local device 41 may prevent interference by varying its transmission frequency, which is the modulation frequency. Their transmission timings may be shifted from each other. It is also possible to use the error-detecting code or the error-correcting code described in Embodiment 4.

When the comparison results between the target illuminations and the sampled illuminations transmitted by the local device 21 consist only of two kinds, namely, target illumination>sampled illumination, or target illumination≦sampled illumination, and do not include a differential illumination value as described below, the lighting device 40 can judge whether or not the above-described predetermined condition is met by detecting the received frequency, if the transmit frequency for the cases where target illumination>sampled illumination and that for the cases where target illumination≦sampled illumination are different. In the case of light variation control as light reduction control, the lighting device 40 can judge that the predetermined condition is met when it does not receive a predetermined frequency, if only the local device 41 in which target illumination>sampled illumination is set to make transmission at the predetermined frequency. On the other hand, the lighting device 40 can judge that the predetermined condition is not met when it receives the predetermined frequency. Consequently, transmission/reception and judgment are simplified. Even if a plurality of the local devices make transmission simultaneously, the receiver portion 201 of the lighting device 40 can receive comparison results from the local device unless they completely cancel each other. In order to reduce the risk of cancellation due to carrier frequencies in completely opposite phases, a weak, random modulation may be applied to achieve spectral diffusion.

The local devices 41 may transmit a comparison result with a certain time interval, instead of transmitting it constantly. This can reduce the electric power consumption for transmission. When the local devices 41 are not synchronized, there may be cases where their transmission timings are shifted from one another. In such a case, when a comparison result indicating target illumination>sampled illumination is not received within a certain period of time, the judgment portion 403 of each of the lighting devices 40 may judge that all the comparison results indicate target illumination≦sampled illumination.

When the timing for generating a random number is not obtained from the judgment portion 403 or the local devices 41, the lighting devices may be synchronized to generate a random number. The synchronization can be achieved via a lamp line.

The lighting devices may autonomously carry out light variation control by respectively generating a random number with a certain time interval, and may generate a random number for return control when the judgment portion 403 carried out a judgment that the predetermined condition is not met, or when a signal indicating that target illumination>sampled illumination is received from any one of the local devices 41. In this case, it is not necessary to perform the above-described synchronization.

The above-described method in which a random number is generated to select the lighting devices that carry out light variation control can also be considered as a method in which the time interval or the frequency for performing light variation control is randomly varied.

When the above-described selected lighting devices carry out light variation control with random timing with respect to each other, instead of carrying out light variation control simultaneously, there are less chances for the plurality of lighting devices to simultaneously change the light intensities, so that it is possible to reduce a significant change in the light intensities, thus decreasing flickering in the illumination.

Selection Method B: Method in Which Negotiation for Selecting Lighting Devices is Performed Next, a method in which the lighting devices are selected by negotiation in the procedure of Embodiment 9 is described. The transmitter-receiver portion 601 in FIG. 6 communicates with the transmitter-receiver portions of other lighting devices, and performs negotiation in cooperation with the judgment portion 603 and the control portion 202. Also in this case, the lighting devices in the areas R1 and R2 perform the negotiation.

In the negotiation procedure according to this selection method B, the lighting devices carry out light variation control and return control, using a first-come-first-served system. In order to do this, when control is commenced or when a lighting device receives a notification of completion of processing from another lighting device, it transmits a control declaration after a delay time Td from reception. Td is decided using a random number that is generated inside each of the lighting devices. Then, a lighting device transmits a control prohibition telegram when it receives (n−1) control declarations from another lighting device. The lighting device that has received the control prohibition telegram will not transmit a control declaration, and goes into standby without carrying out control.

A lighting device k, which had a smallest delay time Td, transmits its control declaration, and then transmits a control prohibition telegram for the first time when it first receives (n−1) control declarations from another lighting device. Then, n lighting devices, including the lighting device k, that were able to transmit a control declaration in this period can enter into light variation control or return control. When the same random number is generated in many lighting devices, there may be cases where n or more lighting devices have transmitted a control declaration, but the probability of such cases is low.

Such a mechanism is applied when commencing light variation control first, when selecting a lighting device to perform the next light variation control from lighting devices that has carried out light variation control, when selecting a lighting device to perform the next light variation control from lighting devices that has not carried out light variation control, when selecting a lighting device to perform return control from lighting devices that has carried out light variation control, and, when selecting a lighting device to perform return control from lighting devices that has not carried out light variation control. The value for n for the selections can be set to values different from each other.

The generation of a random number can be commenced by a timing by which a comparison result is received from the local device 61. From the judgment performed by the judgment portion 603, the lighting devices can judge whether or not there is a light variation control declaration or a return control declaration. The next light variation control or return control is commenced by a timing by which a control prohibition telegram is transmitted and received. After a predetermined time period in which the light intensities of the lighting devices have stabilized has elapsed since the transmitter-receiver portion 601 received the control prohibition telegram, the judgment portion 603 carries out the next judgment, and a result of the judgment is supplied to the control portion 202.

It should be emphasized that the control declaration and the control prohibition telegram need to be in forms that can be distinguished from each other. The operation frequencies and encoding patterns may be made different.

When a group of lighting devices that has carried out light variation control and a group of lighting devices that has not carried out light variation control respectively select a lighting device to perform the next light variation control or return control, the two groups may carry out negotiation for the selection simultaneously. In this case, interference can be avoided if the two groups use different frequencies. As the method for preventing errors due to interference, it is possible to use the previously descried methods.

Stochastically, there may be a lighting device that cannot carry out light variation control or return control for a long time. All the lighting devices can be given the opportunity to carry out light variation control and return control with suitable frequency, if each of the lighting devices counts the number of histories on its light variation control or return control, and increases the probability of generation of a small value in production of the random number when its frequency of performing control is low.

In the negotiation described above, communications may be broadcast-type communications in which it is not necessary for the devices to specify each other, and do not require a destination address.

Selection Method C: Method in Which Selection of Lighting Devices is Carried Out Using ID Information Next, a method in which lighting devices that carry out light variation control or return control are selected using the ID information of the lighting devices, as shown in FIG. 5 to FIG. 9, is described.

The transmitter portion 511 and the transmitter portion 611 are provided with the function of selecting the lighting devices. The pieces of ID information ID1, ID2, ID3 and so on obtained from the receiver portions 515 and 715, or the ID extraction portion 914 are stored in the transmitter portion 511 and the transmitter portion 611 for the predetermined time Tm, a single or a plurality of pieces of these ID information are selected, and the selected pieces of ID information are transmitted to the lighting devices. In this way, it is possible to designate a single or a plurality of specific lighting devices, using the ID information. For this purpose, a lighting device designating portion that selects the ID information of a lighting device that is to be designated from the stored ID information is provided inside the transmitter portion 511 or the transmitter portion 611. When a lighting device is to carry out light variation control, the ID information of that lighting device and a light variation control command are transmitted to the transmitter portion 511 and the transmitter portion 611. The judgment portions 503 and 603 examine the content of the received ID information and control command, and let the control portion 202 carry out light variation control if it matches their own ID information. When a lighting device is to carry out return control, the ID information of that lighting device and a return control command are transmitted to the transmitter portion 511 and the transmitter portion 611. The judgment portions 503 and 603 examine the content of the received ID information and control command, and let the control portion 202 carry out return control if it matches their own ID information. In place of the light variation control command and the return control command, the above-described judgment result may be sent together with the ID information, and the judgment portions 503 and 603 may judge whether to perform light variation control or return control. The number of lighting devices that carry out light variation control or return control can be determined by selecting the number of lighting devices designated from the transmitter portion 511 and transmitter portion 611, that is, the number of the ID information as, for example, a single or multiple pieces.

Although there may be cases where the lighting devices are designated for light variation control and return control simultaneously by a plurality of local devices, the lighting devices may carry out light variation control and return control one time each in this case. They may also perform one of light variation control and return control, for example, return control preferentially, or may alternately give priority to these controls, and so on. If three or more pieces of ID information are received, decision may be made by a majority method.

Embodiment 10

Figure 11:
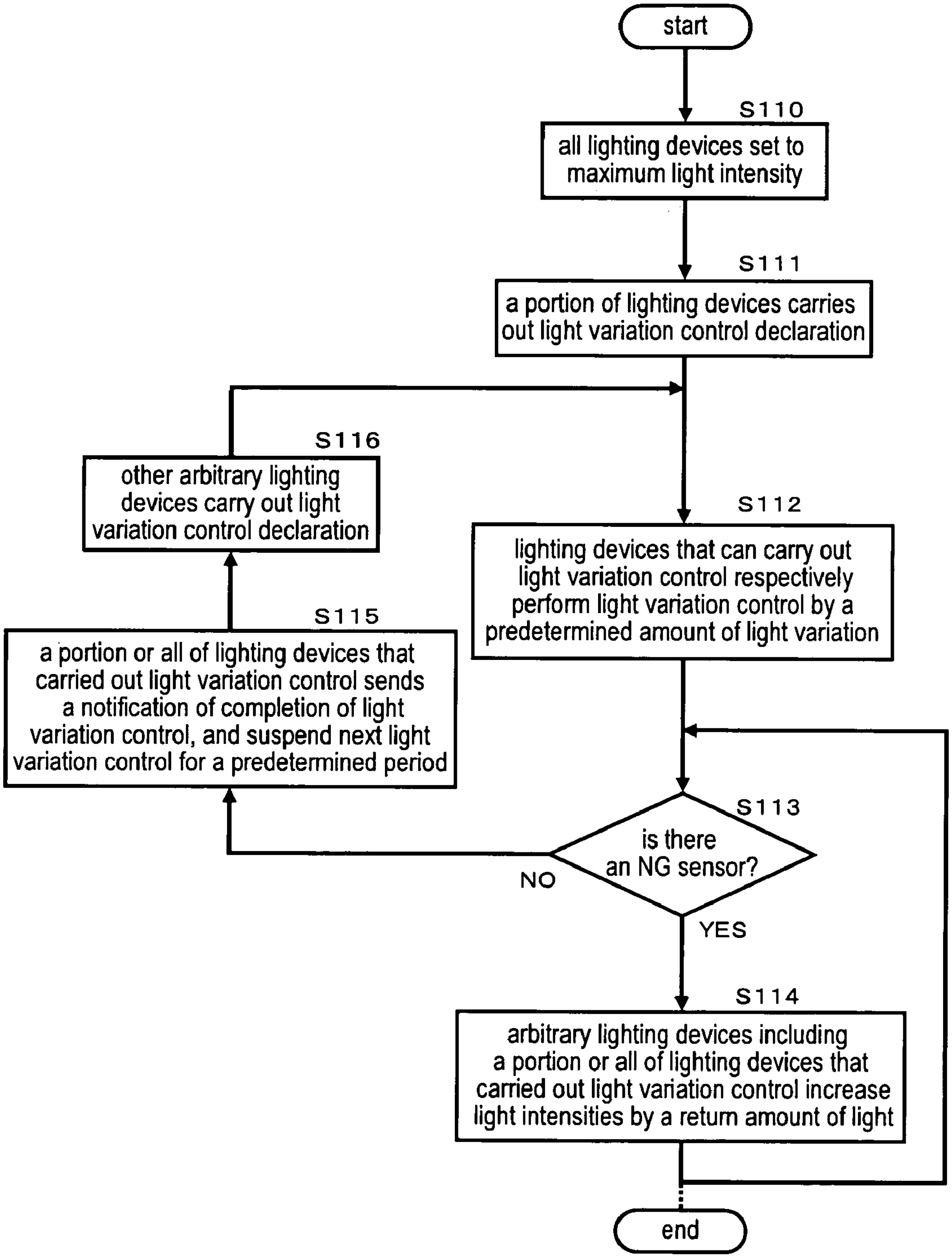
FIG. 11 is a flowchart of one embodiment of a lighting control procedure of a lighting control system according to the present invention.

FIG. 11 shows another example of the flowchart of the lighting control of the lighting control system according to the present invention.

At (S110) in FIG. 11, first, all the lighting devices 60 in the areas R1 and R2 are set to a maximum light intensity. At (S111), a portion of the lighting devices carry out a light variation control declaration. At (S112), the lighting devices that carried out the light variation control declaration respectively perform light variation control in accordance with a predetermined amount of light variation. The rest of the lighting devices are on standby, without carrying out light variation control. Next, at (S113), the judgment portion 603 judges whether or not there is an NG sensor. "There is an NG sensor" means that there is even a single comparison result that the sampled illumination is smaller than the target illumination. If the result is "NO", then this is a case where the judgment result is that there is a constant relation for all the comparison results, so that the predetermined condition is met. If the result is "YES", then this is a case where even one is not in a constant relation, so that the predetermined condition is not met.

If the result is "YES" at (S113), then the procedure advances to (S114), at which arbitrary lighting devices including a portion or all of the lighting devices that carried out variation processing at (S112) increase the light intensity by return control by the amount of light returned, in order to meet the predetermined condition, and the procedure returns to (S113). It should be noted that arbitrary lighting devices may carry out return control. If the result is "NO" at (S113), the procedure advances to (S115), at which a portion or all of the lighting devices that carried out the light variation control previously, that is, at (S112) sends a notification of completion of light variation control and suspend light variation control for a predetermined period, and the procedure advances to (S116). At (S116), other arbitrary lighting devices that did not carry out light variation control carry out a light variation control declaration, and the procedure advances to (S112). At (S112), the lighting devices that carried out a light variation control declaration respectively perform light variation control in accordance with the predetermined amount of light variation. At this point of time, the lighting devices that have temporarily suspended light variation control at (S115) cancel the temporary suspension.

The amount of light variation in return control is set as, for example, an arbitrary amount of light variation, or an amount of light variation that is the same in a reverse direction of the previous light variation control. All the lighting devices in the area R1 may carry out return control at (S114).

The above-described flowchart in FIG. 11 is basically constituted by a control and a second control as follows. A series of the processing continuing at (S113), (S115), (S116) and (S112) is a first control in which, when the predetermined judgment by the judgment portion 603 is that the predetermined condition is met, lighting devices 60 including at least one lighting device other than the lighting device 60 that carried out the previous light variation control are selected to perform light variation control. A series of the processing continuing at (S113), (S114), (S113), (S115), (S116) and (S112) is a second control in which, when the predetermined judgment by the judgment portion 603 is that the predetermined condition is not met, in order to meet the predetermined condition, any of the plurality of lighting devices 60, or the lighting devices 60 including at least one of the lighting devices 60 that carried out the previous light variation control perform the return control such that the predetermined condition is met, and then lighting devices 60 including at least one lighting device other than the lighting devices 60 that carried out the previous light variation control are selected to perform light variation control. The sampled illumination can be caused to approach the target illumination by carrying out the first control and the second control.

Which of the lighting devices carry out light variation control or return control may be determined by the same method as the lighting device selection method B, which is described in Embodiment 9, or a similar method.

Embodiment 11

Figure 12:
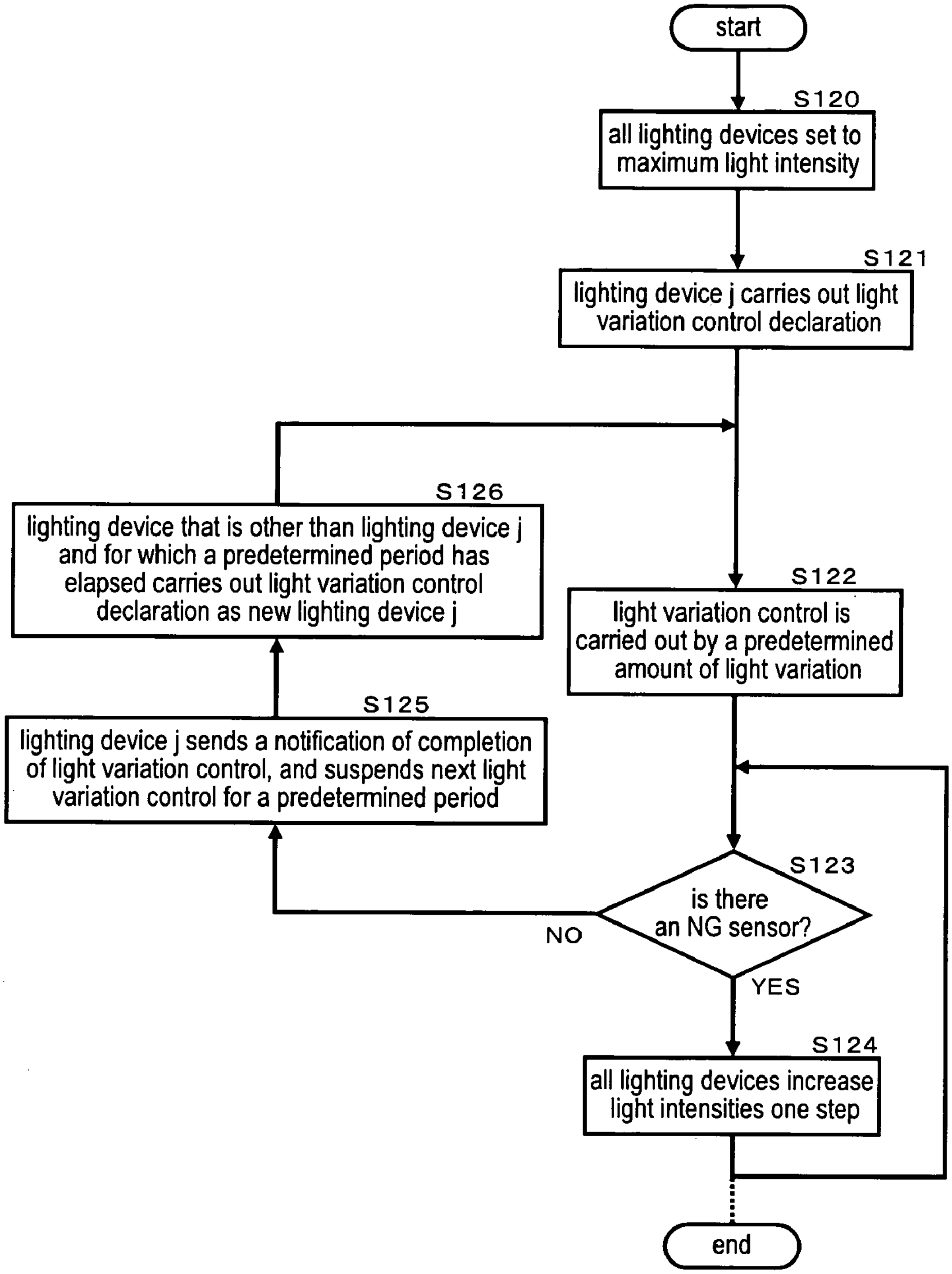
FIG. 12 is a flowchart of one embodiment of a lighting control procedure of a lighting control system according to the present invention.

FIG. 12 shows another example of the flowchart of control in which the lighting control system of the present invention is used for lighting control. In this embodiment, the lighting devices in the areas R1 and R2 carry out light variation control one by one.

At (S120) in FIG. 12, all the lighting devices 60 are set to a maximum light intensity. At (S121), a lighting device j carries out a light variation control declaration. At (S122), the lighting device j that carried out a light variation control declaration performs light variation control in accordance with a predetermined amount of light variation. Next, at (S123), the judgment portion 603 judges whether or not there is an NG sensor. "There is an NG sensor" means that there is even a single comparison result that the sampled illumination is smaller than the target illumination. If the result is "NO", then this is a case where there is a constant relation for all the comparison results, so that the predetermined condition is met. If the result is "YES", then this is a case where even one is not in a constant relation, so that the predetermined condition is not met.

If the result is "YES" at (S123), then the procedure advances to (S124), at which all the lighting devices including the lighting device j that carried out variation processing at (S122) increase the light intensity by return control by the amount of light returned, in order to meet the predetermined condition, and the procedure returns to (S123). A portion, instead of all, of the above-described lighting devices may perform this. Arbitrary lighting devices may also perform this. If the result is "NO" at (S123), then the procedure advances to (S125), at which the lighting device j that carried out light variation control previously, that is, at (S122), send a notification of completion of light variation control, suspends the next light variation control for a predetermined period, and the procedure advances to (S126). At (S126), a lighting device other than the lighting device j for which the predetermined period has elapsed carries out a light variation control declaration as a new lighting device j, and the procedure advances to (S122). At (S122), the new lighting device j that carried out a light variation control declaration performs light variation control according to a predetermined amount of light variation. At this point of time, the lighting devices that have temporarily suspended light variation control at (S125) cancel the temporary suspension.

The above-described procedure from (S121) to (S126) is carried out by the lighting devices in the order determined through negotiation that is carried out by the judgment portions 603 and the control portions 202 of the lighting devices via the transmitter-receiver portions 601, thereby carrying out light intensity control.

In the present embodiment, the processing continuing at (S123), (S125), (S126) and (S122) is a first control in which, when the judgment by the judgment portion is that the predetermined condition is met, the control portion of a single lighting device other than the lighting device that carried out the previous light variation control performs light variation control. The processing continuing at (S123), (S124), (S123), (S125), (S126) and (S122) is a second control in which, when the judgment by the judgment portion is that the predetermined condition is not met, in order to meet the predetermined condition, an arbitrary lighting device , or at least one lighting device including the lighting device that carried out the previous light variation control performs return control such that the predetermined condition is met, and then a single lighting device other than the lighting device that carried out the previous light variation control performs light variation control. The sampled illumination is caused to approach the target illumination by carrying out the first control and the second control.

Next, negotiation of communications and processing among the lighting devices is described. This negotiation is a modification of the method described in Embodiment 9. The lighting devices carry out a light variation control declaration, using a first-come-first-served system. In order to do this, when a lighting device receives a notification of completion of processing from another lighting device, it transmits a light variation control declaration after a delay time Td from reception, after which the right of processing of that lighting device is established if a processing declaration is not received from another lighting device within a predetermined window time Tw, and then light variation control commences. The delay time Td is decided using a random number inside each of the lighting devices. When a lighting device that has a large delay time Td and has not yet carried out a processing declaration receives a declaration from another lighting device before carrying out its processing declaration, it will not transmit a processing declaration until the next notification of completion of processing is received. It is rare for the value of the delay time Td to be the same in two or more lighting devices. That is, it is extremely rare for a plurality of lighting devices to carry out light variation control declarations at the same time and ordinarily only one lighting device acquires the right of processing.

In extremely rare cases, a plurality of lighting devices may carry out declarations substantially simultaneously and receive a declaration of light variation control from a different lighting device other than itself within the time Tw. In this case, a judgment is made that there is a different lighting device carrying out a light variation control declaration and after a delay time Td' decided by again generating a random number, a light variation control declaration is again transmitted. It is even rarer for the delay time Td' to again be the same value in a plurality of lighting devices and finally only one lighting device is able to acquire the right of light variation control. Even in the remote possibility that light variation control declarations again occur simultaneously, if the declarations are repeated, definitely only one lighting device will be able to acquire the right of light variation control. In this process, a lighting device that receives a light variation control declaration prior to carrying out a light variation control declaration does not acquire the right of light variation control and goes into a standby state until the next notification of completion of light variation control is received.

The window time Tw can be set longer than a total time required for transmission processing, reception processing, and detection of reception processing of the light variation control declaration. The delay times Td and Td' can be set to a time of a random integral multiple of a unit delay time (Tw+δT) longer than the window time Tw.

The aforementioned light variation control declaration works to prohibit light variation control in the other lighting devices. As another method, a light variation control prohibition telegram may be transmitted after a predetermined time Tf from transmission of the light variation control declaration such that a lighting device that receives the light variation control prohibition telegram does not carry out light variation control. Tf is set to a value sufficiently smaller than (Tw+δT).

It should be noted that by arranging a lighting device k, which had the smallest delay time Td, to transmit its light variation control declaration and then transmit a light variation control prohibition telegram after receiving one light variation control declaration from another lighting device, the number of lighting devices that carry out light variation control declarations prior to receiving the light variation control prohibition telegram becomes two including the lighting device k, and therefore it is possible to have two lighting devices commence light variation control. When the lighting device k receives two or more light variation control declarations simultaneously after it has transmitted its light variation control declaration, it transmits a light variation control prohibition telegram and a telegram to restart light variation control declarations, and the aforementioned two or more lighting devices that have already transmitted light variation control declarations carry out again light variation control declarations, so that the number can be reduced to one. Using the same principle, the number of lighting devices that carry out light variation control can be set to a desired number of three or more devices.

Furthermore, the following is also possible. Namely, it is possible to provide a loop counter memory in each lighting device and to increase by one the number of times of loops stored in the loop counter memory each time the process of (S125) is executed such that along with light variation control processing declarations, loop count data is sent during the aforementioned negotiation. By arranging so that a lighting device that has received a light variation control declaration from another lighting device does not carry out a light variation control declaration when its number of times of loops is higher, it is possible to cause the acquisition of the right for light variation control to occur giving priority to lighting devices having lower number of times of loops. It is possible to avoid having only a portion of the lighting device carry out light variation numerous times.

Instead of deciding the delay time Td using random numbers, the number of lighting devices to carry out a light variation control declaration may be reduced to one by setting in each lighting device a probability P less than one that a light variation control declaration can be carried out. Each lighting device generates a random number and carries out a light variation control declaration only when the number is in a certain range. When light variation control declarations overlap within the window time Tw, those lighting devices again generate a random number and carry out a light variation control declaration only when the number is in a certain range. In this way, finally there is one lighting device. It should be noted that it is also possible to cause the probability P to approach one in accordance to increases in the number of times of loops.

Regarding the return control, the transmitter-receiver portion 601 of each of the lighting devices may receive the comparison result telegram transmitted from the local device 61, and, when the judgment portion 603 judges that the content does not meet the predetermined condition, each of the control portions 202 may carry out the return control. Since all the lighting devices in the areas R1 and R2 simultaneously receive the judgment result telegram transmitted from the local device 61, all the lighting devices including the lighting devices that carried out light variation control will perform return control simultaneously.

By carrying out negotiation using the same principle as described above between the lighting devices that have not carried out light variation control, it is also possible to select the lighting devices to carry out return control. It is also possible to use negotiation to decide the lighting devices that will not carry out return control.

Regarding the timing for negotiation and the communication telegram and operation frequencies used for negotiation, the various methods described in Embodiment 9 may be applied.

These communications may be broadcast-type communications that do not require a destination lighting device. Accordingly, there are no destination addresses and the mode of communications telegram can be simplified.

With such a communication system, lighting control can be carried out so that there is predetermined illumination in a predetermined position without adjusting the lighting devices or the local devices even when the number of lighting devices increases or decreases and even when the number of local devices increases or decreases. It is also possible to freely move the local devices to a desired position and then cause the illumination of that position to constrict or converge to a desired value.

It should be noted that by separately providing a management device that manages all the lighting devices, it is possible to achieve a configuration in which the execution of light variation control is instructed and the lighting devices are caused to conduct light variation control in order. In this case, the management device and the transmitter-receiver portions of the lighting devices may be connected using wired communication routes or may be connected using wireless channels such as a wireless LAN. By providing plug and play functionality, even when there is an addition to the number of lighting devices, lighting control can be carried out in a state in which a new lighting device has been added.

It is possible that immediately after starting, the lighting devices communicate with each other simultaneously or alternately and are allotted numbers respectively so as to not overlap, then after the allotment of numbers has finished, light variation control is carried out in the order of the numbers such that in the event of a notification of light variation control, each device notifies its own number and the lighting device of the next number thereafter is set to acquire the right to carry out the next light variation control. This case corresponds to dynamic provision of the ID information.

It should be noted that in the foregoing embodiment, description was given concerning light variation control in which the light intensity is reduced as a form of light variation control, but lighting control according to the present invention can also be carried out by switching to light increasing control in which the light intensities are increased starting from a lower light intensity.

As the method in which the lighting devices that carry out light variation control are selected one by one, the same method as the lighting device selection method C described in Embodiment 9 above, or a similar method can be used.

Embodiment 12

As has been already described, it is sufficient that the predetermined amount of light variation is a value that is not too large. Before starting, one step of light reduction, which is a predetermined amount of light variation of the light sources, is obtained. First, all the light sources are set to a maximum light intensity. Then, one light source is selected and set as a light source j. The light source j carries out light reduction until one sensor, that is, one illumination sampling portion becomes "NG." Here, "NG" is when the sampled illuminations L of the sensors fall below the target illumination Ls set in each sensor. "OK" is when these exceed the illumination information. Furthermore, the initial light intensity of the light source j is called the "current light intensity" and the light intensity after light reduction is called the "threshold light intensity," and when the difference thereof is given as a "width of light intensity difference," the next light intensity is expressed as "next light intensity"="current light intensity"−"width of light intensity difference"/N (N is usually set to approximately 4 to 8, but there is not limitation to this). The predetermined amount of light variation is set as "light intensity difference"/N. Accordingly, in a single time of light variation control, the light intensity of the light source j is not reduced to the threshold light intensity at which a given sensor becomes "NG," but is reduced to a light intensity considerably brighter than that. In other words, one step of light reduction is set to a sufficiently small step. When there is no illumination sampling portion that becomes "NG" even when the light intensity of the light source j is set to the minimum, that minimum light intensity is employed as the threshold light intensity. With such a procedure, the predetermined amount of light variation, which is a single step of light reduction for each of the lighting devices, is obtained, and this is stored for light variation control in each of the lighting devices 40, or in the control portion 202 of each of the lighting devices. In light variation control hereafter, light variation control is carried out in accordance with this step.

Figure 13:
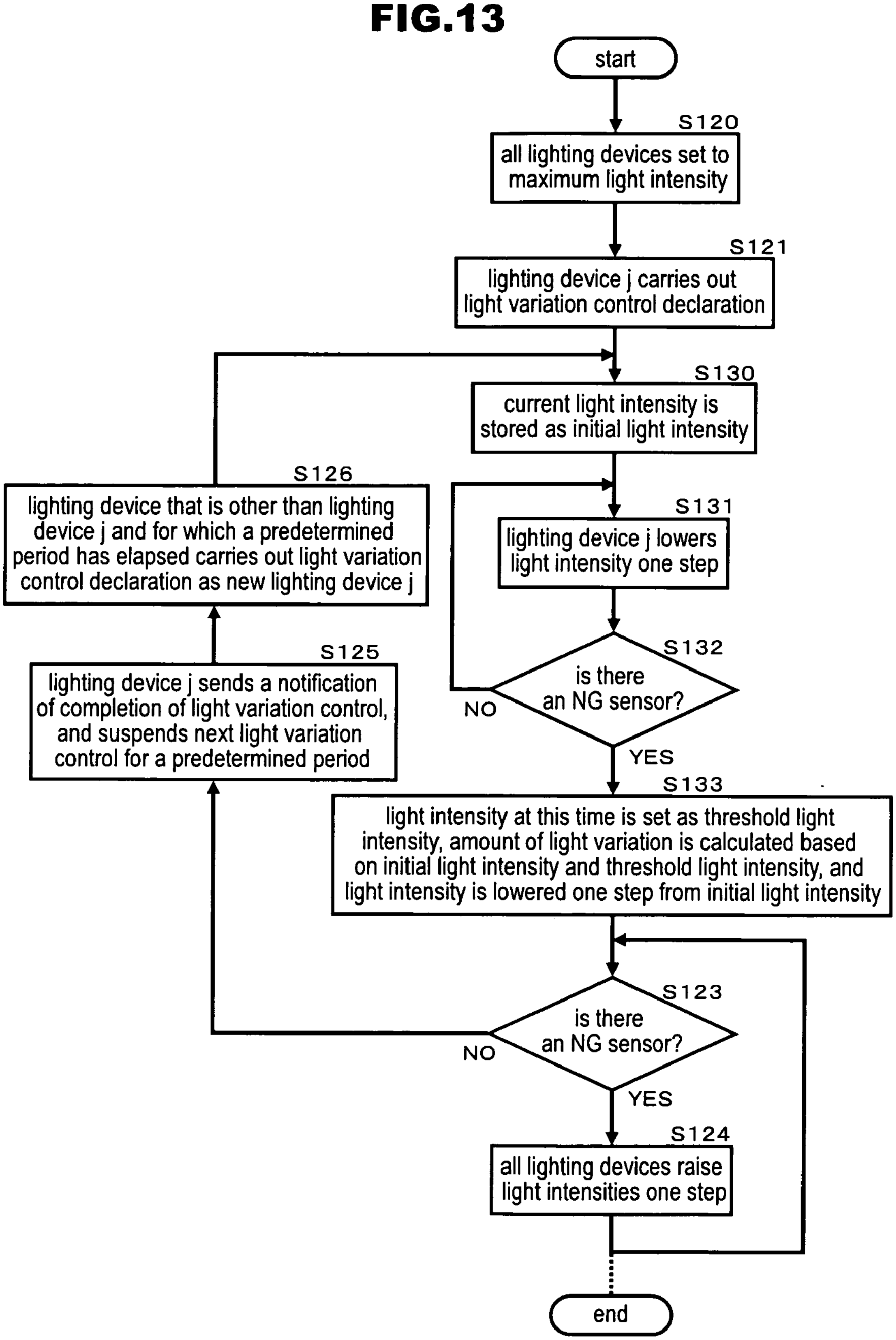
FIG. 13 is a flowchart of one embodiment of a lighting control procedure of a lighting control system according to the present invention.

The above-described predetermined amount of light variation may be determined each time before carrying out light variation control, as in the flowchart shown in FIG. 13. In FIG. 13, the steps that are the same as the steps in FIG. 12 are given the same step numbers, and therefore their description is omitted. In FIG. 13, (S122) in FIG. 12 is replaced by (S130) to (S133). At (S130), the current light intensity of the lighting device j is stored as the initial light intensity, and the procedure advances to (S131). At (S131), the lighting device j lowers the light intensity one step, and the procedure advances to (S132). At (S132), it is examined whether or not there is an NG sensor. That is, it is examined whether the judgment result meets the predetermined condition. If the result is "NO" at (S132), that is, if the predetermined condition is met, then the procedure returns to (S131). If the result is "YES" at (S132), then the light intensity at this time is set as the threshold light intensity, an amount of light variation is calculated based on a difference between the initial light intensity and the threshold light intensity, the light intensity is lowered from the initial light intensity by the amount of light variation, and the procedure advances to (S123).

In the present embodiment, the processing continuing at (S123), (S125), (S126) and (S130) to (S133) is a first control in which, when the judgment by the judgment portion is that the predetermined condition is met, a single lighting device other than the lighting device that carried out the previous light variation control performs light variation control. The processing continuing at (S123), (S124), (S123), (S125), (S126) and (S130) to (S133) is a second control in which, when the judgment by the judgment portion is that the predetermined condition is not met, in order to meet the predetermined condition, an arbitrary lighting device, or at least one lighting device including the lighting device that carried out the previous light variation control performs return control such that the predetermined condition is met, and then a single lighting device other than the lighting device that carried out the previous light variation control performs light variation control. The sampled illumination can be caused to approach the target illumination by carrying out the first control and the second control.

Furthermore, with this procedure, the predetermined amount of light variation is set large at first, and the predetermined amount of light variation can be made smaller in accordance with the approach to the target illumination, so that the sampled illumination can be caused to approach the target illumination more accurately. However, the number of steps of determining the predetermined amount of light variation will increase.

The selection of the lighting device j may be made by the same method as the negotiation method in the lighting device selection method B described in Embodiment 9 above or the negotiation method in Embodiment 11, or a similar method. It may also be made by the same method as the selection method C or a similar method, without carrying out a light variation control declaration.

Embodiment 13

Figure 14:
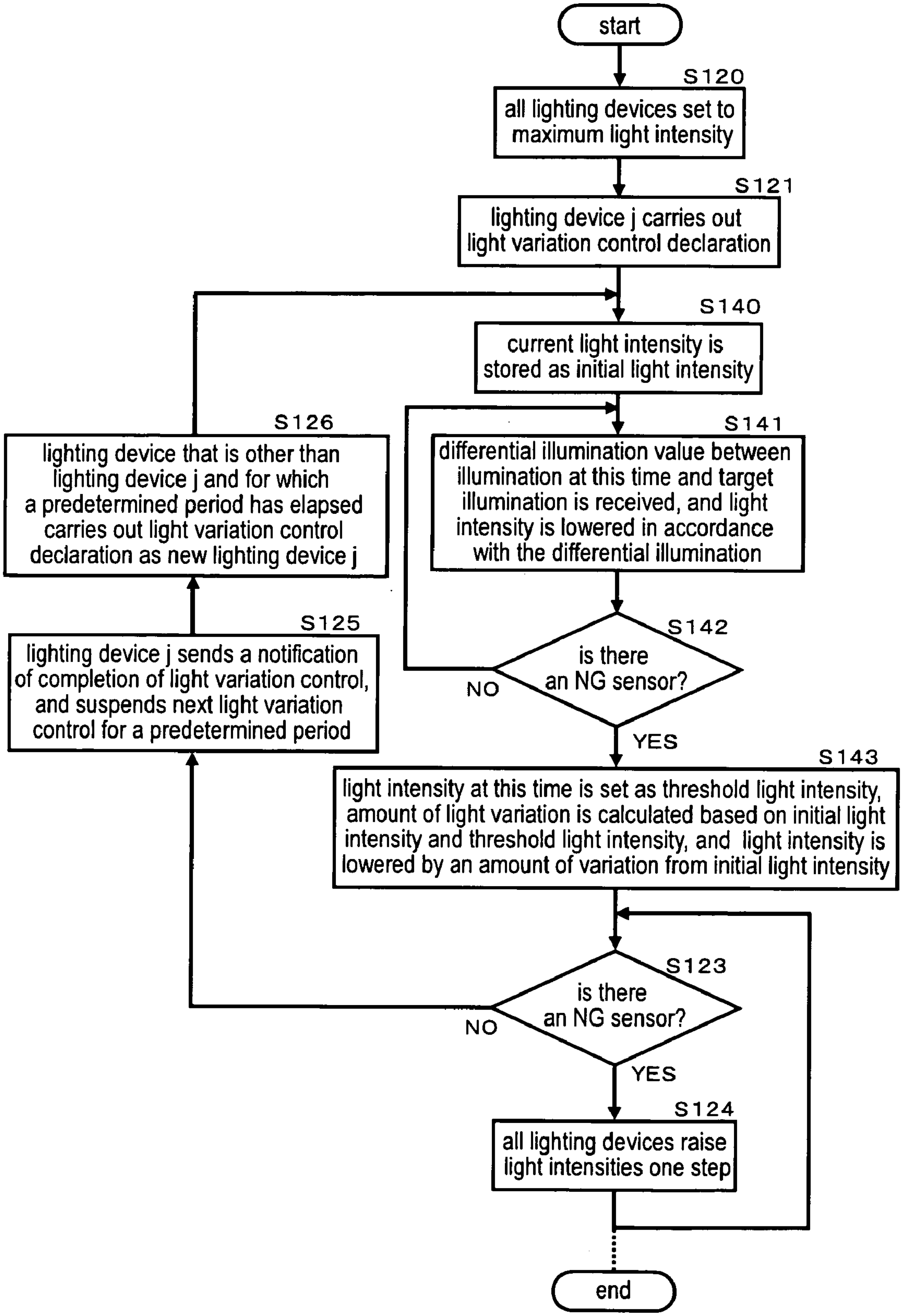
FIG. 14 is a flowchart of one embodiment of a lighting control procedure of a lighting control system according to the present invention.

As illustrated in the flowchart shown in FIG. 14, the above-described predetermined amount of light variation may be determined at the time of light variation control in accordance with the illumination. In FIG. 14, the steps that are the same as the steps in the flowchart in FIG. 12 are given the same step numbers, and therefore their description is omitted. In FIG. 14, (S122) of FIG. 12 is replaced by (S140) to (S143). At (S140), the lighting device j stores its current light intensity as the initial light intensity, and the procedure advances to (S141). At (S141), the lighting device j receives from the local device a difference between the sampled illumination L and the target illumination Ls in the sampling portion as the above-described differential illumination, and lowers the light intensity in accordance with the differential illumination. At (S142), it is examined whether or not there is an NG sensor. That is, it is examined whether the judgment result meets the predetermined condition. If the result is "NO" at (S142), that is, if the predetermined condition is met, then the procedure returns to (S141). If the result is "YES" at (S142), then the light intensity at this time is set as the threshold light intensity, an amount of light variation is calculated based on a difference between the initial light intensity and the threshold light intensity, the light intensity is lowered from the initial light intensity by the amount of light variation, and the procedure advances to (S123).

In the present embodiment, the processing continuing at (S123), (S125), (S126) and (S140) to (S143) is a first control in which, when the judgment by the judgment portion is that the predetermined condition is met, a single lighting device other than the lighting device that carried out the previous light variation control performs light variation control. The processing continuing at (S123), (S124), (S123), (S125), (S126) and (S140) to (S143) is a second control in which, when the judgment by the judgment portion is that the predetermined condition is not met, in order to meet the predetermined condition, an arbitrary lighting device, or at least one lighting device including the lighting device that carried out the previous light variation control performs return control such that the predetermined condition is met, and then a single lighting device other than the lighting device that carried out the previous light variation control performs light variation control. The sampled illumination can be caused to approach the target illumination by carrying out the first control and the second control.

Furthermore, with this procedure, the predetermined amount of light variation is set large at first, and the predetermined amount of light variation can be made smaller in accordance with the approach to the target illumination, so that the sampled illumination can be caused to approach the target illumination more accurately.

The selection of the lighting device j may be made by the same method as the negotiation method in the lighting device selection method B described in Embodiment 9 above or the negotiation method in Embodiment 11, or a similar method. It may also be made by the same method as the selection method C or a similar method, without carrying out a light variation control declaration.

Embodiment 14

Figure 15:
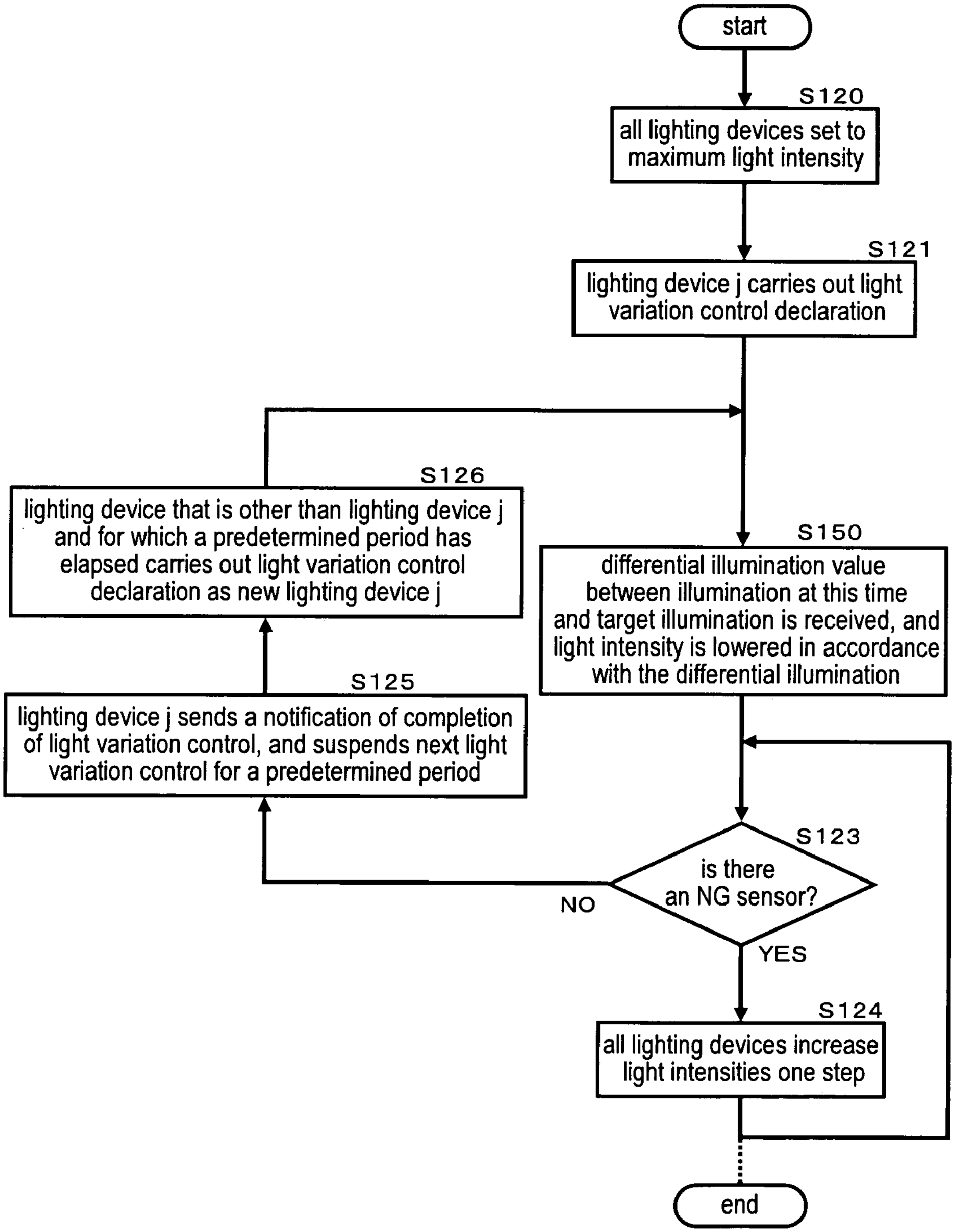
FIG. 15 is a flowchart of one embodiment of a lighting control procedure of a lighting control system according to the present invention.

The predetermined amount of light variation in the foregoing embodiments may be an amount of light variation based on a differential illumination between the current sampled illumination in the local device and the corresponding target illumination. FIG. 15 shows an example of a processing flowchart for the case of the present embodiment. Only portions different from the case of FIG. 12 are described.

In FIG. 15, (S150) is provided in place of (S122) in FIG. 12. At (S150), the lighting devices receive differential illuminations (L−Ls) between the sampled illuminations and the target illuminations from the local device, and determine a predetermined amount of light variation in accordance with the differential illumination if there is a single comparison result, and in accordance with the average value of the differential illuminations if there are plural comparison results. The predetermined amount of light variation is made smaller as the differential illumination becomes smaller.

In this way, even in the case of too-bright lighting devices, a large amount of light variation is applied at first so that an appropriate light intensity can be approached without spending too much time, and since the amount of light variation can be made smaller in accordance with the approach to the final light intensity, the target illumination can be reached rapidly and accurately. Furthermore, the loop procedure for obtaining the amount of light variation in FIGS. 13 and 14 becomes unnecessary, and therefore it is possible to eliminate or reduce a condition in which the light intensities of the light sources undergo large increase/decrease changes at the initial stage of lighting control.

In the present embodiment, the processing continuing at (S123), (S125), (S126) and (S150) is a first control in which, when the judgment by the judgment portion is that the predetermined condition is met, a single lighting device other than the lighting device that carried out the previous light variation control performs light variation control. The processing continuing at (S123), (S124), (S123), (S125), (S126) and (S150) is a second control in which, when the judgment by the judgment portion is that the predetermined condition is not met, in order to meet the predetermined condition, an arbitrary lighting device, or at least one lighting device including the lighting device that carried out the previous light variation control performs the return control such that the predetermined condition is met, and then a single lighting device other than the lighting device that carried out the previous light variation control performs light variation control. The sampled illumination can be caused to approach the target illumination by carrying out the first control and the second control.

The selection of the lighting device j may be made by the same method as the negotiation method in the lighting device selection method B described in Embodiment 9 above, the negotiation method in Embodiment 11, or a similar method. It may also be made by the same method as the selection method C or a similar method, without carrying out a light variation control declaration. Although a single lighting device j is selected in the above description, a single or a plurality of lighting devices j may be selected, as in the case of Embodiment 9.

Embodiment 15

In the foregoing embodiments, when the aforementioned predetermined condition was not met, the light intensities of all the lighting devices were changed by a predetermined amount in the reverse direction to the predetermined amount of light variation such that the aforementioned predetermined condition is met, after which the process was shifted to light variation control of the light intensities of the other light sources. Instead, however, it is also possible to make the illumination of the illumination sampling portion approach the target illumination by changing the light intensities of a portion of the lighting devices including the lighting device j, which is carrying out light variation control, by a predetermined amount in the reverse direction to the predetermined amount of light variation such that the aforementioned predetermined condition is met, and then the process is shifted to light variation control of the light intensities of the other light sources.

Embodiment 16

Next, a lighting control system in which there is no need for communication for negotiation between the lighting devices is unnecessary is described. This can be also applied to the embodiment described with reference to FIG. 4, in which the ID information is not used. The transmitter-receiver portion 601 of FIGS. 6, 8 and 9 may only have a reception function.

The plurality of lighting devices in the areas R1 and R2 respectively carry out light variation control separately in parallel. The amount of light variation for light variation control is changed randomly for each of the lighting devices. When a lighting device is judged to be not meeting the aforementioned predetermined condition in the judgment portions 403, 503 and 603, based on one or plural comparison results from the local device, the lighting devices in the areas R1 and R2 respectively carry out return control to the light intensity prior to the current light variation control. After one time of the return control, usually a return is made to the predetermined condition being met, but when this return does not occur, return control is again carried out until a return is made to the predetermined condition being met. Next, light variation control is again carried out with a random amount of light variation. By doing this, return control may sometimes increase temporarily due to excessive variation, but eventually the sampled illuminations can be made to approach the target illumination.

The aforementioned “random” includes cases such as the following. Namely, the lighting devices may carry out light variation control such that while the light intensity, which is a light intensity value, is arbitrarily increased/decreased, on average there is light reduction in one direction. In this case, the light intensities of the light sources may temporarily change to a reverse direction. In other words, the amount of light variation used may be any of a positive, negative, or zero value.

Furthermore, it is also possible to arbitrarily change the size of the amount of light variation in light variation control without changing the direction thereof. In other words, the light variation amount may be either one of zero or a negative value. In this case, the light intensities change in one direction except when there is return control. A reduction in light intensity may be large, small or zero.

When the light intensities are set to minimum at the beginning, the lighting devices may carry out light variation control such that while the intensities are arbitrarily increased/decreased, on average there are light increases in one direction. The light intensities of the light sources may temporarily change to the reverse direction. In other words, the amount of light variation used may be any of a positive, negative, or zero value. Furthermore, it is also possible to arbitrarily change the size of the amount of light variation in light variation control without changing the direction thereof. In other words, the light variation amount may be either one of zero or a positive value. In this case, the light intensities change in one direction except when there is return control.

The differential illumination of the sampled illumination and the target illumination is sent to the lighting devices from the local device and the lighting devices may make smaller the value of the amount of light variation randomly changed in response to a smaller average differential illumination received. The amount of light intensity returned in return control may be decreased in response to a decrease in the differential illuminations. By doing this, constriction to the target illumination can be achieved rapidly and flickering of the illumination in a constricted state can be made smaller.

As described above, instead of conducting return control until the light intensity prior to light variation control, return control may be conducted by only a predetermined amount of light. The amount of light intensity for return when conducting return control may be varied randomly. Since there are times when the aforementioned predetermined condition cannot be met in one time, the return control is carried out until there is a return to a state in which the predetermined condition is met. The differential illumination of the sampled illumination and the target illumination is sent to all the lighting devices from the local device and the lighting devices may reduce the amount of return light intensity in the return control in response to a smaller average differential illumination received. When the amount of return light intensity in the return control is randomly varied in this way, the amount of light variation for light variation control may be a fixed amount of light or may be an amount of light according to the above-described average differential illumination without being varied randomly.

Figure 16:
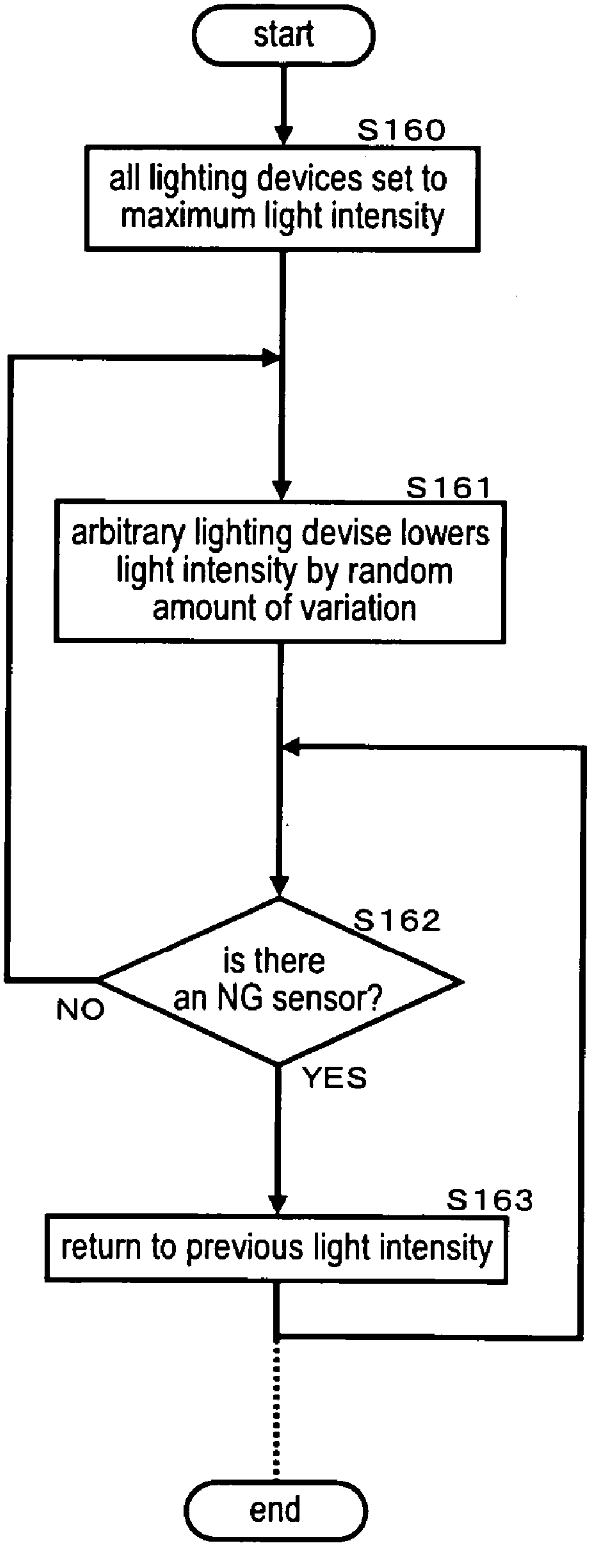
FIG. 16 is a flowchart of one embodiment of a lighting control procedure of a lighting control system according to the present invention.

FIG. 16 is an example of a flowchart of a control procedure according to this embodiment. At (S160), all the lighting devices are set to a maximum light intensity. The procedure then advances to (S161), at which an arbitrary lighting device changes its light intensity by a random amount of light variation. The procedure advances to (S162), at which the judgment portions 403, 503 and 603 of the lighting devices carry out a judgment as to whether or not there is an NG sensor. If the result is "NO", then the procedure returns to (S161). If the result is "YES" at (S162), then the procedure advances to (S163), at which the lighting devices are returned to the previous light intensity, and the procedure advances to (S162). At (S163), all the lighting devices in the areas R1 and R2 may perform return control by an arbitrary light intensity. Alternatively, a portion of the lighting devices may carry out return control by an arbitrary light intensity. Return control will be carried out at (S163) until the result is "NO" at (S162).

The time intervals with which the lighting devices carry out light variation control, that is, the timing for the next light variation control may be randomly changed. A lighting device in which light variation control continues with short time intervals carries out light variation control with high frequency, and thus makes a contribution to the illumination similar to a lighting device with a large amount of light variation.

When light variation control is carried out with random timing, there are less chances for the plurality of lighting devices to simultaneously change the light intensities, so that it is possible to reduce a significant change in the light intensities, thus decreasing flickering in the illumination.

Embodiment 17

Figure 17:
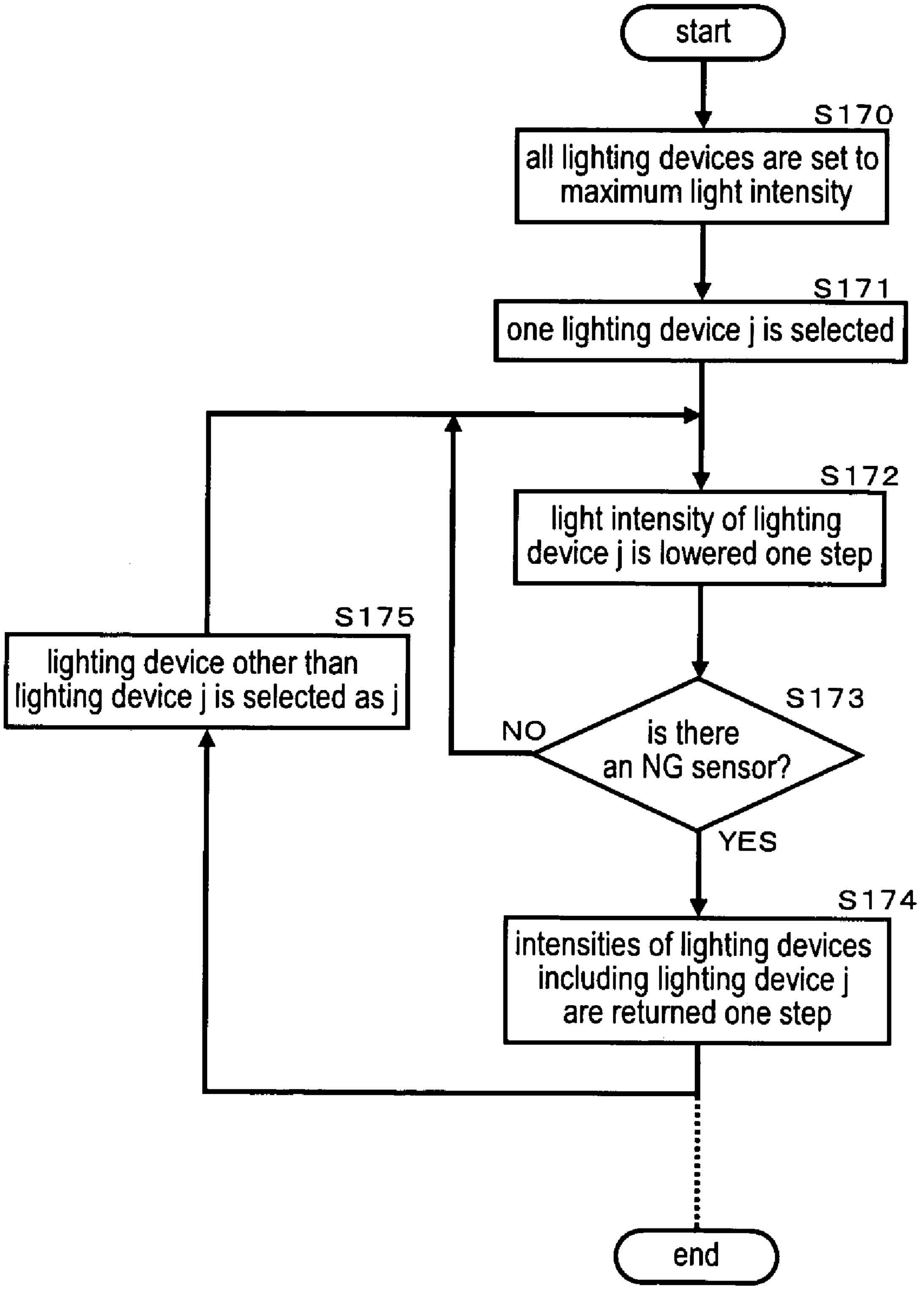
FIG. 17 is a flowchart of one embodiment of a lighting control procedure of a lighting control system according to the present invention.

FIG. 17 is a flowchart showing lighting control according to the present embodiment. In the flowchart of FIG. 17, first, all the light sources in the areas R1 and R2 are set to a maximum light intensity at (S170). Next, the procedure advances to (S171), at which a single lighting device is selected as the lighting device j. Next, the lighting device j carries out light variation control, i.e., light reduction in the case of the present embodiment until at least one sensor becomes "NG", that is, until a state in which the predetermined condition is not met occurs (S172, S173). Here, "NG" means that the sampled illuminations L of the sensors fall below the target illuminations Ls respectively set in the sampling portions, which are the sensors, in any of a single or a plurality of the local devices that are located in the field of view of the lighting devices concerned, or that are capturing the lighting devices in their field of view. "OK" means that the sampled illuminations L exceed the target illuminations Ls in all the local devices that are located in the field of view of the lighting devices concerned, or that are capturing the lighting devices in their field of view.

If the result is "YES" at (S173), then the procedure advances to (S174), at which the light intensity of an arbitrary lighting device or the lighting devices including the lighting device j are returned one step. When all the sensors do not become "OK," the light intensity is raised a further one step. Then, at (S175), a light source other than the lighting device j is selected and set as j. Light variation control (S172) and determination (S173) are executed on the newly selected lighting device j.

In the present embodiment, a series of the processing continuing at (S171), (S172), (S173), (S172) and (S173) is a third control in which any one of a plurality of lighting devices is selected, and the selected lighting device carries out light variation control until the judgment by the judgment portion indicates that the predetermined condition is not met. A series of the processing continuing at (S173), (S174), (S175), (S172), (S173), (S172) and (S173) is a fourth control in which, when the judgment by the judgment portion is that the predetermined condition is not met, in order to meet the predetermined condition, the lighting devices including the selected lighting device carry out the return control such that the predetermined condition is met, and then an arbitrary lighting device or a single lighting device other than the previously selected lighting device is selected to perform light variation control until the judgment by the judgment portion indicates that the predetermined condition is not met. The sampled illumination is caused to approach the target illumination by repeating at least the fourth control.

In the present embodiment, the size of the amount of light variation may be changed in the process of approaching the target illumination. For example, at (S173) in FIG. 17, the amount of light variation of the lighting device j may be made smaller each time the result is "NO." By doing this, the amount of light variation is larger at first, thus it is possible to approach the vicinity of the target illumination rapidly and the light variation control can be made more precise during the approach, and therefore it is possible to more accurately constrict and converge the illuminations to the target illumination. Each of the lighting devices may count the number of times of looping at (S175), and reduce the predetermined amount of light variation as the number of times of looping becomes larger.

At the return control of (S174) in FIG. 17, the size of the one step when raising the light intensities may be the latest predetermined amount of light variation held by the respective lighting devices or may be a value smaller than that. When return control is insufficient, return control may be repeated.

In contrast to Embodiments 10 to 16 where the light intensities of the lighting devices without exception were gradually lowered, the present embodiment is a system by which the lighting devices are made to rapidly approach until the vicinity of the threshold light intensity at the initial stage, after which correction is performed to approach the target illumination. Although lighting devices that are less than the final light intensity occur during control, return control is carried out at (S174) and light intensities that have dropped excessively are rectified.

In the present embodiment, any of the lighting devices is always carrying out light variation control even after a stable state is achieved. When making the amount of light variation smaller in accordance with the approach to the target illumination, flickering in the illumination due to light variation control is made smaller such that it is possible to make it unnoticeable to humans. The same applies to the lighting control systems in other embodiments.

In the present embodiment, description was given concerning a case in which light reduction is carried out as light variation control, but it is also possible to reach an illumination close to the target illumination with light-increase control in which light is increased gradually from the direction of small light intensities. In this case, the aforementioned predetermined amount of light variation is set to an amount of light increase and the return control is set to control in a light-reduction direction. The same is true for the lighting control systems in other embodiments.

In the foregoing description, a single lighting device j is selected in the present embodiment. However, a plurality of lighting devices j may also be selected. The processing continuing at (S171), (S172), (S173), (S172) and (S173) is set as a third control in which at least one of a plurality of lighting devices is selected, and the control portion of the selected lighting device carries out the above-described light variation control until the judgment by the judgment portion indicates that the predetermined condition is not met. The processing continuing at (S173), (S174), (S175), (S172), (S173), (S172) and (S173) is set as a fourth control in which, when the judgment by the judgment portion is that the predetermined condition is not met, in order to meet the predetermined condition, an arbitrary lighting device or the lighting devices including the lighting device that carried out the previous light variation control perform the return control such that the predetermined condition is met, and then the lighting devices including at least one of the lighting devices other than the lighting device that carried out the previous light variation control is selected to perform the light variation control until the judgment by the judgment portion indicates that the predetermined condition is not met. The sampled illumination is caused to approach the target illumination by repeating at least the fourth control.

The selection of the lighting device j may be made by the same method as the negotiation method in the lighting device selection method B described in Embodiment 9 above, the negotiation method in Embodiment 11, or a similar method. It may also be made by the same method as the selection method C or a similar method, without carrying out a light variation control declaration.

The selected lighting devices described above may carry out light variation control with random timing with respect to each other, instead of carrying out light variation control simultaneously. When light variation control is carried out with random timing, there are less chances for the plurality of lighting devices to simultaneously change the light intensities, so that it is possible to reduce a significant change in the light intensities, thus decreasing flickering in the illumination.

Embodiment 18

In the control procedure of FIG. 17, when an extremely small illumination is included among the target illumination Ls of a plurality of the local devices, even when the light intensity of the lighting device j is progressively lowered by (S172) and set to the minimum light intensity that the light source is capable of producing, there may be times when the result is not "YES" at (S173) since the light from the other light sources is strong. There may be times when the optimal state of convergence is a state in which the light intensities of light sources other than the lighting device j are set extremely small to set the lighting device j to an appropriate illumination. When the light intensities of the light sources other than that of the lighting device j are still large and the aforementioned predetermined condition remains unchanged even when the lighting device j is set to the minimum illumination it can produce or an illumination one step above that, the result remains "NO" at (S173) such that extrication from the loop cannot be achieved. For this reason, it is not possible to advance to an optimal state of convergence. To prevent such a situation, the control procedure shown below is used.

The flowchart of the control procedure in FIG. 17 is partly changed. Namely, (S176) and (S177) are added before (S172). At (S171), one lighting device j is selected and the setting value of the light intensity of that time is stored, and the procedure advances to (S176). At (S176), a determination is made as to whether or not the light intensity of the lighting device j is the minimum light intensity that can be produced. If the result is "NO", then the procedure advances to (S172), at which the light intensity is lowered one step. If the result is "YES" at (S176), then the light intensity cannot be lowered any more. Such a state occurs because the light intensities of other light sources are too large, so that the procedure advances to (S177), at which the light intensity of the lighting device j is returned to the stored light intensity setting value. The reason that the light intensity is returned in this way is that it seems that there is another lighting device whose light intensity should be lowered preferentially. Next, the procedure advances to (S175), at which another light source is selected, the lighting device thereof is set as j, and the light intensity of the new lighting device j is stored. Then, the procedure of (S176), (S172), (S173) and thereafter is executed with descending light intensities on the new lighting device j. By doing this, when a light source having an exceedingly excessive light intensity is reached, the illumination thereof is lowered preferentially, and the light intensities of such light sources having excessive light intensities can be lowered in order, and it is possible to achieve the process of convergence, that is, to proceed through (S172) to (S175) using the principle of the procedure described in FIG. 17.

Embodiment 19

Next, although some description has already been given, the procedure that can accelerate the convergence achieved by the controls in FIGS. 10 to 17 is described again. In the control procedures of FIGS. 10 to 17, in order to make the sampled illumination in each position, that is, in each of the local devices sufficiently close to the target illumination, it is necessary to make smaller the width of the amount of light variation of one step. In this case, the illumination of each position is made to approach the target illumination in small increments and convergence cannot be achieved unless the loop in the flowcharts of FIGS. 10 to 17 are repeated a multitude of times.

Accordingly, at the first loop procedure prior to becoming YES initially at the predetermined judgments (S102), (S113), (S123), and (S162) and (S173) after starting, the amount of light variation of one step is set larger. For example, when the resolving power of light intensity capable of being set for the light sources has 100 gradations between a maximum light intensity Lmax and zero, then initially one step is set to 20 gradations. That is, the unit is 20% of the maximum light intensity. At the stage where (S102), (S113), (S123), (S162) and (S173) are reached, there may be error in the sampled illuminations roughly of up to 20 gradations with respect to the target illuminations. In this state, when the procedure returns to the variation processing for the same lighting device again, and one step is reduced to five gradations so that the loop procedure is executed until the result is "YES" at (S102), (S113), (S123), (S162), (S173). Next, one step is reduced to one gradation and the loop procedure is executed until the result is "YES" at (S102), (S113), (S123), (S162) and (S173). With a method such as this in which the precision of control is increased in accordance with the overall approach to the target illumination, convergence can be achieved rapidly. For this purpose, each of the lighting devices may count and store the number of times of looping, and reduce the predetermined amount of light variation as the number of times of looping becomes larger.

Embodiment 20

Next, a lighting control system using a genetic algorithm is described. With this system, the light sources of the lighting devices are randomly made brighter and darker to examine a correlation for a particular light source between its own light intensity and information of a sensor, and its own influence is inferred by learning such that an appropriate one-step value can be found out from the inferred result and the light intensity controlled.

At least one of the lighting devices randomly changes the light intensity, and generates and analyzes an evaluation value based on the comparison result obtained at the judgment portion 403, 503 or 603, and carries out a judgment, and the control portion 202 of each of the lighting devices causes the sampled illumination to approach the target illumination by generally narrowing the range of light intensity that is randomly changed based on the judgment result. The judgment result sent from the judgment portion to the control portion 202 may be within the variation range of the light intensity.

Although the light intensities of the lighting devices may be changed randomly one by one, it is possible to achieve a target illumination distribution in a shorter time by randomly changing the light intensities of all the respective lighting devices in the areas R1 and R2 independently and causing the illumination of the illumination sampling portion to approach the target illumination by making a judgment based on the comparison results received at the judgment portion and generally narrowing the range of light intensity that is randomly changed by the control portions 202 of the lighting devices. Here "generally" means that although it is possible for the range of light intensity to temporarily expand locally, broadly the range can continue to be narrowed.

When the judgment portion receives comparison results from a plurality of local devices, it totals the comparison results to calculate an evaluation value, and the illuminations in the illumination sampling portions are made to approach the target illuminations by narrowing a range of randomly changed light intensities based on the evaluation value as the judgment result. When there is a single local device 21, illumination difference information from the local device 21 is a comparison result, and this serves as an evaluation value.

FIG. 18 shows examples of evaluation values of illumination differences when the light intensity of the lighting device j is changed randomly. First, a case in which there is a single local device is described. The light intensity of the lighting device j is randomly changed among a plurality of values between a maximum value and a minimum value, in units of 10% for example, and evaluation values for the respective light intensities are obtained as a sequence such as the evaluation values for the illumination difference shown in FIG. 18. This is a single random sequence. When the light intensity is 200 candelas, the evaluation value of the difference with the target illumination is −37. The evaluation values are numerical values in which the illumination difference with the target illumination is converted by a predetermined formula. Next, a value of 48 is given for 1,000 candela. When the light intensities of the other lighting devices are also changed randomly, the evaluation values will not always be the same even when the light intensity of the lighting device j is the same. However, the extent of influence on illumination by the light intensity of the lighting device j is evident in a table of light intensities of the lighting device j and a table of evaluation values of the illumination differences. Of the evaluation values according to the random sequence this time, portions of light intensities corresponding to large positive numerical values and large negative numerical values are excluded to narrow the range of variation of light intensities, and in the next random sequence the light intensity of the lighting device j is again randomly changed and the judgment portion calculates evaluation values. For example, from the larger positive evaluation values, 1,000 candela and 900 candela, which correspond to 48 and 43, are excluded, and from the larger negative values, 100 candela and 200 candela, which correspond to −35 and −37, are excluded, and the light intensity is changed randomly in the range of 300 candela to 800 candela. The unit width of change was 100 candelas the previous time, but this time it can be made smaller to 80 candelas. By narrowing the width of random change for each random sequence, the light intensity of the lighting device j can be made to approach a light intensity that gives an illumination close to the target illumination. The lighting device k, which is a lighting device other than the lighting device j, similarly changed the light intensity according to another random sequence, and thus obtains sequence data of evaluation values of illumination difference in FIG. 18. The probability of occurrence of large light intensities that may cause large evaluation values is set to zero or gradually lowered also in the lighting device k, and the next random sequence is executed.

With greater weights assigned to the light intensities having smaller average values of illumination differences, the weighted average of the light intensity values in the random sequence may be obtained, and the next random sequence may be generated using the average light intensity as the center value. The breakpoint for the random sequence may be moved, without being fixed.

When a plurality of local devices are provided, the judgment portion totals the plurality of comparison results received from the plurality of local devices and calculates evaluation values. A method of totaling may be simply adding the numerical values of the plurality of comparison results, or may be an average. The numerical values of the plurality of comparison results may be subjected to root square addition or root mean square. In this case, the evaluation values are positive values not smaller than zero, and therefore the light intensity variation width is narrowed by excluding light intensities that have caused regions of large evaluation values.

As another method, the local device may transmit large-small information representing which of the sampled illumination and the target illumination is larger as a comparison result, the judgment portion that received the comparison result totals the large-small information, establishes a new, slightly narrower range of light intensity change in which large information and small information of the large-small information is generally counterbalanced in evaluation values for a random sequence, that is, a sequence of the comparison results, and supplies this light intensity range to the control portion 202 as a judgment result. The control portion 202 may carry out random change within that range, and narrow the range of light intensities by proceeding in order with this process to cause the sampled illumination to approach the target illumination. The comparison results in this case can be viewed as items expressed as binaries.

The occurrence rate of randomly changed light intensities may be a uniform distribution, but may also be an occurrence rate of intermediate light intensities made larger such as in a normal distribution. In the above description, the light variation width of light intensities was set to narrow, but this may also be set such that the occurrence rate of light intensities in the large region and in the small region is made smaller, that is, it may be made narrower statistically.

The method of calculating the evaluation values and the methods for selecting the variation width of light intensities and variation regions may be methods other than those in the above-described examples.

In the present embodiment, the lighting devices need to respectively receive the differential illumination information or the large-small information transmitted from the local devices. Transmission may be carried out in a method that does not cause interference in transmission. Such a method has already been described.

In the present invention, there is no need for negotiation among the lighting devices, so that the transmitter-receiver portion 601 may only have a reception function.

Instead of being synchronously carried out by all the lighting devices, the events in the random sequence may be respectively carried out with random timing. When light variation control is carried out with random timing, there are less chances for the plurality of lighting devices to simultaneously change the light intensities, so that it is possible to reduce a significant change in the light intensities, thus decreasing flickering in the illumination.

In Embodiments 9 to 20, methods by which the target illumination is approached by increasing/decreasing the light intensity. However, needles to say, the method by which the target illumination is approached by increasing/decreasing the light intensity is not limited to these.

Embodiment 21

In the above-described embodiment in which the ID information is used, each of the lighting devices transmits its own ID information to the local device. In the present embodiment, the ID information of each of the lighting devices is stored in the transmitter portion 511 or the transmitter portion 611, and the transmitter portion 511 or the transmitter portion 611 selects a single, plural or all the plural pieces of stored ID information, and transmits this with a comparison result in the form of the infrared light 1 or a radio wave. When the received ID information matches its own ID information, the lighting device that could received the infrared light 1 or radio wave interprets this as indicating that it is designated, and the judgment portion 503 or 603 carries out a judgment for the comparison result, and causes the light intensity control to be performed. Accordingly, there is no need for the transmitter portion 505, the receiver portion 515, the superposition of the ID information by the control portion 702, the receiver portion 715 and the ID extraction portion 914.

By providing directional characteristics to the infrared light 1 or radio wave, it is possible to target the lighting devices located within the range of the directional characteristics and designate a portion or all of the lighting devices. When directional characteristics are not provided, the lighting devices to which the infrared light 1 or radio wave reach can be the targets of designation. All the lighting devices in the room also can be the targets of designation.

For the designation of the lighting devices by selecting the stored ID information, the lighting device selection method C described in Embodiment 9 above can be used. Further, when the lighting devices are arranged in the order of the ID information, it is possible to select every other lighting device, i.e., only a half of the lighting devices by selecting every other ID information. It is also possible to select the lighting devices located in a half or ¼ of the area of the room. For this purpose, an instruction unit such as a button or a dial indicating how to select the lighting devices may be provided to the local device, and the corresponding ID information may be selected by operating the instruction unit, and transmitted from the transmitter portion 511 or the transmitter portion 611.

When there are many conference rooms or halls, ID information codes that are not redundant among the rooms are assigned to the lighting devices in the rooms, a dedicated local device is provided for each of the rooms, and the local devices may respectively store the ID information of the lighting devices located in their rooms. When a person enters a room while holding the local device, the person may receive, by the local device, the ID information assigned to the lighting devices located in that room from a communication device provided near the entrance, store this in the transmitter portion 511 or the transmitter portion 611, and designate the lighting devices located in that room using the stored ID information. By doing this, there will be no need for dedicated local devices for the rooms, and the local device can be shared among the rooms. The mechanism by which the ID information is transmitted to the local device from the communication device provided near the entrance of the rooms, and the local device receives and stores this can be realized by a known general information transmission/reception technology, and therefore its detailed description is omitted.

When the numbers of the lighting devices located in two rooms are m and n (m<n), ID information ID1, ID2, ID3, . . . , IDm may be assigned to the lighting devices in a first room, ID information ID1, ID2, ID3, . . . , IDn, which include the same ID information, may be assigned to the lighting devices in a second room, and the ID information ID1, ID2, ID3, . . . , IDn may be stored in the local device. By doing this, the same local device can be used for both rooms. The lighting devices with IDm+1 to IDn are not present in the first room, so that designation using the ID information IDm+1 to IDn will be ignored in the first room. Although it may take time to achieve convergence of the illumination since the ID information that does not need to be designated may be transmitted, the overall configuration is simplified because the ID information is not transmitted from the lighting devices.

The ID information of the lighting devices that were selected for the previous use of the conference room may be stored in a storage portion provided in the local device, and, when the conference room is used again this time, the lighting devices corresponding to the ID information may be selected by using the ID information, thereby adjusting and controlling the illumination. In this case, the transmitter portion 505, the receiver portion 515, the superposition of the ID information by the control portion 702, the receiver portion 715 and the ID extraction portion 914 may or may not be provided in the system. In the case of providing the transmitter portion 505, the receiver portion 515, the superposition of the ID information by the control portion 702, the receiver portion 715 and the ID extraction portion 914, the stored ID information is updated due to movement of the range of directional characteristics resulting from movement of the local device, and selection is made for the new target lighting devices in accordance with the update to perform illumination control.

Embodiment 22

In the foregoing embodiments, if the light intensity setting values of the light sources and lighting devices converged on the desired illumination distribution are stored, then prior to a performance or the like, the desired illumination distribution can be achieved quickly by reading out the stored setting values and setting the light intensities. Also, by storing the light intensity setting values of the light sources and lighting devices at an arbitrary stage of the convergence process and then reading out the stored setting values and setting the light intensities, the convergence procedure can commence from that stage such that the desired illumination distribution can be reached very rapidly.

Embodiment 23

In the foregoing embodiments, if the light intensity setting values of the light sources and lighting devices in the convergence process toward the desired illumination distribution and the sampled illuminations of the illumination sampling portions are output to a display, the status of the convergence operation can be confirmed. Moreover, if the target illuminations of the illumination sampling portions are output to a display, the progress status until convergence can be grasped.

Other Embodiments and Supplement Notes

In the above-described embodiments, the power of the lighting devices is turned off when the room is unused, and the power switch provided near the entrance or the like is turned on when a person enters the room, thus supplying power to the lighting devices to activate the lighting devices. When activated, the control portion 202 places the light source 200 into a turned off state. Next, the local device is operated to transmit a signal. The lighting device that received the signal starts to light up in accordance with the received content. By doing this, power consumption can be zero during the time in which the room is not used, such as nighttime.

Only the receiver portion 201, the transmitter-receiver portion 601 and the judgment portions 203, 303, 403, 503 and 603 may be placed into an operating state, and the power of all the lighting devices may be turned on when the signal transmitted from the local device is received.

In the case of the method in which the ID information is transmitted from the lighting devices to the local device, the lighting devices may regularly transmit their own ID information from the transmitter portion 505, even in a state in which the light source 200 is turned off. In the case of the method in which the ID information is superposed on the illuminated light from the light source 200, the lighting devices may regularly light up the light source 200 for a very short time to transmit their own ID information, even in a state in which the light source is turned off.

It should be emphasized that in the above-described embodiments if the maximum light intensity of the lighting devices is low, then with the above-described procedure, the target illuminations may not be able to be regulated at the desired illumination. It should also be emphasized that when the number of light sources is small and the number of local devices is large, the illumination at all the positions may not be able to be regulated according to the target illuminations. Furthermore, it should be emphasized that when extremely high illuminations or low illuminations are included in a portion of the target illuminations, it may not be possible to regulate at the desired illumination unless the light source is arranged in an appropriate position. In other words, if it is originally possible to achieve an illumination distribution by regulating the light intensities of the light sources, then a desired illumination distribution is achievable using the above-described procedure. Furthermore, even for larger errors with respect to the target illumination, it is possible to approach the target illumination.

The foregoing description is given mainly for the case where the light intensity value or the light intensity is reduced from the maximum value. Since excessive light intensities are reduced, there is the effect of lowering the power consumption of the light sources. On the other hand, as has already been touched upon, the light intensity may be gradually increased from the minimum value. In regard to "in a constant relation" in this case, this state is called "OK" when the sampled illuminations of the positions are larger than the target illuminations of those positions, and in particular is deemed "in a constant relation" when all the positions are "OK" and deemed "not in a constant relation", i.e., "NG", when even one position is not "OK." Further, the predetermined amount of light variation is an amount of light reduction. The amount of light variation in return control is an amount of light increase.

When failure occurs in some of the lighting devices, the light intensities of those lighting devices may not be changed. Such lighting devices may be considered as a kind of the fixed environmental conditions in the control system of the present invention. For example, they may be considered as the same as some of the outside light entering from a window. In the lighting control system of the present invention, the light intensity values and the light intensities are controlled to compensate for the above-described fixed environmental conditions so that the sampled illuminations approach desired target illuminations as much as possible.

In the above-described embodiments, when the comparison result is expressed as binary values (two values), it is possible to transmit both of the binary values of the comparison result, but it is also possible to transmit only one of them. That is, the comparison portion sends to the judgment portion of the lighting device only one of the binary values that expresses a comparison result that is large or small with regard to the magnitude correlation between the sampled illumination and the target illumination. By doing this, it is possible to simplify transmission processing and reception processing, and also to reduce electric power consumption. The "one of the binary values that expresses a comparison result that is large or small with regard to the magnitude correlation between the sampled illumination and the target illumination" refers to one of binary values, sampled illumination≦target illumination and sampled illumination>target illumination, or one of the binary values, sampled illumination<target illumination and sampled illumination≧target illumination.

In the above-described embodiments, it is explained that it is possible to use broadcast-type communications. It is also possible to use a commonly used communication method for the communications between the lighting devices. In addition to a loop-type network, it is possible to use a mesh-type network, a star-type network, wired communications, wireless communications and the like in each of which communications can be carried out between the lighting devices respectively. Furthermore, a central device that manages all the lighting devices may be arranged in an appropriate location in the network, including a central position for a star-type network, for example. For the network communications for these devices, communication protocols such as those for commonly known LAN, wireless LAN, infrared LAN, Bluetooth (registered trademark) system, electrical wiring LAN, or econet may be used, or a portion of these protocols may be used. It is also possible to use these communication methods for the communications between the local device and the lighting devices. By configuring the lighting control system of the present invention by incorporating the format for transmitting the comparison result and the ID information in the present invention into these protocols, it is possible to prevent interference in transmission between the local device and the lighting devices of the lighting control system of the present invention, even if transmission is carried out between the information devices in the room, such as personal computers, printers and projectors, based on these protocols.

In the above-described case in which the broadcast-type communication method is not used, the central device may issue a single or multiple instances of the variation control permission information Dp and allow the lighting device having the variation control permission information to carry out light variation control. By arranging that the lighting devices cannot carry out light variation control even when possessing Dp until there is no more "NG"s, there is no excessive application of light variation control. The Dp may be set such that each lighting device can only hold one, or the maximum number to be held may be limited and any Dp exceeding that may be set to be forwarded to another lighting device. For a plurality of Dp that are held, only one of these can be used in one time of light variation control.

In the above-described case in which the broadcast-type communication method is not used, the lighting devices were set to randomly generate a transmission destination address for the Dp, but the Dp may be transmitted to a neighboring lighting device in accordance with the connection order of the lighting devices.

In the foregoing embodiments, the light variation control may be set to wait for a fixed time Ts before being carried out in consideration of a stabilization time for the light intensities of the light sources. Fundamentally, in the foregoing embodiments, each process was described as being performed asynchronously, but the overall system may be configured to operate synchronously in accordance with slots of the time T.

In the foregoing embodiments, the time axis and the amplitude axis of the light intensity value were described as discrete systems, but one or both of the time axis and amplitude axis may be configured as a continuous system. For example, by giving the light reduction rate instead of single-steps of a predetermined light variation amount of the lighting devices and the light-increase rate instead of single-steps of return control, and carrying out light-increase control as return control during "NG"s and carrying out light reduction control as light variation control during "OK"s, it is possible to regulate to the desired illumination distribution using the same principle. The lighting devices may change the light reduction rate for light variation control each time they carry out return control. The rate for light variation control may be changed in such a manner that it is always high or low.

In the above-described embodiments, as the occurrence frequency distribution of "OK", i.e., a judgment that the sampled illumination and the target illumination are in a constant relation, and "NG", i.e., a judgment that they are not in a constant relation, approach, the single step light intensity difference may be made smaller. Furthermore, when multiple instances of Dp are issued, as the occurrence frequency distribution of "OK" and "NG" approach, the number of Dp issued may be reduced. This judgment and processing can be carried out by the central device.

Each single step of the light variation amount may be decided in accordance with the resolving power of, for example, the light intensity capable of being produced by the control portions and the lighting devices.

In the foregoing embodiments, the width of control for each light source and the value of a single step are not necessarily according to the various above-described calculations and described methods, and it is possible to use other values within an appropriate range. The case in which the predetermined amount of light variation is reduced in response to reductions in the differential illumination of the sampled illumination and the target illumination has already been touched upon. A method other than this for reducing the predetermined amount of light variation as constriction advances may be a method such as the following. Each lighting device may total the number of times of light variation control and reduce the predetermined amount of light variation as the number of times of light variation control becomes larger. Also, each lighting device may reduce the predetermined amount of light variation as time passes from the commencement of control. It may be judged that convergence is advancing as the frequency of light variation control and return control approach on average.

A procedure for determining the predetermined amount of light variation from the initial light intensity and the threshold light intensity, for example the procedure of (S131), (S132), (S141) and (S142) in FIG. 13 and FIG. 14, was described as being executed each time prior to the lighting devices carrying out light variation control, but this may be set to be carried out one time for each of a given number of times of light variation control.

The first to fourth controls described above are not limited to those including the above-described steps. It should be emphasized that the contents of each of the steps may not completely match those illustrated, as long as the illustrated functionality can be achieved, and steps other then the illustrated steps may also be included.

The amount of light variation of light intensity value in the return control of the lighting devices may be the same size as the predetermined amount of light variation in the light variation control, but it may also be a different size. Furthermore, it may be a value respectively decided for each lighting device. Likewise for the predetermined light variation amount, it may be set to a small value as constriction advances. Furthermore, when conducting the return control, it is possible to return to the amount of light prior to carrying out light variation control.

As has been already touched upon, it is also possible to commence processing after setting the initial light intensity value of the lighting devices to an appropriate light intensity value intermediate to the maximum light intensity value and the minimum light intensity value. In this case, when the relation between the sampled illumination and the target illumination in the current light intensity state of all the lighting devices are not in a constant relation for all the comparison results, the light intensity values of all the lighting devices may be changed each time by an appropriate light intensity value in a reverse direction to the control direction for light variation control, that is, subjected to return control, and the selection of the lighting device in the foregoing embodiments and the process of variation processing for that light intensity value may be set to commence once the relations of the sampled illuminations and the target illuminations are all a constant relation. By doing this, constriction to the target illumination can be achieved rapidly.

In the control system according to the present invention, the light variation control may be carried out by selecting any of the plurality of lighting devices, and the selection can be freely changed and selected without any particular constraint to the prior selection. The same is true for the return control. Furthermore, in regard to the amount of light variation or the amount of light intensity returned in light variation control or return control, except for the variation direction in the lighting devices, it is possible to various degrees to approach the target illumination using any arbitrary size without any stringent restrictions, and therefore flexible system design is possible. There may be various algorithms of selection, but the above-described method using random numbers or the aforementioned negotiation can be achieved fundamentally.

From the point of view of electric power saving, a method in which the time density for supplying electric power to the light sources, such as inverter control or triac control, is preferable for controlling the light intensities of the lighting devices. In this case, the instantaneous light intensity involves repeating in alternation the maximum light intensity and the minimum light intensity, that is, repeating in alternation a light on state and a light off state. The mean light intensity is controlled for the lighting devices. The instantaneous illumination sampled by the illumination sampling portion varies widely in accordance with the instantaneous light intensity, and therefore values in which the instantaneous illumination is smoothed are required to be used as the sampled illumination.

The local devices may be arranged in predetermined fixed positions in a hall or a conference room, for example hanging midway between the ceiling and the floor, but it is preferable that they are movable to arbitrary positions of the hall or conference room as small size devices such as remote control devices. By doing this, the illumination of the arbitrary positions can be controlled to desired values. For example, a specified position on a conference table can be set to a desired brightness. Furthermore, a user can set the target illumination.

When the illumination at each position has sufficiently approached the target illumination, flickering of the illumination may be removed by pausing light variation control. To this end, in each embodiment, the lighting devices receive from each of the local devices information of the difference between the current illumination and the target illumination, and the size of the difference information is determined at the lighting devices, and when all have become sufficiently small values, light variation control may be set to be paused. Also, light variation control may be set to be paused after a time has elapsed that is several times larger than a maximum time Tmax required for convergence.

In order to commence light variation control in each of the embodiments, a start button may be provided in the local device and a notification may be given of the commencement of the above-described procedure to all the lighting devices and the other local devices by broadcast communications when the button is pushed.

In the case of using a plurality of local devices, communications may be carried out among the local devices to share the comparison results and the ID information. In the case of FIG. 1, it is possible to control the area R1 and the area R2 as an integrated area.

Once a state of convergence has been achieved, the respective light intensities of that time are stored such that even when the electric power to all the lighting devices is cut, the light intensities can be reproduced when the electric power is again turned on. Furthermore, when the difference between the sampled illumination and the target illumination in the local device becomes too large, the light intensities of all the lighting devices are changed by return control by an appropriate light intensity in a direction reverse to the light variation direction in light variation control, and the selection of the lighting device j in the foregoing embodiments may be set to commence in the process of variation processing for its light intensity once the relations of the sampled illuminations and the target illuminations are all set to a constant relation. By doing this, it is possible to reach the target illumination in a shorter time than again conducting all the processes from the beginning.

In the foregoing embodiments, the process of multiple light variation controls may be combined. That is, the light variation control of a particular embodiment may proceed at first and at a stage where the target illumination is approached, a transition may be made to light variation control according to another embodiment.

While application to an ordinary lighting control is described in the above-described embodiments, the invention can also be applied to colored lighting. Three sets of each of the lighting control systems of the above-described embodiments are configured for three light sources with red, blue and green color, respectively. Each of the three sensors in the sampling portion 413 of the local device is set to be sensitive to only one of red, blue and green color. By providing comparison portions corresponding respectively to the colors of the above-described three systems in the local device disposed at one location, setting a target illumination for each of the three colors, sending a comparison result between the sampled illumination and the target illumination for each color to the judgment portion corresponding to that color, and controlling the light intensity of the lighting device corresponding to that color based on the judgment result, it is possible not only to control the illumination of the position at which the local device is placed, but also to control the lighting to desired colors.

A plurality of sets of the storage portion 411, the sampling portion 413, and the comparison portion 412 may be provided inside a single local device, a plurality of comparison results may be partially judged as to whether the predetermined condition is met, and the result may be transmitted to the lighting devices as the comparison result. This makes it possible to control the illuminations of the plurality of sampling portions 413 to a desired value. By providing directional characteristics to each of the plurality of sampling portions 413, it is possible to control the directional characteristics of illumination at the position of the local device into a desired shape. That is, illumination can be provided from a desired direction.

As has been already touched upon, it should be emphasized that it is possible to omit the judgment portion by carrying out the above-described judgment carried out by the judgment portion by the receiver portion or control portion of each of the lighting devices. It should also be emphasized that, in all of the above-described embodiments, the configurations of the local device, the lighting device and the like are not of course limited to those described above.

The above-described directional characteristics are not limited to a conical shape. It may be a pyramid shape. In the case of a pyramid shape, the shape of the areas R1 and R2 is square. Furthermore, if the orientation of the local device is tilted, then the shape may be changed from a circle or a square.

In the foregoing description, directional characteristics are provided to the transmitter portion or the receiver portion. When the ceiling is a flat surface, the intensity of the received transmission medium is large at lighting devices that are located near the local device, and the intensity of the transmission medium is small at lighting devices that are located distant therefrom. The reason is that rays of light diffuse if they are not parallel light rays from a planar light source. Accordingly, directional characteristics are naturally realized owing to the distant relationship between the local device and the lighting devices, without using a light guide or a light-emitting diode having directional characteristics. According to the present invention, it is also possible to utilize such directional characteristics, and the directional characteristics used in the present invention also include directional characteristics that are caused by such a geometrical positional relationship between the local device and a plurality of the lighting devices.

Moreover, all the lighting control system processes in the aforementioned embodiments may be achieved by software. And such software may be distributed by way of a software download or the like. Furthermore, such software may be disseminated by being recorded on a recording medium such as a CD-ROM.

INDUSTRIAL APPLICABILITY

The lighting control system according to the present invention is useful for lighting control systems used inside or outside of buildings, and in halls and other various facilities.

The invention claimed is:

1. A lighting control system, comprising at least one local device that can transmit a comparison result between a target illumination and a sampled illumination, and a plurality of lighting devices that can receive the comparison result and to which ID information is assigned, wherein the local device includes a storage portion in which target illumination information is stored, a sampling portion that acquires sampled illumination information that is information indicating an illumination resulting from light intensities of the plurality of lighting devices, a comparison portion that compares the target illumination information and the sampled illumination information, a first transmitter portion that transmits the comparison result in the comparison portion, and a second receiver portion that can receive the ID information of the lighting devices, and the first transmitter portion transmits at least one of the received ID information included in the ID information transmitted from the plurality of lighting devices, in addition to the comparison result;

wherein the lighting devices include an ID storage portion in which the assigned ID information of their own is stored, a second transmitter portion that transmits the ID information of their own, a first receiver portion that can receive the comparison result and the ID information that are transmitted by the first transmitter portion, a judgment portion that carries out a predetermined judgment based on the received comparison result and the received ID information, a control portion that controls a light intensity in accordance with a judgment result of the judgment portion, and a light source whose light intensity is controlled by the control portion;

wherein at least one of the first transmitter portion, the first receiver portion, the second transmitter portion and the second receiver portion is provided with directional characteristics; and wherein, in a lighting device that is included in the plurality of lighting devices and that received the comparison result and the ID information that are transmitted from the local device, when the judgment portion judges that the ID information of its own is included in the received ID information, the control portion controls the light intensity of the light source based on the judgment result such that the sampled illumination approaches the target illumination.

2. A lighting control system, comprising at least one local device that can transmit a comparison result between a target illumination and a sampled illumination, and a plurality of lighting devices that can receive the comparison result and to which ID information is assigned, wherein the local device includes a storage portion in which target illumination information is stored, a sampling portion that acquires sampled illumination information that is information indicating an illumination resulting from light intensities of the plurality of lighting devices, a comparison portion that compares the target illumination information and the sampled illumination information, a first transmitter portion that transmits the comparison result in the comparison portion, and a second receiver portion that can receive the ID information of the lighting devices, and the first transmitter portion transmits at least one of the ID information that could be received from the plurality of lighting devices, in addition to the comparison result;

wherein the lighting devices include a first receiver portion that can receive the comparison result and the ID information that are transmitted by the first transmitter portion, a judgment portion that carries out a predetermined judgment based on the received comparison result and the received ID information, a control portion that controls a light intensity based on a judgment result of the judgment portion, a light source whose light intensity is controlled by the control portion, and an ID storage portion in which the assigned ID information of their own is stored, and the lighting devices superpose the ID information of their own on the light intensities with the control portion and transmits them to the local device;

wherein at least one of the first transmitter portion, the first receiver portion, the light source and the second receiver portion is provided with directional characteristics; and wherein, in a lighting device included in the plurality of lighting devices and that received the comparison result and the ID information that are transmitted from the local device, when the judgment portion judges that the ID information of its own is included in the received ID information, the control portion controls the light intensity of the light source in accordance with a judgment result based on the comparison result such that the sampled illumination approaches the target illumination.

3. A lighting control system, comprising at least one local device that can transmit a comparison result between a target illumination and a sampled illumination, and a plurality of lighting devices that can receive the comparison result an to which ID information is assigned, wherein the local device includes a storage portion in which target illumination information is stored, a sampling portion that acquires sampled illumination information that is information indicating an illumination resulting from light intensities of the plurality of lighting devices and that stores the ID information, a comparison portion that compares the target illumination information and the sampled illumination information, a first transmitter portion that transmits the comparison result in the comparison portion as an optical signal, and an ID extraction portion that extracts the ID information from the information acquired by the sampling portion, and the first transmitter portion transmits at least one of the ID information extracted by the ID extraction portion, in addition to the comparison result;

wherein the lighting devices include a first receiver portion that can receive the comparison result and the ID information that are transmitted by the first transmitter portion, a judgment portion that carries out a predetermined judgment based on the comparison result and the ID information that are received, a control portion that controls a light intensity in accordance with a judgment result of the judgment portion, a light source whose light intensity is controlled by the control portion, and an ID storage portion in which the assigned ID information of their own is stored, and the lighting devices superpose the ID information of their own on the light intensities with the control portion and transmits them to the local device;

wherein at least one of the first transmitter portion, the first receiver portion, the light source and the sampling portion is provided with directional characteristics; and wherein, in a lighting device that is included in the plurality of lighting devices and that could receive the comparison result and the ID information transmitted from the local device, when the judgment portion judges that the ID information of its own is included in the received ID information, the control portion controls the light intensity of the light source in accordance with a judgment result based on the comparison result such that the sampled illumination approaches the target illumination.

4. The lighting control system according to claim 1, wherein the first receiver portion has a transmission-reception function to enable transmission and reception among the plurality of lighting devices.

5. The lighting control system according to claim 1, wherein communication between the first receiver portion and the first transmitter portion is carried out via an optical signal.

6. The lighting control system according to claim 1, wherein communication between the second receiver portion and the second transmitter portion is carried out via an optical signal.

7. The lighting control system according to claim 1, wherein the local device selects the lighting device(s) by selecting at least one of, or all of the received ID information and transmitting the ID information to the lighting devices.

8. A lighting control system, comprising at least one local device, and a plurality of lighting devices, wherein the local device includes a first transmitter portion that transmits information for controlling light intensities of the lighting devices via a transmission medium, and transmits the information by the first transmitter portion;

wherein the lighting devices include a first receiver portion that can receive the transmission medium and that extracts the information from the transmission medium, a control portion that controls a light intensity based on the content of the information extracted by the first receiver portion, and a light source whose light intensity is controlled by the control portion;

wherein a lighting device to be selected is specified based on any of selection of ID information for identifying the lighting devices in the local device, directional characteristics of emission of the transmission medium in the first transmitter portion, and directional characteristics of reception of the transmission medium in the first receiver portion of the lighting devices;

wherein the control portion controls the light intensity in the selected lighting device, based on the content of the information extracted by the first receiver portion; and wherein, when selection by the directional characteristics, or selection by receiving a selection information, a light intensity setting information, a comparison result, and the ID information of its own is not made, each of the lighting devices is controlled such that the light source is not lighted up or that the light intensity is changed to a predetermined value or lower after a predetermined time.

9. The lighting control system according to claim 1, wherein the comparison portion outputs information on which of the sampled illumination and the target illumination is larger as a comparison result, and, in the lighting devices, the control portion reduces the light intensity of the light source when a comparison result that the sampled illumination is larger than the target illumination is received and the judgment portion judges that the light intensity should be reduced, and the control portion increases the light intensity of the light source when a comparison result that the sampled illumination is smaller than the target illumination is received and the judgment portion judges that the light intensity should be increased, thereby causing the sampled illumination to approach the target illumination.

10. A lighting control system, comprising at least one local device that can transmit a comparison result between a target illumination and a sampled illumination, and a plurality of lighting devices that can receive the comparison result, wherein the local device includes a storage portion in which target illumination information is stored, a sampling portion that acquires sampled illumination information that is information indicating an illumination resulting from light intensities of the plurality of lighting devices, a comparison portion that compares the target illumination information and the sampled illumination information, and a first transmitter portion that transmits a comparison result in the comparison portion;

wherein the lighting devices include a first receiver portion that can receive the comparison result transmitted by the first transmitter portion, a judgment portion that carries out a predetermined judgment based on the received comparison result, a control portion that controls a light intensity based on a judgment result of the judgment portion, and a light source whose light intensity is controlled by the control portion;

wherein at least one of the first transmitter portion and the first receiver portion is provided with directional characteristics, wherein, in a lighting device that is included in the plurality of lighting devices and that received the comparison result, the control portion controls the light intensity of the light source based on the judgment result such that the sampled illumination approaches the target illumination, and wherein the comparison portion outputs information on which of the sampled illumination and the target illumination is larger as a comparison result, and, in the lighting devices, the control portion carries out control to reduce the light intensity of the light source by a first predetermined value when a comparison result that the sampled illumination is larger than the target illumination is received and the judgment portion judges that the light intensity should be reduced, the control portion carries out control to increase the light intensity of the light source by a second predetermined value when a comparison result that the sampled illumination is smaller than the target illumination is received and the judgment portion judges that the light intensity should be increased, and each of the lighting devices selects at least one of the first predetermined value and the second predetermined value as a random value, thereby causing the sampled illumination to approach the target illumination.

11. A lighting control system, comprising at least one local device that can transmit a comparison result between a target illumination and a sampled illumination, and a plurality of lighting devices that can receive the comparison result, wherein the local device includes a storage portion in which target illumination information is stored, a sampling portion that acquires sampled illumination information that is information indicating an illumination resulting from light intensities of the plurality of lighting devices, a comparison portion that compares the target illumination information and the sampled illumination information, and a first transmitter portion that transmits a comparison result in the comparison portion;

wherein the lighting devices include a first receiver portion that can receive the comparison result transmitted by the first transmitter portion, a judgment portion that carries out a predetermined judgment based on the received comparison result, a control portion that controls a light intensity based on a judgment result of the judgment portion, and a light source whose light intensity is controlled by the control portion;

wherein at least one of the first transmitter portion and the first receiver portion is provided with directional characteristics, wherein, in a lighting device that is included in the plurality of lighting devices and that received the comparison result, the control portion controls the light intensity of the light source based on the judgment result such that the sampled illumination approaches the target illumination, and wherein the comparison portion outputs information on which of the sampled illumination and the target illumination is larger as a comparison result, and, in the lighting devices, the control portion carries out control to reduce the light intensity of the light source by a first predetermined value when a comparison result that the sampled illumination is larger than the target illumination is received and the judgment portion judges that light intensity reduction control should be carried out, the control portion carries out control to increase the light intensity of the light source by a second predetermined value when a comparison result that the sampled illumination is smaller than the target illumination is received and the judgment portion judges that light intensity increase control should be carried out, a portion of the lighting devices carries out one of the reduction control and the increase control, a number of the lighting devices that is larger than the number of the lighting devices of said portion carries out the other, and the lighting devices that carry out the reduction control and the light increase control are switched in sequence, thereby causing the sampled illumination to approach the target illumination.

12. The lighting control system according to claim 1, wherein the local device further includes a lighting device designating portion that selects, from the received ID information, the ID information for designating the lighting devices that carry out the reduction control or the light increase control by transmitting the ID information;

wherein the comparison portion outputs information on which of the sampled illumination and the target illumination is larger as a comparison result;

wherein the lighting device designating portion selects the ID information of the lighting devices that will reduce the light intensities, when the comparison result is that the sampled illumination is larger than the target illumination, and transmits the comparison result and the ID information to said lighting devices, and selects the ID information of the lighting devices that will increase the light intensities, when the comparison result is that the sampled illumination is smaller than the target illumination, and transmits the comparison result and the ID information to said lighting devices;

wherein, in the lighting devices that received the comparison result and the ID information of their own, the control portion carries out control to reduce the light intensity of the light source by a first predetermined value when a comparison result that the sampled illumination is larger than the target illumination is received and the judgment portion judges that the light intensity should be reduced, and the control portion carries out control to increase the light intensity of the light source by a second predetermined value when a comparison result that the sampled illumination is smaller than the target illumination is received and the judgment portion judges that the light intensity should be increased; and wherein the ID information is selected such that a portion of the lighting devices carries out one of the reduction control and the light increase control, and a number of the lighting devices that is larger than the number of the lighting devices of said portion carries out the other, thereby causing the sampled illumination to approach the target illumination.

13. A lighting control system, comprising at least one local device that can transmit a comparison result between a target illumination and a sampled illumination, and a plurality of lighting devices that can receive the comparison result, wherein the local device includes a storage portion in which target illumination information is stored, a sampling portion that acquires sampled illumination information that is information indicating an illumination resulting from light intensities of the plurality of lighting devices, a comparison portion that compares the target illumination information and the sampled illumination information, and a first transmitter portion that transmits a comparison result in the comparison portion;

wherein the lighting devices include a first receiver portion that can receive the comparison result transmitted by the first transmitter portion, a judgment portion that carries out a predetermined judgment based on the received comparison result, a control portion that controls a light intensity based on a judgment result of the judgment portion, and a light source whose light intensity is controlled by the control portion;

wherein at least one of the first transmitter portion and the first receiver portion is provided with directional characteristics, wherein, in a lighting device that is included in the plurality of lighting devices and that received the comparison result, the control portion controls the light intensity of the light source based on the judgment result such that the sampled illumination approaches the target illumination, wherein the judgment portion carries out a judgment as to whether a predetermined condition is met, based on the received comparison result, and supplies a judgment result to the control portion;

wherein the control portion can carry out, based on the judgment result, light variation control in which a light intensity value is changed from a current light intensity value in accordance with a predetermined amount of light variation, and return control in which the light intensity value is returned to a direction reverse to the light variation control;

wherein the sampled illumination is generated based on the light intensity values controlled by the control portions of the plurality of lighting devices;

wherein, among a first control in which, when the judgment by the judgment portion is that the predetermined condition is met, the lighting devices including at least one lighting device other than the lighting device that carried out the previous light variation control are selected to perform light variation control, a second control in which, when the judgment result is that the predetermined condition is not met, in order to meet the predetermined condition, any of the plurality of lighting devices or the lighting devices including at least one of the lighting devices that carried out the previous light variation control perform the return control so that the predetermined condition is met, and then the lighting devices including at least one lighting device other than the lighting device that carried out the previous light variation control is selected to perform light variation control, a third control in which, when the judgment result is that the predetermined condition is met, at least one of the plurality of lighting devices is selected, and the selected lighting device performs the light variation control until the judgment of the judgment portion indicates that the predetermined condition is not met, and a fourth control in which, when the judgment result is that the predetermined condition is not met, in order to meet the predetermined condition, any of the plurality of lighting devices or the lighting device including at least one of the lighting devices that carried out the previous light variation control perform the return control such that the predetermined condition is met, and then the lighting devices including at least one lighting device other that the lighting devices that carried out the previous light variation control is selected to perform the light variation control until the judgment of the judgment portion indicates that the predetermined condition is not met, the first control and the second control are carried out to cause the sampled illumination to approach the target illumination, or, among the third control and the fourth control, at least the fourth control is repeated to cause the sampled illumination to approach the target illumination.

14. The lighting control system according to claim 13, wherein a single lighting device other than the lighting devices that carried out the previous light variation control is selected in the first control, and the lighting devices including said single lighting device carry out the return control in the second control; or, wherein a single lighting device is selected from the plurality of lighting devices in the third control, and, in the fourth control, a single lighting device is selected from the lighting devices other than the lighting devices that carried out the previous light variation control to perform light variation control, and the lighting devices including said single lighting device carry out the return control.

15. A lighting control system, comprising at least one local device that can transmit a comparison result between a target illumination and a sampled illumination, and a plurality of lighting devices that can receive the comparison result, wherein the local device includes a storage portion in which target illumination information is stored, a sampling portion that acquires sampled illumination information that is information indicating an illumination resulting from light intensities of the plurality of lighting devices, a comparison portion that compares the target illumination information and the sampled illumination information, and a first transmitter portion that transmits a comparison result in the comparison portion;

wherein the lighting devices include a first receiver portion that can receive the comparison result transmitted by the first transmitter portion, a judgment portion that carries out a predetermined judgment based on the received comparison result, a control portion that controls a light intensity based on a judgment result of the judgment portion, and a light source whose light intensity is controlled by the control portion;

wherein at least one of the first transmitter portion and the first receiver portion is provided with directional characteristics, wherein, in a lighting device that is included in the plurality of lighting devices and that received the comparison result, the control portion controls the light intensity of the light source based on the judgment result such that the sampled illumination approaches the target illumination, wherein the judgment portion carries out a judgment as to whether a predetermined condition is met, based on the received comparison result, and supplies a judgment result to the control portion;

wherein the control portion can carry out, based on the judgment result, light variation control in which a light intensity value is changed from a current light intensity value in accordance with a predetermined amount of light variation, and return control in which the light intensity value is returned to a direction reverse to the light variation control;

wherein the sampled illumination is generated based on light intensity values controlled by the plurality of lighting devices;

wherein the lighting devices respectively carry out the light variation control, and, when the judgment is that the predetermined condition is not met after the light variation control, at least a portion of the lighting devices carries out the return control in order to meet the predetermined condition; and wherein the sampled illumination is caused to approach the target illumination by applying, for each of the lighting devices, at least one of: setting of the predetermined amount of light variation as an amount that is varied randomly; setting of a return variation amount in the return control as an amount that is varied randomly; random changing of a timing for carrying out the light variation control; and random changing of the frequency of the light variation control.

16. A lighting control system, comprising at least one local device that can transmit a comparison result between a target illumination and a sampled illumination, and a plurality of lighting devices that can receive the comparison result, wherein the local device includes a storage portion in which target illumination information is stored, a sampling portion that acquires sampled illumination information that is information indicating an illumination resulting from light intensities of the plurality of lighting devices, a comparison portion that compares the target illumination information and the sampled illumination information, and a first transmitter portion that transmits a comparison result in the comparison portion;

wherein the lighting devices include a first receiver portion that can receive the comparison result transmitted by the first transmitter portion, a judgment portion that carries out a predetermined judgment based on the received comparison result, a control portion that controls a light intensity based on a judgment result of the judgment portion, and a light source whose light intensity is controlled by the control portion;

wherein at least one of the first transmitter portion and the first receiver portion is provided with directional characteristics, wherein, in a lighting device that is included in the plurality of lighting devices and that received the comparison result, the control portion controls the light intensity of the light source based on the judgment result such that the sampled illumination approaches the target illumination, and wherein, when the comparison result in the local device is expressed as two values, only one state of the two values is supplied to the judgment portion as the comparison result, thereby causing the sampled illumination to approach the target illumination.

17. The lighting control system according to claim 13, wherein when there is a single local device in the lighting control system, the judgment portion judges that the predetermined condition is met when the comparison result is that the sampled illumination and the target illumination are in a constant relation and judges that the predetermined condition is not met when the comparison result is that the sampled illumination and the target illumination are not in a constant relation;

wherein when there are a plurality of local devices and at least two comparison portions, the judgment portions of the lighting devices judge that the predetermined condition is met when the comparison results are that the sampled illuminations and the corresponding target illuminations are all in a constant relation and judges that the predetermined condition is not met when the comparison results are that at least one is not in a constant relation; and wherein the constant relation is a relation in which, when the predetermined amount of light variation is a decrement, the sampled illumination is larger than the corresponding target illumination, and a relation in which, when the predetermined amount of light variation is an increment, the sampled illumination is smaller than the corresponding target illumination.

18. The lighting control system according to claim 13, wherein, when the light intensity values of the lighting devices that received the comparison result are initially set to their respective maximum or minimum values or when the predetermined condition is not met, the respective light intensity values are changed in a direction of variation in the return control so that the predetermined condition is met.

19. The lighting control system according to claim 13, wherein all the lighting devices that received the comparison result carry out the return control.

20. The lighting control system according to claim 13, wherein the return amount of light variation in the return control is a return amount of light variation by which a state before the previous light variation control is restored, or an arbitrary return amount of light variation that is returned to a direction reverse to a direction of control in the previous light variation control.

21. The lighting control system according to claim 13, wherein at least one of the predetermined amount of light variation and the amount of light variation in return control is an amount of light variation based on a difference between the sampled illumination and the target illumination.

22. The lighting control system according to claim 13, wherein at least one of the predetermined amount of light variation and the amount of light variation in return control is set for each of the lighting devices.

23. The lighting control system according to claim 13, wherein at least one of the predetermined amount of light variation and the amount of light variation in return control is reduced in response to a convergence in which the sampled illumination approaches the target illumination, or reduced along with a passing of time until convergence.

24. The lighting control system according to claim 13, wherein the number of lighting devices selected from the lighting devices that receive the comparison result to carry out light variation control is caused to approach one in response to a convergence in which the sampled illumination approaches the target illumination.

25. A lighting control system, comprising at least one local device that can transmit a comparison result between a target illumination and a sampled illumination, and a plurality of lighting devices that can receive the comparison result, wherein the local device includes a storage portion in which target illumination information is stored, a sampling portion that acquires sampled illumination information that is information indicating an illumination resulting from light intensities of the plurality of lighting devices, a comparison portion that compares the target illumination information and the sampled illumination information, and a first transmitter portion that transmits a comparison result in the comparison portion;

wherein the lighting devices include a first receiver portion that can receive the comparison result transmitted by the first transmitter portion, a judgment portion that carries out a predetermined judgment based on the received comparison result, a control portion that controls a light intensity based on a judgment result of the judgment portion, and a light source whose light intensity is controlled by the control portion;

wherein at least one of the first transmitter portion and the first receiver portion is provided with directional characteristics, wherein, in a lighting device that is included in the plurality of lighting devices and that received the comparison result, the control portion controls the light intensity of the light source based on the judgment result such that the sampled illumination approaches the target illumination, wherein the judgment portion generates an evaluation value base on the received comparison result, and supplies a judgment result based on the evaluation value to the control portion;

wherein the control portion can change a light intensity value, based on the judgment result obtained from the judgment portion; and wherein at least one of the plurality of lighting devices that received the comparison result randomly changes a current light intensity value, and narrows the range of light intensity value that is randomly changed, based on the judgment result obtained from the judgment portion, thereby causing the sampled illumination to approach the target illumination.

26. The lighting control system according to claim 25, wherein the plurality of lighting devices that received the comparison result respectively change current light intensity values randomly, and narrow the range of light intensity values that are randomly changed, based on the judgment result obtained from the judgment portion, thereby causing the sampled illumination to approach the target illumination.

27. The lighting control system according to claim 25, wherein a plurality of local devices are provided, the judgment portion totals the comparison results obtained from the comparison portions of the plurality of local devices to calculate an evaluation value, carries out a judgment, supplies a judgment result to the control portion and the control portion narrows the range of light intensity values that are randomly changed, based on the obtained judgment result, thereby causing the sampled illumination to approach the target illumination.

28. The lighting control system according to claim 25, wherein the comparison portion acquires difference information that is a difference between the sampled illumination and the corresponding target illumination, and transmits the difference information as the comparison result, the judgment portion totals the received comparison results to calculate an evaluation value, carries out a judgment, and supplies a judgment result to the control portion, and the control portion narrows the range of light intensity values that are randomly changed so as to increase an occurrence rate of light intensity values corresponding to evaluations of small difference information, based on the obtained judgment result, thereby causing the sampled illumination to approach the target illumination.

29. The lighting control system according to claim 25, wherein the comparison portion transmits large-small information indicating which of the sampled illumination and the corresponding target illumination is larger, the judgment portion totals the received large-small information to calculate an evaluation value, carries out a judgment, and supplies a judgment result to the control portion, and the control portion narrows the range of light intensity values that are randomly changed so as to counterbalance large information and small information of the large-small information, based on the obtained judgment result, thereby causing the sampled illumination to approach the target illumination.

30. The lighting control system according to claim 13, wherein at least one of the light intensity value in the light variation control and the light intensity value in the return control is varied continuously.

31. The lighting control system according to claim 1, wherein at least one of the light intensity values of the plurality of lighting devices, the sampled illumination and the target illumination is output to a display.

32. The lighting control system according to claim 1, wherein light intensity values of the lighting devices at a final stage of a convergence can be stored and the light intensity values of the lighting devices can be reproduced by receiving an instruction.

* * * * *